(12) United States Patent
Tan et al.

(10) Patent No.: US 10,046,497 B2
(45) Date of Patent: Aug. 14, 2018

(54) ACTUATOR COOLING APPARATUS AND METHOD

(71) Applicant: Synventive Molding Solutions, Inc., Peabody, MA (US)

(72) Inventors: Zhuang Rui Tan, Evanston, IL (US); Vito Galati, Rowley, MA (US)

(73) Assignee: Synventive Molding Solutions, Inc., Peabody, MA (US)

(*) Notice: Subject to any disclaimer, the term of this patent is extended or adjusted under 35 U.S.C. 154(b) by 105 days.

(21) Appl. No.: 15/380,084

(22) Filed: Dec. 15, 2016

(65) Prior Publication Data

US 2017/0100868 A1    Apr. 13, 2017

Related U.S. Application Data

(63) Continuation of application No. PCT/US2016/019466, filed on Feb. 25, 2016, and a continuation of application No. PCT/US2016/019469, filed on Feb. 25, 2016, and a continuation-in-part of application No. 14/459,622, filed on Aug. 14, 2014, now Pat. No. 9,682,504, and a continuation-in-part of application No. PCT/US2014/051026, filed on Aug. 14, 2014, and a continuation-in-part of application No. PCT/US2014/039932, filed on May 29, 2014, application No. 15/380,084, which is a (Continued)

(51) Int. Cl.
*B29C 45/73* (2006.01)
*B29C 45/27* (2006.01)
*B29C 45/28* (2006.01)
*B29C 45/03* (2006.01)
*B29K 105/00* (2006.01)

(52) U.S. Cl.
CPC .......... *B29C 45/2737* (2013.01); *B29C 45/03* (2013.01); *B29C 45/281* (2013.01); *B29K 2105/0067* (2013.01)

(58) Field of Classification Search
CPC .... B29C 45/281; B29C 45/73; B29C 45/7331
See application file for complete search history.

(56) References Cited

U.S. PATENT DOCUMENTS

2014/0353875 A1* 12/2014 Tan .......................... B29C 45/72
264/328.15

FOREIGN PATENT DOCUMENTS

| WO | WO0178962 A1 * | 10/2002 |
| WO | WO2009052611 A1 * | 4/2009 |
| WO | WO2011119791 A1 * | 9/2011 |

* cited by examiner

*Primary Examiner* — James Sanders
(74) *Attorney, Agent, or Firm* — Polsinelli PC; M. Lawrence Oliverio; Therese A. Hendricks

(57) ABSTRACT

An injection molding apparatus comprising a clamp plate, a heated manifold, an actuator, a mold and a cooling device, wherein the cooling device comprises:
a heat transmitter comprising a distal arm or member and a proximal base or member, the distal arm or member being mounted by a spring loadable interconnection or engagement to or with the proximal base or member,
the clamp plate, the mold, the manifold, the actuator and the heat transmitter being assemblable together in an arrangement wherein the spring loadable interconnection is loaded urging the distal end surface of the distal arm or member into compressed engagement with the clamp plate.

9 Claims, 23 Drawing Sheets

Related U.S. Application Data continuation-in-part of application No. 13/484,336, filed on May 31, 2012, now Pat. No. 9,011,736, which is a continuation of application No. PCT/US2011/062096, filed on Nov. 23, 2011, application No. 15/380,084, which is a continuation-in-part of application No. 13/484,408, filed on May 31, 2012, now Pat. No. 9,005,509, which is a continuation of application No. PCT/US2011/062096, filed on Nov. 23, 2011.

(60) Provisional application No. 61/828,391, filed on May 29, 2013.

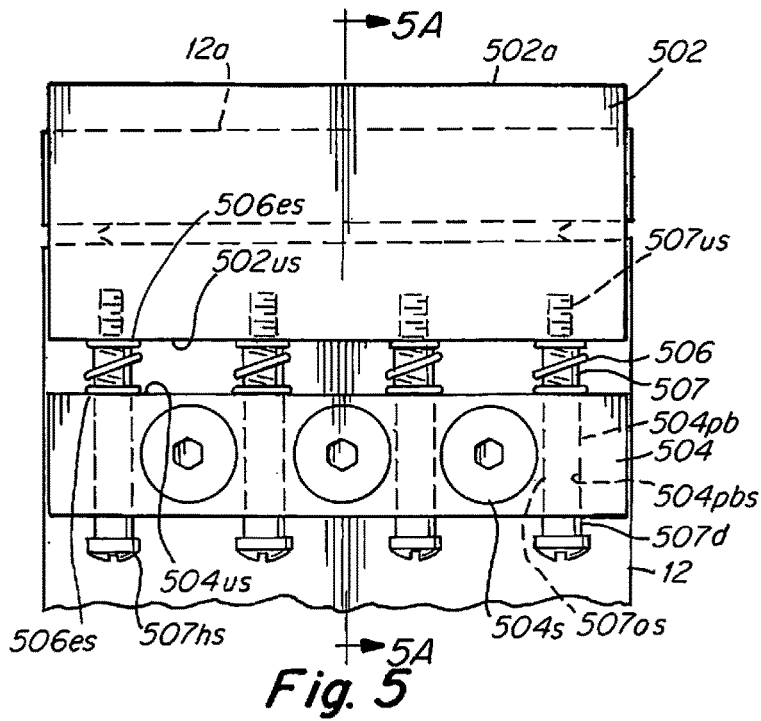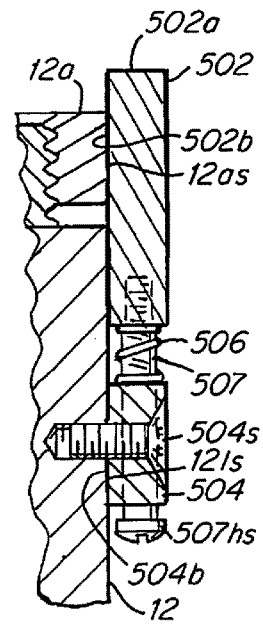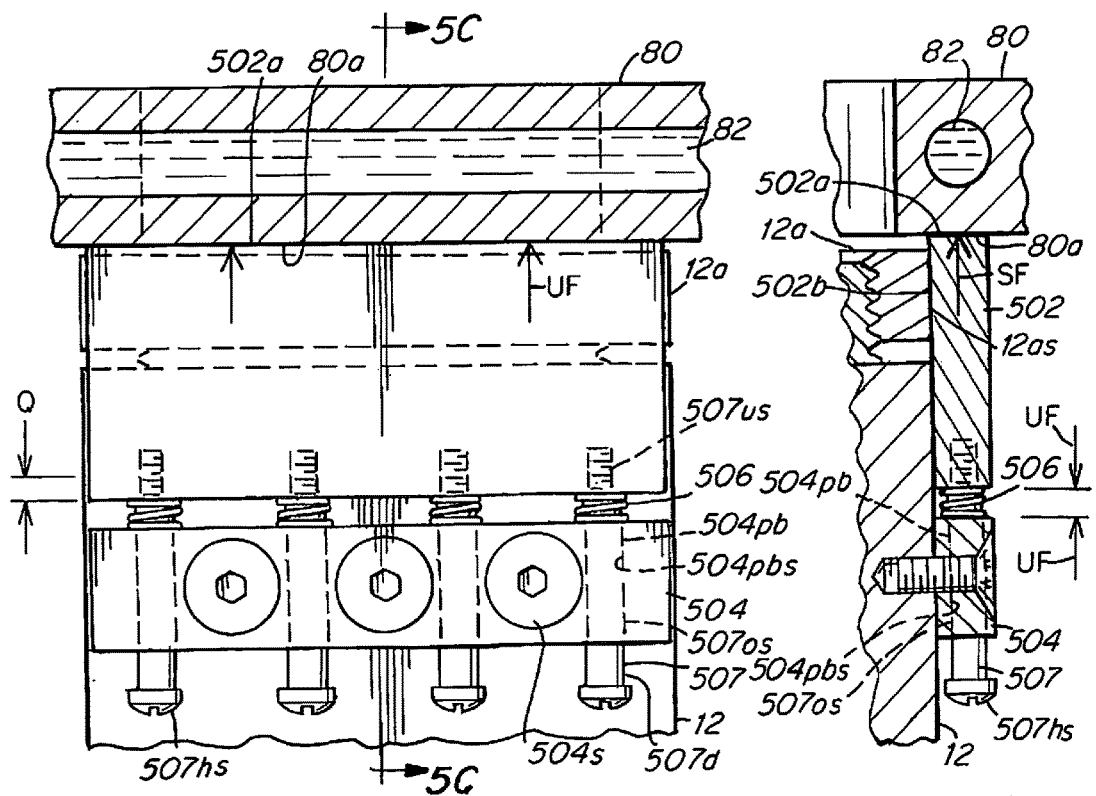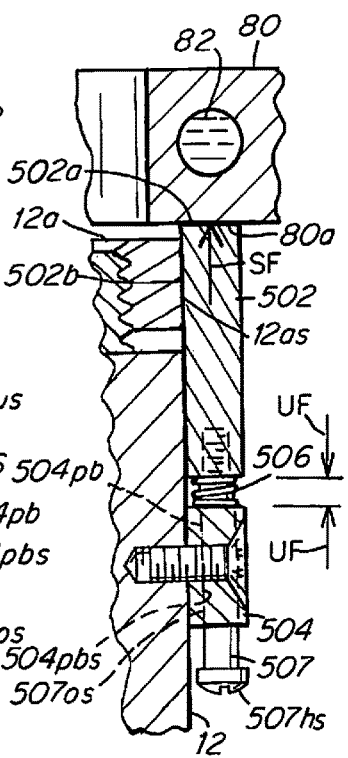

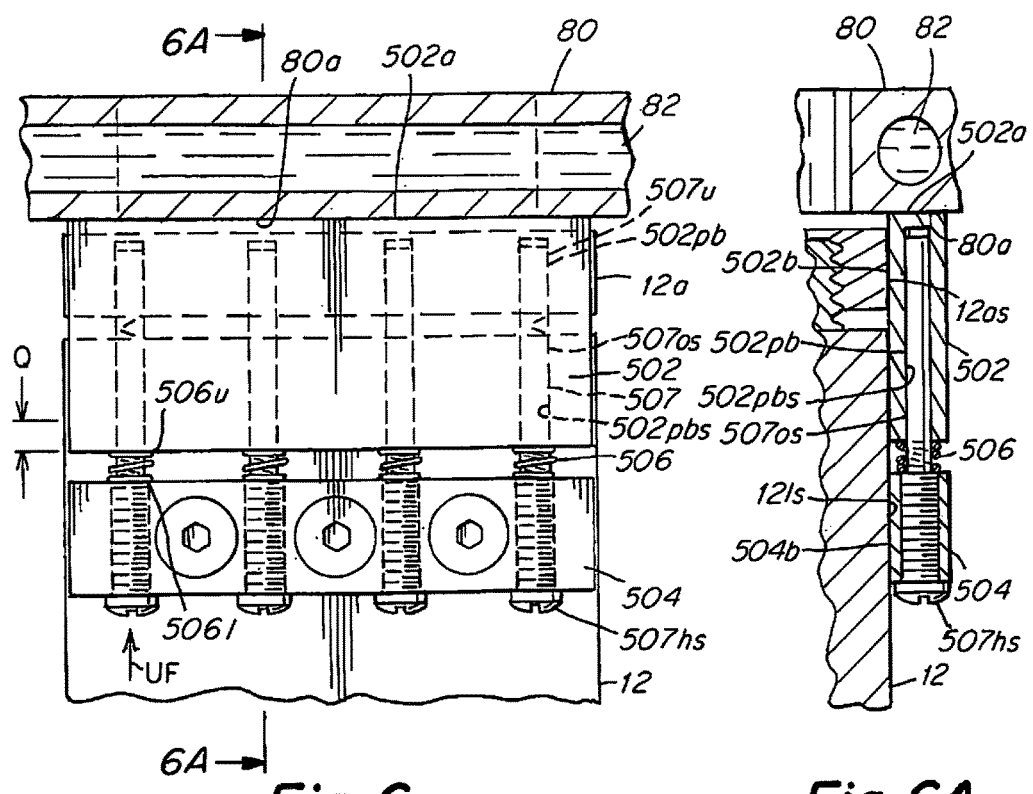

ACTUATOR COOLING APPARATUS AND METHOD

RELATED APPLICATIONS

This application is a continuation of and claims the benefit of priority to PCT application no. PCT/US2016/019466 filed Feb. 25, 2016 the disclosure of which is incorporated by reference in its entirety as if fully set forth herein. This application is also a continuation of and claims the benefit of priority to PCT application no. PCT/US2016/019469 filed Feb. 25, 2016 the disclosure of which is incorporated by reference in its entirety as if fully set forth herein.

This application is a continuation-in-part of and claims the benefit of priority to U.S. application Ser. No. 14/459,622 filed Aug. 14, 2014, the disclosure of which is incorporated by reference as if fully set forth herein.

This application is a continuation-in-part of and claims the benefit of priority to U.S. international application Serial no. PCT/US14/51026 filed Aug. 14, 2014 and is also a continuation-in-part of claims the benefit of priority to U.S. international application Serial no. PCT/US14/39932 filed May 29, 2014 (7133WO0) which claims priority to U.S. Provisional application Ser. No. 61/828,391 filed May 29, 2013, the disclosures of both of the foregoing of which are incorporated by reference in their entirety as if fully set forth herein.

This application is also a continuation-in-part of and claims the benefit of priority to U.S. application Ser. No. 13/484,336 filed May 31, 2012 which is a continuation of PCT/US2011/062096 filed Nov. 23, 2011, the disclosures of both of the foregoing are incorporated by reference in their entirety as if fully set forth herein.

This application is also a continuation-in-part of and claims the benefit of priority to U.S. application Ser. No. 13/484,408 filed May 31, 2012 which is a continuation of PCT/US2011/062096 filed Nov. 23, 2011, the disclosures of both of the foregoing are incorporated by reference in their entirety as if fully set forth herein.

The disclosures of all of the following are incorporated by reference in their entirety as if fully set forth herein: U.S. Pat. No. 5,894,025, U.S. Pat. No. 6,062,840, U.S. Pat. No. 6,294,122, U.S. Pat. No. 6,309,208, U.S. Pat. No. 6,287,107, U.S. Pat. No. 6,343,921, U.S. Pat. No. 6,343,922, U.S. Pat. No. 6,254,377, U.S. Pat. No. 6,261,075, U.S. Pat. No. 6,361,300 (7006), U.S. Pat. No. 6,419,870, U.S. Pat. No. 6,464,909 (7031), U.S. Pat. No. 6,599,116, U.S. Pat. No. 7,234,929 (7075US1), U.S. Pat. No. 7,419,625 (7075US2), U.S. Pat. No. 7,569,169 (7075US3), U.S. patent application Ser. No. 10/214,118, filed Aug. 8, 2002 (7006), U.S. Pat. No. 7,029,268 (7077US1), U.S. Pat. No. 7,270,537 (7077US2), U.S. Pat. No. 7,597,828 (7077US3), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068), U.S. application Ser. No. 10/101,278 filed Mar. 19, 2002 (7070) and PCT Application No. PCT/US11/062099 (7100WO0) and PCT Application No. PCT/US11/062096 (7100WO1), PCT/US2012/067379 (publication no WO 2014/025369) filed Nov. 30, 2012 and PCT/US13/053591 (publication no WO 2014/025674) filed Aug. 5, 2013, U.S. Pat. No. 8,562,336, U.S. Pat. No. 8,091,202 (7097US1) and U.S. Pat. No. 8,282,388 (7097US2).

BACKGROUND OF THE INVENTION

Solid sheet metal springs for cooling actuators have been used in injection molding systems such as disclosed in U.S. Pat. Nos. 8,349,244 and 8,562,336. These prior cooling devices comprise a solid body of sheet metal of relatively high mass in excess of 5 grams that is adapted to exert a spring force by forced deformation of a portion of the solid sheet of metal. This same sheet of metal is purposely disposed in direct heat conductive contact with a relatively large surface of the hot metal housing of an actuator typically in excess of 10 square millimeters that itself is disposed in heat conductive communication with a fluid distribution manifold that is heated to an elevated temperature sufficient to melt polymer materials. Over time, the ability of the sheet metal spring body to readily deform and provide an effective spring force is degraded by the very high level of heat to which the sheet metal body is subjected, the sheet metal spring body also acting to conduct heat from the actuator housing body to a cool clamp plate.

SUMMARY OF THE INVENTION

In accordance with the invention there is provided an injection molding apparatus 5 comprising a clamp plate 80, a heated manifold 20, an actuator 10 interconnected to a valve pin 17 having an axis A, a mold 300 and a cooling device 500 that cools the actuator 10 wherein, when assembled, the clamp plate 80 is mounted upstream of the mold 300, the manifold 20 being disposed between the clamp plate and the mold 300, wherein the cooling device 500 comprises:

a heat transmitter comprising a proximal arm or member 504 comprised of a heat conductive material and a distal arm or member 502 comprised of a thermally conductive material, the distal arm or member 502 being mounted by one or more spring loadable interconnections or engagement 506 on or to the proximal base or member 504, the distal arm or member 502 having a distal end surface 502a for engaging the clamp plate 80, 80a under a spring load and a proximal surface 502b for transmitting heat from the proximal surface to the distal end surface 502a, the spring or spring loadable interconnection 506 having engagement surfaces 506es that engage against complementary opposing engagement surfaces (504us, 502us) of proximal 504 and distal 502 members forming a selected area of engagement that renders spring 506 substantially non-heat conductive between the proximal and distal arms or members, the clamp plate, the mold 300, the manifold, the actuator and the heat transmitter being assemblable together in an arrangement wherein the spring loadable interconnection 506 is loaded urging the distal end surface 502a of the distal arm or member 502 into compressed engagement with the clamp plate 80, 80a at least when the manifold is heated to an elevated operating temperature.

The spring or spring loadable interconnection 506 preferably has an amount or degree of mass that renders the spring 506 substantially non-heat conductive between the proximal and distal members.

The area of engagement or contact between engagement surfaces 506es and one or both of surfaces 504us or 502us preferably minimizes, enables or imparts a minimal amount of, heat conduction between members 504 and 502 via or through spring or spring loadable interconnection 506.

The area of engagement or contact between engagement surfaces 506es and one or both of surfaces 504us or 502us is preferably less than about 10 square mm, typically less than about 7.5 mm and more typically less than about 5 mm.

The actuator 10 typically comprises a housing body 12 that is mounted in thermally conductive contact along the axis A to one or more actuator mounts 50, 60, 803 that are mounted downstream in heat conductive communication with or contact with or on the manifold along the axis A, the housing body 12 having a surface 12*ls* that is spaced laterally 12*ld* from the axis A, the proximal base or member 504 being mounted in heat conductive contact with and to the lateral surface 12*ls* such that the proximal base or member 504 is spaced laterally apart from contact with the one or more actuator mounts 50, 60, 803.

The apparatus can further comprise one or more heat conductive tubes 517*a*, 517*b*, 517*c*, 517*d* containing a heat conductive liquid embedded within one or the other or both of the proximal 504 and distal 502 members.

The distal 502 and proximal 504 members can be heat transmissively interconnected or engaged with each other by heat transmissive rods 507 or tubes 517*r* that are intimately engaged with the members 502, 504.

The apparatus can further comprise one or more hollow heat conductive tubes 517*ah* having a cavity containing heat conductive fluid, the one or more tubes 517*ah* being embedded within the body of the housing of the actuator 10, 12.

The distal member 502 can have a proximal exterior surface 502*b* that is adapted to be engaged and slidable against a complementary surface 12*ls*,12*as* of the housing body 12, 12*a* of the actuator 10 such that heat thermally conducts between the housing body 12, 12*a* and the distal arm or member 502, the distal end surface 502*a* of the distal arm or member being movable toward and away from the actuator 10 by sliding movement of the proximal exterior surface 502*b* of the distal arm or member 502 on the complementary surface 12*ls*, 12*as* of the actuator.

The spring loaded interconnection 506 can be adapted to urge the distal end surface 502*a* of the distal arm or member into a compression of at least 1 pound per square inch (psi) with the clamp plate.

The lateral surface 12*ls* and the proximal base member 504*aa* are preferably laterally spaced apart 12*ld* from direct heat conductive communication with the heated manifold 20.

The clamp plate is typically cooled.

The clamp plate, the mold, the manifold, the actuator and the cooling device are typically assembled together in an arrangement wherein the spring 506*a* is resiliently compressed up to a maximum of about 3 mm urging the distal end surface 502*a* of the distal arm or member into compressed engagement with the clamp plate 80*a*.

The apparatus can include two or more separate cooling devices each comprised of a distal arm or member 502 mounted via spring loadable interconnection to a proximal base or member 504, each separate cooling device being separately mounted to the housing body 12, 12*a* of the actuator and separately assemblable together with the clamp plate, the mold, the actuator and the manifold such that the distal end surface of the distal arm or member of each separate cooling device is in compressed engagement with the clamp plate under the spring loadable interconnection 506 between each separate distal end arm 502 and proximal base or member 504.

The apparatus can further comprise a mount 803 separating the actuator housing from direct contact with the manifold, the mount being cooled and having an upstream mounting surface in thermally conductive communication with a complementary mounting surface 12*d* of the actuator 10 and a downstream mounting surface in thermally conductive communication with the manifold 20. Such a mount is preferably comprised of a thermally conductive metal that is cooled to a temperature of less than about 150 degrees F.

The actuator 10 can be interconnected to a valve pin 17 that is mounted to the manifold and extends through a fluid material feed bore 22 in the manifold 20.

The proximal base or member 504 is typically rigidly attached in thermally conductive contact to the laterally spaced surface 12*ls* the housing body 12, 12*a*.

The distal arm or member 502, 502*b* is typically attached to the actuator such that the arm 502, 502*b* is disposed in slidable thermally conductive contact with the lateral surface 12*ls*, 12*as* of the housing body.

The distal arm or member can comprise a rod 502*r* slidably disposed within a complementary bore 12*bo* disposed within the housing body 12, 12*a* of the actuator 10, the complementary bore 12*bo* and the rod 502*r* being configured such that an exterior surface 502*b* of the rod 502*r* is slidably engaged in thermally conductive contact against an interior surface 12*si*, 12*asi* of the complementary bore 12*bo*.

In another aspect of the invention there is provided a method of cooling an actuator in an injection molding apparatus 5 comprised of a clamp plate 80, a heated manifold 20, an actuator 10 interconnected to a valve pin 17 having an axis A and a mold 300 wherein, when assembled, the clamp plate 80 is mounted upstream of the mold 300, the manifold 20 is disposed between the clamp plate and the mold, the actuator 10 comprising a housing body 12 that is mounted in thermally conductive contact along the axis A to one or more actuator mounts 50, 60, 803 that are mounted downstream in heat conductive communication with or contact with or on the manifold along the axis A, the method being characterized in that:

a cooling device 500 is mounted to a surface 12*ls* of the housing body 12 that is spaced laterally 12*ld* from the axis A, the cooling device comprising a proximal arm or member 504 that is comprised of a heat conductive material and a distal arm or member 502 that is comprised of a thermally conductive material, the distal arm or member 502 being mounted by one or more spring loadable interconnections or engagements 506 on or to the proximal base or member 504, the distal arm or member 502 having a distal end surface 502*a* for engaging the clamp plate 80, 80*a* under a spring load and a proximal surface 502*b* for transmitting heat from the proximal surface to the distal end surface 502*a*, the spring or spring loadable interconnection 506 has engagement surfaces 506*es* that engage against complementary opposing engagement surfaces (504*us*, 502*us*) of proximal 504 and distal 502 members having a selected area of engagement that renders spring 506 substantially non-heat conductive between the proximal and distal arms or members, assembling the clamp plate, the mold 300, the manifold 20, the actuator 10 and the heat transmitter together in an arrangement wherein the spring loadable interconnection 506 is loaded urging the distal end surface 502*a* of the distal arm or member 502 into compressed engagement with the clamp plate 80, 80*a* at least when the manifold is heated to an elevated operating temperature.

In another aspect of the invention there is provided a method of cooling the actuator of the apparatus described immediately above, the method comprising assembling the clamp plate, the mold, the manifold, the actuator and the cooling device of the apparatus of the foregoing claims such that the spring loadable interconnection is loaded urging the distal end surface of the distal arm or member into compressed engagement with the clamp plate at least upon heating the manifold to an elevated operating temperature.

In another aspect of the invention there is provided an injection molding apparatus 5 comprising a clamp plate 80, a heated manifold 20, an actuator 10 interconnected to a valve pin 17 having an axis A, a mold 300 and a cooling device 500 that cools the actuator 10 wherein, when assembled, the clamp plate 80 is mounted upstream of the mold 300, the manifold 20 being disposed between the clamp plate and the mold 300, wherein the cooling device 500 comprises:
a heat transmitter comprising a proximal arm or member 504 comprised of a heat conductive material and a distal arm or member 502 comprised of a thermally conductive material, the distal arm or member 502 being mounted by one or more spring loadable interconnections or engagements 506 on or to the proximal base or member 504, the distal arm or member 502 having a distal end surface 502a for engaging the clamp plate 80, 80a under a spring load and a proximal surface 502b for transmitting heat from the proximal surface to the distal end surface 502a,
the spring or spring loadable interconnection 506 having an amount or degree of mass that renders the spring 506 substantially non-heat conductive between the proximal 504 and distal 502 members,
the clamp plate, the mold 300, the manifold, the actuator and the heat transmitter being assemblable together in an arrangement wherein the spring loadable interconnection 506 is loaded urging the distal end surface 502a of the distal arm or member 502 into compressed engagement with the clamp plate 80, 80a at least when the manifold is heated to an elevated operating temperature The mass of the spring loadable interconnection minimizes, enables or imparts a minimal amount of, heat conduction between the proximal and distal arms or members via or through the spring or spring loadable interconnection 506.

The mass of the spring loadable interconnection 506 is typically less than about 10 grams, more typically less than about 7.5 grams and most typically less than about 5 grams.

The spring or spring loadable interconnection 506 can have engagement surfaces 506es that engage against complementary opposing engagement surfaces (504us, 502us) of proximal 504 and distal 502 members having a selected area of engagement that renders spring 506 substantially non-heat conductive between the proximal and distal arms or members.

The area of engagement or contact between engagement surfaces 506es and one or both of surfaces 504us or 502us minimizes, enables or imparts a minimal amount of, heat conduction between members 504 and 502 via or through spring or spring loadable interconnection 506.

The area of engagement or contact between engagement surfaces 506es and one or both of surfaces 504us or 502us is typically less than about 10 square mm, more typically less than about 7.5 square mm and most typically less than about 5 square mm.

The actuator 10 preferably comprises a housing body 12 that is mounted in thermally conductive contact along the axis A to one or more actuator mounts 50, 60, 803 that are mounted downstream in heat conductive communication with or contact with or on the manifold along the axis A, the housing body 12 having a surface 12ls that is spaced laterally 12ld from the axis A, the proximal base or member 504 being mounted in heat conductive contact with and to the lateral surface 12ls such that the proximal base or member 504 is spaced laterally apart from contact with the one or more actuator mounts 50, 60, 803.

Such an apparatus can further comprise one or more heat conductive tubes 517a, 517b, 517c, 517d containing a heat conductive liquid embedded within one or the other or both of the proximal 504 and distal 502 members.

The distal 502 and proximal 504 members can be heat transmissively interconnected or engaged with each other by heat transmissive rods 507 or tubes 517r that are intimately engaged with the members 502, 504.

The apparatus can further comprise one or more hollow heat conductive tubes 517ah having a cavity containing heat conductive fluid, the one or more tubes 517ah being embedded within the body of the housing of the actuator 10, 12.

The distal member 502 can have a proximal exterior surface 502b that is adapted to be engaged and slidable against a complementary surface 12ls,12as of the housing body 12, 12a of the actuator 10 such that heat thermally conducts between the housing body 12, 12a and the distal arm or member 502, the distal end surface 502a of the distal arm or member being movable toward and away from the actuator 10 by sliding movement of the proximal exterior surface 502b of the distal arm or member 502 on the complementary surface 12ls, 12as of the actuator.

The spring loaded interconnection 506 is preferably adapted to urge the distal end surface 502a of the distal arm or member into a compression of at least 1 pound per square inch (psi) with the clamp plate.

The lateral surface 12ls and the proximal base or member 504 are typically laterally spaced apart 12ld from direct heat conductive communication with the heated manifold 20.

The clamp plate can be cooled.

The clamp plate, the mold, the manifold, the actuator and the cooling device are typically assembled together in an arrangement wherein such that the spring 506a is resiliently compressed up to a maximum of about 3 mm urging the distal end surface 502a of the distal arm or member into compressed engagement with the clamp plate 80a.

The apparatus can include two or more separate cooling devices each comprised of a distal arm or member 502 mounted via spring loadable interconnection to a proximal base or member 504, each separate cooling device being separately mounted to the housing body 12, 12a of the actuator and separately assemblable together with the clamp plate, the mold, the actuator and the manifold such that the distal end surface of the distal arm or member of each separate cooling device is in compressed engagement with the clamp plate under the spring loadable interconnection 506 between each separate distal end arm 502 and proximal base or member 504.

The apparatus can further comprise a mount 803 separating the actuator housing 19 from direct contact with the manifold, the mount being cooled and having an upstream mounting surface in thermally conductive communication with a complementary mounting surface 12d of the actuator 10 and a downstream mounting surface in thermally conductive communication with the manifold 20. Such a mount is typically comprised of a thermally conductive metal that is cooled to a temperature of less than about 150 degrees F.

The actuator 10 is preferably interconnected to a valve pin 17 that is mounted to the manifold and extends through a fluid material feed bore 22 in the manifold 20.

The proximal base or member 504 can be rigidly attached in thermally conductive contact to the laterally spaced surface 12ls the housing body 12, 12a.

The distal arm or member 502, 502b can be attached to the actuator such that the arm 502, 502b is disposed in slidable thermally conductive contact with the lateral surface 12ls, 12as of the housing body.

The distal arm or member can comprises a rod 502r slidably disposed within a complementary bore 12bo disposed within the housing body 12, 12a of the actuator 10, the complementary bore 12bo and the rod 502r being configured such that an exterior surface 502b of the rod 502r is slidably engaged in thermally conductive contact against an interior surface 12si, 12asi of the complementary bore 12bo.

In another aspect of the invention there is provided a method of cooling an actuator in an injection molding apparatus 5 comprised of a clamp plate 80, a heated manifold 20, an actuator 10 interconnected to a valve pin 17 having an axis A and a mold 300 wherein, when assembled, the clamp plate 80 is mounted upstream of the mold 300, the manifold 20 is disposed between the clamp plate and the mold, the actuator 10 comprising a housing body 12 that is mounted in thermally conductive contact along the axis A to one or more actuator mounts 50, 60, 803 that are mounted downstream in heat conductive communication with or contact with or on the manifold along the axis A, the method being characterized in that:
a cooling device 500 is mounted to a surface 12ls of the housing body 12 that is spaced laterally 12ld from the axis A, the cooling device comprising a proximal arm or member 504 that is comprised of a heat conductive material and a distal arm or member 502 that is comprised of a thermally conductive material, the distal arm or member 502 being mounted by one or more spring loadable interconnections or engagements 506 on or to the proximal base or member 504, the distal arm or member 502 having a distal end surface 502a for engaging the clamp plate 80, 80a under a spring load and a proximal surface 502b for transmitting heat from the proximal surface to the distal end surface 502a,
the spring or spring loadable interconnection 506 having an amount or degree of mass that renders the spring 506 substantially non-heat conductive between the proximal 504 and distal 502 members,
assembling the clamp plate, the mold 300, the manifold 20, the actuator 10 and the heat transmitter together in an arrangement wherein the spring loadable interconnection 506 is loaded urging the distal end surface 502a of the distal arm or member 502 into compressed engagement with the clamp plate 80, 80a at least when the manifold is heated to an elevated operating temperature.

In another aspect of the invention there is provided a method of cooling the actuator of the apparatus described immediately above, the method comprising assembling the clamp plate, the mold, the manifold, the actuator and the cooling device of the apparatus such that the spring loadable interconnection is loaded urging the distal end surface of the distal arm or member into compressed engagement with the clamp plate at least upon heating the manifold to an elevated operating temperature.

In accordance with the invention there is also provided an injection molding apparatus 5 comprising a clamp plate 80, a heated manifold 20, an actuator 10 interconnected to a valve pin 17 having an axis A, a mold 300 and a cooling device 500 that cools the actuator 10 wherein, when assembled, the clamp plate 80 mounted upstream of the mold 300, the manifold 20 being disposed between the clamp plate and the mold, wherein the actuator 10 comprises a housing body 12 that is mounted in thermally conductive contact along the axis A to one or more actuator mounts 50, 60, 803 that are mounted downstream in heat conductive communication with or contact with or in heat conductive communication with or contact with or on the manifold along the axis A, wherein the cooling device 500 comprises:
a heat transmitter comprising a proximal arm or member 504 comprised of a heat conductive material and a distal arm or member 502 comprised of a thermally conductive material, the distal arm or member or member 502 being mounted by a spring loadable interconnection or engagement 506 on or to the proximal base or member 504, the distal arm or member 502 having a distal end surface 502a for engaging the clamp plate 80, 80a under a spring load and a proximal surface 502b for transmitting heat from the proximal surface to the distal end surface 502a,
the housing body 12 having a surface 12ls that is spaced laterally 12ld from the axis A, the proximal base or member 504 being mounted in heat conductive contact with and to the lateral surface 12ls such that the proximal base or member 504 is spaced laterally apart from contact with the one or more actuator mounts 50, 60, 803 in an arrangement wherein the distal end surface 502a of the distal arm or member 502 is movable through the spring loadable interconnection 506 toward and away from the actuator 10,
the clamp plate, the mold 300, the manifold, the actuator and the heat transmitter being assemblable together in an arrangement wherein the spring loadable interconnection 506 is loaded urging the distal end surface 502a of the distal arm or member 502 into compressed engagement with the clamp plate 80, 80a at least when the manifold is heated to an elevated operating temperature.

Such an apparatus can further comprise one or more heat conductive tubes 517a, 517b, 517c, 517d containing a heat conductive liquid embedded within one or the other or both of the proximal 504 and distal 502 members.

The distal 502 and proximal 504 members can be heat transmissively interconnected or engaged with each other by heat transmissive rods 507 or tubes 517r that are intimately engaged with the members 502, 504.

Such an apparatus can further comprise one or more hollow heat conductive tubes 517ah having a cavity containing heat conductive fluid, the one or more tubes 517ah being embedded within the body of the housing of the actuator 10, 12.

Preferably the distal member 502 has a proximal exterior surface 502b that is adapted to be engaged and slidable against a complementary surface 12ls,12as of the housing body 12, 12a of the actuator 10 such that heat thermally conducts between the housing body 12, 12a and the distal arm or member 502, the distal end surface 502a of the distal arm or member being movable toward and away from the actuator 10 by sliding movement of the proximal exterior surface 502b of the distal arm or member 502 on the complementary surface 12ls, 12as of the actuator.

The spring loaded interconnection 506 is typically adapted to urge the distal end surface 502a of the distal arm or member into a compression of at least 1 pound per square inch (psi) with the clamp plate.

The clamp plate is preferably mounted in a position in spaced thermal isolation from the manifold.

The clamp plate is preferably cooled.

The cooling device 500 can include a resilient spring 506a disposed between a body surface 504a of the proximal base or member 504 and the distal arm or member 502, wherein the clamp plate, the mold, the manifold, the actuator and the cooling device are assembled together in an arrangement wherein the spring 506a is resiliently compressed up to a maximum of about 3 mm urging the distal end surface 502a of the distal arm or member into compressed engagement with the clamp plate 80a.

Such an apparatus typically includes two or more separate cooling devices each comprised of a distal arm or member mounted in spring loadable interconnection to a proximal base or member, each separate cooling device being separately mounted to the housing body 12, 12a of the actuator and separately assemblable together with the clamp plate, the mold, the actuator and the manifold such that the distal end surface of the distal arm or member of each separate cooling device is in compressed engagement with the clamp plate under the spring loadable interconnection 506 between each separate distal end arm 502 and proximal base or member 504.

Such an apparatus preferably further comprises a mount 803 separating the actuator housing from direct contact with the manifold, the mount being cooled and having an upstream mounting surface in thermally conductive communication with a complementary mounting surface 12d of the actuator 10 and a downstream mounting surface in thermally conductive communication with the manifold 20.

The mount is typically comprised of a thermally conductive metal that is cooled to a temperature of less than about 150 degrees F.

The actuator 10 is typically interconnected to a valve pin 17 that is mounted to the manifold and extends through a fluid material feed bore 22 in the manifold 20.

The proximal base or member 504 can be rigidly attached in thermally conductive contact to the laterally spaced surface 12ls the housing body 12, 12a.

The distal arm or member 502 and proximal member 504 can comprise a unitary thermally conductive body 503 with at least the distal arm or member 502 being resiliently deformable to form the spring loadable interconnection 506 on assembly of the clamp plate, the mold, the manifold, the actuator and the heat transmitter being assembled in an arrangement wherein the spring loadable interconnection 506 is loaded when the manifold is heated to operating temperature urging the distal end surface 502a of the distal arm or member into compressed engagement with the clamp plate.

The distal arm or member and the proximal base or member can comprise a unitary body 503 rigidly attached in thermally conductive contact 504s to the laterally spaced surface 12ls, a portion of the unitary body being resiliently deformable to form the spring loadable interconnection 506, the mold, the manifold, the actuator and the heat transmitter being assembled in an arrangement wherein the resiliently deformable portion of the unitary body 503 compresses up to a maximum of about 0.5 mm when the manifold is heated to operating temperature urging the distal end surface 502a of the distal arm or member into compressed engagement with the clamp plate.

The distal arm or member 502, 502b can be attached to the actuator such that the arm 502, 502b is disposed in slidable thermally conductive contact with the lateral surface 12ls, 12as of the housing body.

The distal arm or member can comprises a rod 502r slidably disposed within a complementary bore 12bo disposed within the housing body 12, 12a of the actuator 10, the complementary bore 12bo and the rod 502r being configured such that an exterior surface 502b of the rod 502r is slidably engaged in thermally conductive contact against an interior surface 12si, 12asi of the complementary bore 12bo.

In another aspect of the invention there is provided a method of cooling the actuator of the apparatus described immediately above comprising assembling the clamp plate, the mold, the manifold, the actuator and the cooling device of the apparatus such that the spring loadable interconnection is loaded urging the distal end surface of the distal arm or member into compressed engagement with the clamp plate at least upon heating the manifold to an elevated operating temperature.

In another aspect of the invention there is provided a method of cooling an actuator in an injection molding apparatus 5 comprised of a clamp plate 80, a heated manifold 20, an actuator 10 interconnected to a valve pin 17 having an axis A and a mold 300 wherein, when assembled, the clamp plate 80 is mounted upstream of the mold 300, the manifold 20 is disposed between the clamp plate and the mold, the actuator 10 comprising a housing body 12 that is mounted in thermally conductive contact along the axis A to one or more actuator mounts 50, 60, 803 that are mounted downstream in heat conductive communication with or contact with or on the manifold along the axis A, the method being characterized in that:

a cooling device 500 is mounted to a surface 12ls of the housing body 12 that is spaced laterally 12ld from the axis A, the cooling device comprising a proximal arm or member 504 that is comprised of a heat conductive material and a distal arm or member 502 that is comprised of a thermally conductive material, the distal arm or member 502 being mounted by a spring loadable interconnection or engagement 506 on or to the proximal base or member 504, the distal arm or member 502 having a distal end surface 502a for engaging the clamp plate 80, 80a under a spring load and a proximal surface 502b for transmitting heat from the proximal surface to the distal end surface 502a, the proximal base or member 504 is mounted in heat conductive contact with and to the lateral surface 12ls such that the proximal base or member 504 is spaced laterally apart from contact with the one or more actuator mounts 50, 60, 803, and the clamp plate, the mold 300, the manifold, the actuator and the heat transmitter are assembled together in an arrangement wherein the spring loadable interconnection 506 is loaded urging the distal end surface 502a of the distal arm or member 502 into compressed engagement with the clamp plate 80, 80a at least when the manifold is heated to an elevated operating temperature.

In another aspect of the invention there is provided an injection molding apparatus comprising a clamp plate, a heated manifold, an actuator, a mold and a cooling device that cools the actuator, wherein when assembled the clamp plate and the mold are interconnected and spaced apart from each other, the manifold is disposed between the clamp plate and the mold and the actuator is mounted in thermally conductive communication with the manifold, wherein the cooling device comprises:

a heat transmitter comprising a distal arm or member and a proximal base or member, the distal arm or member being mounted by a spring loadable interconnection to the proximal base or member, the distal arm or member being comprised of a thermally conductive material having a distal end surface for engaging the clamp plate under a spring load and a proximal surface for transmitting heat from the proximal surface to the distal end, the actuator comprising a housing body that is thermally conductive and mounted in thermal communication with the manifold, the proximal base or member being mounted to the housing body of the actuator in an arrangement wherein the distal end surface of the distal arm or member is movable through the spring loadable interconnection toward and away from the actuator, the distal arm or member being mounted to the proximal base or member in an arrangement such that an exterior surface of the distal arm or member is disposed in slidable thermally conductive contact engagement with a complementary surface of the housing body, the clamp plate, the mold, the manifold, the actuator and the heat transmitter being assemblable together in an arrangement wherein the spring loadable interconnection is loaded urging the distal end surface of the distal arm or member into compressed engagement with the clamp plate when the manifold is heated to an elevated operating temperature, the exterior surface of the distal arm or member sliding along the complementary surface of the housing body on assembly of the clamp plate, the mold, the actuator and the cooling device.

In another aspect of the invention there is provided, a method of cooling the actuator of the apparatus described immediately above comprising assembling the clamp plate, the mold, the manifold, the actuator and the cooling device of the apparatus such that the spring loadable interconnection is loaded urging the distal end surface of the distal arm or member into compressed engagement with the clamp plate at least upon heating the manifold to an elevated operating temperature.

In another aspect of the invention there is provided an injection molding apparatus comprising a clamp plate, a heated manifold, an actuator interconnected to and driving a valve pin along an axis A, a mold and a cooling device that cools the actuator, wherein when assembled the clamp plate and the mold are interconnected and spaced apart from each other, the manifold is disposed between the clamp plate and the mold and the actuator is mounted in thermally conductive communication with the manifold, wherein the cooling device comprises:

a heat transmitter comprising a distal arm or member and a proximal base or member, the distal arm or member being mounted by a spring loadable interconnection to the proximal base or member, the distal arm or member being comprised of a thermally conductive material having a distal end surface for engaging the clamp plate under a spring load and a proximal surface for transmitting heat from the proximal surface to the distal end;

the actuator (10) comprising a housing body (12) that is thermally conductive and mounted in thermal communication with the manifold;

the clamp plate, the mold, the manifold, the actuator and the heat transmitter being assemblable together in an arrangement wherein the spring loadable interconnection is loaded urging the distal end surface of the distal arm or member into compressed engagement with the clamp plate, the distal arm or member and proximal base or member comprising a unitary thermally conductive body in which the spring loadable interconnection comprises a resiliently deformable portion of the unitary body, the clamp plate, the mold, the manifold, the actuator and the heat transmitter being assemblable in an arrangement wherein the resiliently deformable portion of the unitary body is compressed and urges the distal end surface of the distal arm or member into compressed engagement with the clamp plate when the manifold is heated to an elevated operating temperature.

In such an apparatus:

the housing body 12 is typically mounted in thermally conductive contact along the axis (A) to one or more actuator mounts 50, 60, 803 that are mounted downstream in heat conductive communication with or contact with or on the manifold along the axis A, and and the housing body 12 typically has a surface 12*ls* that is spaced laterally 12*ld* from the axis (A), the proximal base or member 504 being mounted in heat conductive contact with and to the lateral surface 12*ls* such that the proximal base or member 504 is spaced laterally apart from contact with the one or more actuator mounts 50, 60, 803

A method of cooling the actuator of the apparatus described immediately above above comprising assembling the clamp plate, the mold, the manifold, the actuator and the cooling device of the apparatus such that the unitary body resiliently deforms urging the distal end surface of the distal arm or member into compressed engagement with the clamp plate.

In another aspect of the invention there is provided an injection molding apparatus comprising a clamp plate, a heated manifold, an actuator, a mold and a cooling device that cools the actuator, wherein when assembled the clamp plate and the mold are interconnected and spaced apart from each other, the manifold is disposed between the clamp plate and the mold and the actuator is mounted in thermally conductive communication with the manifold, wherein the cooling device comprises:

a heat transmitter comprising a heat transmissive rod and a proximal base or member, the rod being mounted by a spring loadable interconnection to the proximal base or member, the rod being comprised of a thermally conductive material having a distal end surface for engaging the clamp plate under a spring load, the actuator comprising a housing body that is thermally conductive and mounted in thermal communication with the manifold, the proximal base or member being mounted to or integral with the housing body of the actuator in an arrangement wherein heat is transmitted between the housing body and the proximal base or member, the distal arm or member comprising a rod slidably disposed within a complementary bore disposed within the housing body, the complementary bore and the rod being configured such that an exterior surface of the rod is slidably engagable in thermally conductive contact with and against an interior surface of the complementary bore transmitting heat from the housing body to the distal end surface, the clamp plate, the mold, the manifold, the actuator and the heat transmitter being assemblable together in an arrangement wherein the spring loadable interconnection is loaded urging the distal end surface of the rod into compressed engagement with the clamp plate when the manifold is heated to an elevated operating temperature.

In such an apparatus: the housing body 12 is typically mounted in thermally conductive contact along the axis A to one or more actuator mounts 50, 60, 803 that are mounted downstream in heat conductive communication with or contact with or on the manifold along the axis A, and the housing body 12 has a surface 12*ls* that is spaced laterally 12*ld* from the axis A, the proximal base or member 504 being mounted in heat conductive contact with and to the lateral surface 12*ls* such that the proximal base or member 504 is spaced laterally apart from contact with the one or more actuator mounts 50, 60, 803.

In another aspect of the invention there is provided, a method of cooling the actuator of the apparatus described immediately above comprising assembling the clamp plate, the mold, the manifold, the actuator and the cooling device of the apparatus described immediately above such that the spring loadable interconnection is loaded urging the distal end surface of the rod into compressed engagement with the clamp plate.

In another aspect of the invention there is provided an injection molding apparatus 5 comprising a clamp plate 80, a heated manifold 20, an actuator 10, a mold 300 and a cooling device 500 that cools the actuator 10, wherein when assembled the clamp plate 80 and the mold 300 are interconnected and spaced apart from each other, the manifold 20 is disposed between the clamp plate and the mold and the actuator 10 is mounted in thermally conductive communication with the manifold 20, wherein the cooling device 500 comprises:

a heat transmitter comprising a distal arm or member 502 and a proximal base or member 504, the distal arm or member 502 being mounted by a spring loadable interconnection or engagement 506 to or with the proximal base or member 504, the distal arm or member 502 being comprised of a thermally conductive material having a distal end surface 502*a* for engaging the clamp plate 80, 80*a* under a spring load, the actuator 10 comprising a housing body 12, 12*a* that is thermally conductive and mounted in thermal communication with the manifold 20, the proximal base or member 504 being mounted to the housing body 12 of the actuator 10 in an arrangement wherein the distal end surface 502*a* of the distal arm or member 502 is movable through the spring loadable interconnection 506 toward and away from the actuator 10, the distal arm or member 502 having a proximal surface 502*b* adapted to be disposed in sliding contact with a complementary surface 12*ls*, 12*as* of the actuator 10 for transmitting heat from the proximal surface 502*b* to the distal end surface 502*a*, the clamp plate, the mold 300, the manifold, the actuator and the heat transmitter being assemblable together in an arrangement wherein the proximal surface 502*b* slides along the complementary surface 12*ls*, 12*as* and the spring loadable interconnection 506 is loaded urging the distal end surface 502*a* of the movable rod or arm 502 into compressed engagement with the clamp plate 80, 80*a* at least when the manifold is heated to an elevated operating temperature.

In such an apparatus the spring or spring loadable interconnection 506 has an amount or degree of mass (typically less than about 5 grams) that renders the spring 506 substantially non-heat conductive between the proximal 504 and distal 502 members.

Further in such an apparatus the spring or spring loadable interconnection 506 typically has engagement surfaces 506*es* that engage against complementary opposing engagement surfaces (504*us*, 502*us*) of proximal 504 and distal 502 members having a selected area of engagement (typically less than about 10 mm) that renders spring 506 substantially non-heat conductive between the proximal and distal arms or members.

In such an apparatus the actuator 10 is typically interconnected to a valve pin 17 that is drivable along an axis A, the housing body 12 being mounted in thermally conductive contact with one or more actuator mounts 50, 60, 803 that are mounted on the manifold 20 downstream of the housing body 12 along the axis A, the proximal base 504 of the cooling device 500 being mounted to a surface 12*ls* of the housing body 12 that is spaced laterally 12*ld* from the axis A such that the proximal base or member 504 is spaced laterally apart from contact with the one or more actuator mounts 50, 60, 803, The spring loadable interconnection typically comprises one or more rods or tubes 507, 517*r* slidably mounted to or within one of the proximal base or member 504 and the distal arm or member 502 and rigidly interconnected to the other of the proximal base or member 504 and the distal arm or member 502, the one or more rods or tubes 507, 517*r* transmitting heat between the proximal base or member 504 and the distal arm or member 502, In such an apparatus the distal arm or member can be movable in an axial direction toward and away from the actuator housing 12.

In such an apparatus the distal arm or member can be movable in a lateral or radial direction toward and away from the actuator housing 12.

In such an apparatus, the spring loaded interconnection 506 is typically adapted to urge the distal end surface 502*a* of the distal arm or member into a compression of at least 1 pound per square inch (psi) with the clamp plate.

The clamp plate is preferably mounted in a position in spaced thermal isolation from the manifold and is cooled.

The spring loadable interconnection can comprise a resilient spring 506*a* disposed between a body surface 504*a* of the proximal base or member 504 and the distal arm or member 502, wherein the clamp plate, the mold, the manifold, the actuator and the cooling device are assembled together in an arrangement wherein the spring 506*a* is resiliently compressed up to a maximum of about 3 mm urging the distal end surface 502*a* of the distal arm or member into compressed engagement with the clamp plate 80*a*.

Such an apparatus can include two or more separate cooling devices each comprised of a distal arm or member mounted in spring loadable interconnection to a proximal base or member, each separate cooling device being separately mounted to the housing body 12, 12*a* of the actuator and separately assemblable together with the clamp plate, the mold, the actuator and the manifold such that the distal end surface of the distal arm or member of each separate cooling device is in compressed engagement with the clamp plate under the spring loadable interconnection 506 between each separate distal end arm 502 and proximal base or member 504.

Such an apparatus typically further comprises a mount 803 separating the actuator housing from direct contact with the manifold, the mount being cooled and having an upstream mounting surface in thermally conductive communication with a complementary mounting surface 12*d* of the actuator 10 and a downstream mounting surface in thermally conductive communication with the manifold 20.

The mount is typically comprised of a thermally conductive metal that is cooled to a temperature of less than about 150 degrees F.

The valve pin 17 is preferably mounted to the manifold and extends through a fluid material feed bore 22 in the manifold 20.

The proximal base or member 504 is typically rigidly attached in thermally conductive contact to the laterally spaced surface 12ls the housing body 12, 12a.

The one or more rods or tubes 507 can comprise hollow heat conductive tubes 517ah having a cavity containing a heat conductive fluid and a wick.

In another aspect of the invention there is provided a method of cooling the actuator of the apparatus described immediately above comprising assembling the clamp plate, the mold, the manifold, the actuator and the cooling device of the apparatus such that the spring loadable interconnection is loaded urging the distal end surface of the distal arm or member into compressed engagement with the clamp plate at least upon heating the manifold to an elevated operating temperature.

In another aspect of the invention there is provided an injection molding apparatus (5) comprising a clamp plate (80), a heated manifold (20), an actuator (10), a mold (300) and a cooling device (500) that cools the actuator (10), wherein when assembled the clamp plate (80) and the mold (300) are interconnected and spaced apart from each other, the manifold (20) is disposed between the clamp plate and the mold and the actuator (10) is mounted in thermally conductive communication with the manifold (20), wherein the cooling device 500 comprises:
a heat transmitter comprising a distal arm or member (502) and a proximal base or member (504), the distal arm or member (502) being mounted by a spring loadable interconnection or engagement (506) to or with the proximal base or member (504), the distal arm or member (502) and the proximal base or member (504) being comprised of a thermally conductive material, the distal arm or member (502) having a distal end surface (502a) for engaging the clamp plate (80, 80a) under a spring load and a proximal surface (502b) in sliding heat conductive contact with the actuator (10) for transmitting heat from the proximal surface (502b) to the distal end surface (502a), the actuator (10) comprising a housing body (12, 12a) that is thermally conductive and mounted in thermal communication with the manifold (20), the proximal base or member (504) being mounted in heat conductive contact with the housing body (12) of the actuator (10) in an arrangement wherein the distal end surface (502a) of the movable rod or arm (502) is movable through the spring loadable interconnection (506) toward and away from the actuator (10), the spring loadable interconnection (506) comprising a resiliently deformable elbow (506) integrally formed together with and rigidly interconnecting the proximal base (504) and the distal arm (502), the elbow (506) transmitting heat from the proximal base (504) to the distal arm or member 502, the clamp plate, the mold (300), the manifold, the actuator and the heat transmitter being assemblable together in an arrangement wherein the spring loadable interconnection (506) is loaded urging the distal end surface (502a) of the movable rod or arm (502) into compressed engagement with the clamp plate (80, 80a) at least when the manifold is heated to an elevated operating temperature.

In such an embodiment the housing body 12 is preferably mounted in thermally conductive contact along the axis A to one or more actuator mounts 50, 60, 803 that are mounted downstream in heat conductive communication with or contact with or on the manifold along the axis A, wherein the housing body 12 has a surface 12ls that is spaced laterally 12ld from the axis A, the proximal base or member 504 being mounted in heat conductive contact with and to the lateral surface 12ls such that the proximal base or member 504 is spaced laterally apart from contact with the one or more actuator mounts 50, 60, 803.

In another aspect of the invention there is provided a method of cooling the actuator of the apparatus described immediately above comprising assembling the clamp plate, the mold, the manifold, the actuator and the cooling device of the apparatus described immediately above such that the spring loadable interconnection is loaded urging the distal end surface of the distal arm or member into compressed engagement with the clamp plate at least upon heating the manifold to an elevated operating temperature.

In another aspect of the invention there is provided an injection molding apparatus 5 comprising a clamp plate 80, a heated manifold 20, an actuator 10, a mold 300 and a cooling device 500 that cools the actuator 10, wherein when assembled the clamp plate 80 and the mold 300 are interconnected and spaced apart from each other, the manifold 20 is disposed between the clamp plate and the mold and the actuator 10 is mounted in thermally conductive communication with the manifold 20, wherein the cooling device 500 comprises:
a heat transmitter comprising a distal arm or member 502 and a proximal base or member 504, the distal arm or member 502 being mounted by a spring loadable interconnection or engagement 506 to or with the proximal base or member 504, the distal arm or member 502 being comprised of a thermally conductive material having a distal end surface 502a for engaging the clamp plate 80, 80a under a spring load and a proximal surface 502b in sliding contact with the actuator 10 for transmitting heat from the proximal surface 502b to the distal end surface 502a, the actuator 10 comprising a housing body 12, 12a that is thermally conductive and mounted in thermal communication with the manifold 20, the proximal base or member 504 being mounted to the housing body 12 of the actuator 10 in an arrangement wherein the distal end surface 502a of the movable rod or arm 502 is movable through the spring loadable interconnection 506 toward and away from the actuator 10, the proximal base 504 and the distal arm 502 comprising a unitary solid body of highly heat conductive material, the spring loadable interconnection 506 comprising a resiliently deformable portion 506 of the unitary solid body rigidly interconnecting the proximal base 504 and the distal arm 502, the resiliently deformable portion 506 being resiliently compressible and interconnecting the proximal base 504 to the distal arm or member 502 and transmitting heat from the proximal base or member 504 to the distal arm or member 502, the clamp plate, the mold 300, the manifold, the actuator and the heat transmitter being assemblable together in an arrangement wherein the spring loadable interconnection 506 is loaded urging the distal end surface 502a of the movable rod or arm 502 into compressed engagement with the clamp plate 80, 80a.

In such an apparatus the housing body 12 can be mounted in thermally conductive contact along an axis A to one or more actuator mounts 50, 60, 803 that are mounted downstream in heat conductive communication with or contact with or on the manifold along the axis A, wherein the housing body 12 has a surface 12*ls* that is spaced laterally 12*ld* from the axis A, the proximal base or member 504 being mounted in heat conductive contact with and to the lateral surface 12*ls* such that the proximal base or member 504 is spaced laterally apart from contact with the one or more actuator mounts 50, 60, 803.

In another aspect of the invention there is provided a method of cooling the actuator of the apparatus described immediately above comprising assembling the clamp plate, the mold, the manifold, the actuator and the cooling device of the apparatus such that the spring loadable interconnection is loaded urging the distal end surface of the distal arm or member into compressed engagement with the clamp plate at least upon heating the manifold to an elevated operating temperature.

In another aspect of the invention there is provided an injection molding apparatus 5 comprising a clamp plate 80, a heated manifold 20, an actuator 10, a mold 300 and a cooling device 500 that cools the actuator 10, wherein when assembled the clamp plate 80 and the mold 300 are interconnected and spaced apart from each other, the manifold 20 is disposed between the clamp plate and the mold and the actuator 10 is mounted in thermally conductive communication with the manifold 20, wherein the cooling device 500 comprises:
a heat transmitter comprising a distal arm or member 502 comprised of a rod or tube 502*r* and a proximal base or member 504 comprising a portion of the housing body 12 that is laterally spaced from an axis A along which the valve pin is driven, the actuator 10 comprising a housing body 12, 12*a* that is thermally conductive and mounted in thermal communication with the manifold 20, the rod or tube 502*r* being slidably disposed within a complementary bore 12*bo* disposed within the laterally spaced portion 504 of the housing body 12, the complementary bore 12*bo* and the rod 502*r* being configured such that the exterior surface 502*b* of the rod 502*r* is slidable and engaged in thermally conductive contact against an interior surface 12*si*, 12*asi* of the complementary bore 12*bo*, the distal arm or member 502 being comprised of a thermally conductive material having a distal end surface 502*a* for engaging the clamp plate 80, 80*a* under a spring load exerted by a spring loadable interconnection 506 between the rod 502*r* and the laterally spaced portion 504 of the housing body 12, the clamp plate, the mold 300, the manifold, the actuator and the heat transmitter being assemblable together in an arrangement wherein the spring loadable interconnection 506 is loaded urging the distal end surface 502*a* of the movable rod or tube 502*r* into compressed engagement with the clamp plate 80, 80*a*.

The housing body 12 is preferably mounted in thermally conductive contact along the axis A to one or more actuator mounts 50, 60, 803 that are mounted downstream in heat conductive communication with or contact with or on the manifold along the axis A, the interior surface 12*si*, 12*asi* of the complementary bore 12*bo* being spaced laterally 12*ld* from the axis A, such that the interior surface 12*si*, 12*asi* of the complementary bore 12*bo* is spaced laterally apart from contact with the one or more actuator mounts 50, 60, 803.

A method of cooling the actuator of the apparatus described immediately above comprising assembling the clamp plate, the mold, the manifold, the actuator and the cooling device of the apparatus such that the spring loadable interconnection is loaded urging the distal end surface of the distal arm or member into compressed engagement with the clamp plate at least upon heating the manifold to an elevated operating temperature.

In another aspect of the invention there is provided an injection molding apparatus 5 comprising a clamp plate 80, a heated manifold 20, an actuator 10, a mold 300 and a cooling device 500 that cools the actuator 10, wherein when assembled the clamp plate 80 and the mold 300 are interconnected and spaced apart from each other, the manifold 20 is disposed between the clamp plate and the mold and the actuator 10 is mounted in thermally conductive communication with the manifold 20, wherein the cooling device 500 comprises:
a heat transmitter comprising a distal arm or member 502 and a proximal base or member 504, the distal arm or member 502 being mounted by a spring loadable interconnection or engagement 506 to the proximal base or member 504, the distal arm or member 502 being comprised of a thermally conductive material having a distal end surface 502*a* for engaging the clamp plate 80, 80*a* under a spring load and a proximal surface 502*s* in sliding contact with a surface 12*ls* the actuator 10 for transmitting heat from the proximal surface 502*s* to the distal end surface 502*a*, one or more surfaces 502*s* of the distal arm 502 being slidably engaged with one or more surfaces of the proximal base 504, the proximal base 504 transmitting heat to the distal arm 502 via the slidably engaged surfaces, the actuator 10 comprising a housing body 12, 12*a* that is thermally conductive and mounted in thermal communication with the manifold 20, the proximal base or member 504 being mounted to the housing body 12 of the actuator 10 in an arrangement wherein the distal end surface 502*a* of the movable rod or arm 502 is movable through the spring loadable interconnection 506 toward and away from the actuator 10, the spring loadable interconnection comprising one or more rods or tubes 507, 517*r* slidably mounted to the proximal base or member 504 and interconnected to the distal arm or member 502 transmitting heat from the proximal base or member 504 to the distal arm or member 502, the clamp plate, the mold 300, the manifold, the actuator and the heat transmitter being assemblable together in an arrangement wherein the spring loadable interconnection 506 is loaded urging the distal end surface 502*a* of the movable rod or arm 502 into compressed engagement with the clamp plate 80, 80*a*.

In such an apparatus the housing body 12 is preferably mounted in thermally conductive contact along an axis A along which the valve pin is driven, the housing body being mounted to one or more actuator mounts 50, 60, 803 that are mounted downstream in heat conductive communication with or contact with or on the manifold along the axis A, the surface 12*ls* of the actuator with which the proximal surface 502*s* of the distal member is slidably engaged being being spaced laterally 12*ld* from the axis A, the proximal base or member 504 being mounted in heat conductive contact with and to the lateral surface 12*ls* such that the proximal base or member 504 and the proximal surface 502*s* of the distal member 502 are spaced laterally apart from contact with the one or more actuator mounts 50, 60, 803.

A method of cooling the actuator of the apparatus described immediately above comprising assembling the clamp plate, the mold, the manifold, the actuator and the cooling device of the apparatus such that the spring loadable interconnection is loaded urging the distal end surface of the distal arm or member into compressed engagement with the clamp plate at least upon heating the manifold to an elevated operating temperature.

In another aspect of the invention there is provided an injection molding apparatus 5 comprising a clamp plate 80, a heated manifold 20, an actuator 10, a mold 300 and a cooling device 800 that cools the actuator 10, wherein when assembled the clamp plate 80 and the mold 300 are interconnected and spaced apart from each other, the manifold 20 is disposed between the clamp plate and the mold and the actuator 10 is mounted in thermally conductive communication with the manifold 20, wherein the cooling device 800 comprises:

a heat transmitter comprising a highly heat conductive proximal base 803 and at least one highly heat conductive leg 800l extending a selected upstream longitudinal length UL from the proximal base 803 and forming a reception aperture or recess 800ra in which the actuator 10 is mountable in close proximity to the leg 800l, the one or more legs 800l being formed to include one or more spring joints 800s along the longitudinal length UL that are resiliently deformable under compression to exert a spring force UF along the longitudinal length UL of the one or more legs 800l, the actuator 10 comprising a housing body 12, 12a that is thermally conductive and mounted in thermal communication with the manifold 20, the proximal base 803 being mounted between the actuator 10 and the manifold 20 in an arrangement wherein an upstream distal end surface 800a of the one or more legs 800l is movable through the spring loadable interconnection 506 toward and away from the actuator 10, the clamp plate, the mold 300, the manifold, the actuator and the heat transmitter being assemblable together in an arrangement wherein the one or more spring joints are deformed by engagement between the distal end surface 800a and a surface 80a of the clamp plate 80, the one or more deformed spring joints urging the distal end surface 800a of the cooling device 800 into compressed engagement with the clamp plate 80, 80a.

In another aspect of the invention there is provided a method of cooling the actuator of an apparatus as described immediately above comprising assembling the clamp plate, the mold, the manifold, the actuator and the cooling device of the apparatus such that the spring joints are loaded urging the distal end surfaces of the one or more heat conductive legs into compressed engagement with the clamp plate.

In another aspect of the invention there is provided an injection molding apparatus comprising a clamp plate (80) mounted to a mold (300) in spaced relationship, a heated manifold (20), an actuator (10) comprising a housing body (12), and a cooling device (500) that cools the actuator (10), wherein the manifold (20) is disposed between the clamp plate (80) and the mold (300) and the housing body (12) of the actuator is mounted in thermally conductive communication with the manifold (20), the cooling device (500) comprising:

a heat transmitter comprising a distal arm or member (502) and a proximal base or member (504aa) mounted in heat conductive contact to the housing body (12) of the actuator, the distal arm or member (507m) comprising a rod or tube (507u, 507d) slidably disposed within a complementary bore (504pb, 504pba) disposed within the proximal base or member (504aa), the complementary bore and the rod or tube being configured such that an exterior surface of the rod or tube (507us, 507ds) is slidably engaged in thermally conductive contact with and against an interior surface (504pbsa, 504pbs) of the complementary bore (504pb, 504pba), the rod or tube (507u, 507d) being comprised of a thermally conductive material having a distal end surface (507a), the rod transmitting heat from the proximal arm or member (507m) to the distal end surface via engagement of the exterior surface (507us, 507ds) of the rod with the interior surface (504pbsa, 504pbs) of the complementary bore, the rod (507u, 507d) being mounted within the complementary bore (504pb, 504pba) via a spring loadable interconnection (506) disposed between the proximal base or member (504aa) and the rod (507u, 507d) such that the spring loadable interconnection can exert a spring load between the proximal base or member and the rod, the clamp plate, the mold, the manifold, the actuator and the heat transmitter being assemblable together in an arrangement wherein the spring loadable interconnection (506) is loaded urging the distal end surface (507a) of the rod into compressed engagement with the clamp plate at least when the clamp plate, the mold, the manifold, the actuator and heat transmitter are assembled and the manifold is heated to an elevated operating temperature.

In such an apparatus the spring loadable interconnection 506 typically comprises a spring that has an amount or degree of mass that renders the spring 506 substantially non-heat conductive between the proximal member 504 and the rod 507u, 507d.

The spring or spring loadable interconnection 506 preferably has engagement surfaces 506es that engage against complementary opposing engagement surfaces 504us, 507es of proximal 504 member and rod 507u, 507d having a selected area of engagement that renders spring 506 substantially non-heat conductive between the proximal member and the rod 507u, 507d.

The housing body (12) is preferably mounted in thermally conductive contact along the axis A to one or more actuator mounts (50, 60, 800) that are mounted downstream on the manifold along the axis A, and the housing body (12) has a surface (12ls) that is spaced laterally (12ld) from the axis A, the proximal base or member (504aa) being mounted in heat conductive contact with and to the lateral surface (12ls) such that the proximal base or member (504aa) is spaced laterally apart from contact with the one or more actuator mounts 50, 60, 800.

The clamp plate 80 can include an actuator receiving aperture 80ra and an upstream end plate 80p that is readily attachable to and detachable from the clamp plate 80 in a predetermined mating position disposed upstream of the actuator receiving aperture 80ra, and, the clamp plate 80, the upstream end plate 80p, the manifold 20, the actuator and the heat transmitter are preferably assemblable together in an arrangement wherein the actuator 10 and cooling device 500 are mounted within the actuator receiving aperture 80ra and the spring loadable interconnection 506 is loaded urging the distal end surface 502a of the rod or arm 502, 507m into compressed engagement with the upstream end plate 80*p* when the manifold 20 is heated to an elevated operating temperature.

The clamp plate 80 can include a recess 80*r* formed within the clamp plate 80 that is complementary to the upstream end plate 80*p* such that the upstream end plate is readily receivable within the recess 80*r* and attachable to the clamp plate 80 in the predetermined mating position.

Such an apparatus can further include a second cooling device (500) comprising: a heat transmitter comprising a second distal arm or member (502) and a second proximal base or member (504*aa*) mounted in heat conductive contact to the housing body (12) of the actuator, the second distal arm or member (507*m*) being mounted to the second proximal base or member 504 via a spring loadable interconnection (506*a*) disposed between the second proximal base or member (504*aa*) and the second distal arm or member (502) such that the spring loadable interconnection can exert a spring load between the second proximal base or member and the second distal arm or member, the second proximal base or member (504*aa*) having an engagement surface (504*is*) and the second distal arm or member (502) having one or more complementary engagement surfaces (502*s*), the engagement surface (504*is*) and the complementary engagement surface (502*s*) being adapted to be disposed in sliding contact with each other for transmitting heat from the second proximal base or member (504*aa*) to the second distal arm or member 502

In another aspect of the invention there is provided a method of cooling the actuator of the apparatus according to any of the foregoing claims comprising assembling the clamp plate, the mold, the manifold, the actuator and the cooling device of the apparatus such that the spring loadable interconnection is loaded urging the distal end surface of the rod into compressed engagement with the clamp plate.

In another aspect of the invention there is provided a method of cooling an actuator in an injection molding apparatus comprising a clamp plate (80) mounted to a mold (300) in spaced relationship, a heated manifold (20), an actuator (10) comprising a housing body (12), and a cooling device (500) that cools the actuator (10), wherein the manifold (20) is disposed between the clamp plate (80) and the mold (300) and the housing body (12) of the actuator is mounted in thermally conductive communication with the manifold (20), the method comprising:
mounting a cooling device (500) to a lateral surface (12*ls*) of a housing (12) of the actuator (10), the cooling device (500) comprising a distal arm or member (502) and a proximal base or member (504*aa*) mounted in heat conductive contact to the housing body (12) of the actuator,
wherein the distal arm or member (507*m*) comprises a rod (507*u*, 507*d*) slidably disposed within a complementary bore (504*pb*, 504*pba*) disposed within the proximal base or member (504*aa*), the complementary bore and the rod being configured such that an exterior surface of the rod (507*us*, 507*ds*) is slidably engaged in thermally conductive contact with and against an interior surface (504*pbsa*, 504*pbs*) of the complementary bore (504*pb*, 504*pba*),
the rod (507*u*, 507*d*) being comprised of a thermally conductive material having a distal end surface (507*a*), the rod transmitting heat from the proximal arm or member (507*m*) to the distal end surface via engagement of the exterior surface (507*us*, 507*ds*) of the rod with the interior surface (504*pbsa*, 504*pbs*) of the complementary bore,
the rod (507*u*, 507*d*) being mounted within the complementary bore (504*pb*, 504*pba*) via a spring loadable interconnection (506) disposed between the proximal base or member (504*aa*) and the rod (507*u*, 507*d*) such that the spring loadable interconnection can exert a spring load between the proximal base or member and the rod,
assembling the clamp plate, the mold, the manifold, the actuator and the heat transmitter together in an arrangement wherein the spring loadable interconnection (506) is loaded urging the distal end surface (507*a*) of the rod into compressed engagement with the clamp plate at least when the clamp plate, the mold, the manifold, the actuator and heat transmitter are assembled and the manifold is heated to an elevated operating temperature.

In another aspect of the invention there is provided an injection molding apparatus comprising a clamp plate (80) mounted to a mold (300) in spaced relationship, a heated manifold (20), an actuator (10) comprising a housing body (12), and a cooling device (500) that cools the actuator (10), wherein the manifold (20) is disposed between the clamp plate (80) and the mold (300) and the housing body (12) of the actuator is mounted in thermally conductive communication with the manifold (20), the cooling device (500) comprising:
a heat transmitter comprising a distal arm or member (502) and a proximal base or member (504*aa*) mounted in heat conductive contact to the housing body (12) of the actuator,
the distal arm or member (507*m*) being mounted to the proximal base or member 504 via a spring loadable interconnection (506*a*) disposed between the proximal base or member (504*aa*) and the distal arm or member (502) such that the spring loadable interconnection can exert a spring load between the proximal base or member and the distal arm or member,
the proximal base or member (504*aa*) having an engagement surface (504*is*) and the distal arm or member (502) having one or more complementary engagement surfaces (502*s*), the engagement surface (504*is*) and the complementary engagement surface (502*s*) being adapted to be disposed in sliding contact with each other for transmitting heat from the proximal base or member (504*aa*) to the distal arm or member 502,
the clamp plate, the mold, the manifold, the actuator and the heat transmitter being assemblable together in an arrangement wherein the spring loadable interconnection (506) is loaded urging the distal end surface (502*a*) of the distal arm or member (502) into compressed engagement with the clamp plate at least when the clamp plate, the mold, the manifold, the actuator and heat transmitter are assembled and the manifold is heated to an elevated operating temperature.

In such an apparatus the spring loadable interconnection 506 preferably comprises a spring that has an amount or degree of mass that renders the spring 506 substantially non-heat conductive between the proximal member 504 and the rod 507*u*, 507*d*.

The spring or spring loadable interconnection 506 preferably has engagement surfaces 506*es* that engage against complementary opposing engagement surfaces 504*us*, 507*es* of proximal 504 member and rod 507*u*, 507*d* having a selected area of engagement that renders spring 506 substantially non-heat conductive between the proximal member and the rod 507u, 507d.

The housing body (12) is typically mounted in thermally conductive contact along the axis A to one or more actuator mounts (50, 60, 800) that are mounted downstream on the manifold along the axis A, and the housing body (12) having a surface (12ls) that is spaced laterally (12ld) from the axis A, the proximal base or member (504aa) being mounted in heat conductive contact with and to the lateral surface (12ls) such that the proximal base or member (504aa) is spaced laterally apart from contact with the one or more actuator mounts 50, 60, 800.

The clamp plate 80 can include an actuator receiving aperture 80ra and an upstream end plate 80p that is readily attachable to and detachable from the clamp plate 80 in a predetermined mating position disposed upstream of the actuator receiving aperture 80ra, and, the clamp plate 80, the upstream end plate 80p, the manifold 20, the actuator and the heat transmitter are assemblable together in an arrangement wherein the actuator 10 and cooling device 500 are mounted within the actuator receiving aperture 80ra and the spring loadable interconnection 506 is loaded urging the distal end surface 502a of the rod or arm 502, 507m into compressed engagement with the upstream end plate 80p when the manifold 20 is heated to an elevated operating temperature.

The clamp plate 80 preferably includes a recess 80r formed within the clamp plate 80 that is complementary to the upstream end plate 80p such that the upstream end plate is readily receivable within the recess 80r and attachable to the clamp plate 80 in the predetermined mating position.

In another aspect of the invention there is provided a method of cooling the actuator of the apparatus comprising assembling the clamp plate, the mold, the manifold, the actuator and the cooling device of the apparatus such that the spring loadable interconnection is loaded urging the distal end surface of the rod into compressed engagement with the clamp plate.

In another aspect of the invention there is provided a method of cooling an actuator in an injection molding apparatus comprising a clamp plate (80) mounted to a mold (300) in spaced relationship, a heated manifold (20), an actuator (10) comprising a housing body (12), and a cooling device (500) that cools the actuator (10), wherein the manifold (20) is disposed between the clamp plate (80) and the mold (300) and the housing body (12) of the actuator is mounted in thermally conductive communication with the manifold (20), the method comprising:
mounting a cooling device (500) to the housing (12) of the actuator (10), the cooling device comprising a heat transmitter comprising a distal arm or member (502) and a proximal base or member (504aa) mounted in heat conductive contact to the housing body (12) of the actuator,
the distal arm or member (507m) being mounted to the proximal base or member 504 via a spring loadable interconnection (506a) disposed between the proximal base or member (504aa) and the distal arm or member (502) such that the spring loadable interconnection can exert a spring load between the proximal base or member and the distal arm or member,
the proximal base or member (504aa) having an engagement surface (504is) and the distal arm or member (502) having one or more complementary engagement surfaces (502s), the engagement surface (504is) and the complementary engagement surface (502s) being adapted to be disposed in sliding contact with each other for transmitting heat from the proximal base or member (504aa) to the distal arm or member 502,
assembling the clamp plate, the mold, the manifold, the actuator and the heat transmitter together in an arrangement wherein the spring loadable interconnection (506) is loaded urging the distal end surface (502a) of the distal arm or member (502) into compressed engagement with the clamp plate at least when the clamp plate, the mold, the manifold, the actuator and heat transmitter are assembled and the manifold is heated to an elevated operating temperature.

In another aspect of the invention there is provided an injection molding apparatus comprising a clamp plate (80) mounted to a mold (300) in spaced relationship, a heated manifold (20), an actuator (10) interconnected to and driving a valve pin (17), the actuator (10) comprising a housing body (12), and a cooling device (500) that cools the actuator (10), wherein the manifold (20) is disposed between the clamp plate (80) and the mold (300) and the housing body (12) of the actuator is mounted in thermally conductive communication with the manifold (20), the cooling device (500) comprising:
a heat transmitter comprising a distal arm or member (502) and a proximal base or member (504aa) mounted in heat conductive contact to the housing body (12) of the actuator,
the distal arm or member (507m) comprising a rod (507u, 507d) slidably disposed within a complementary bore (504pb, 504pba) disposed within the proximal base or member (504aa), the complementary bore and the rod being configured such that an exterior surface of the rod (507us, 507ds) is slidably engaged in thermally conductive contact with and against an interior surface (504pbsa, 504pbs) of the complementary bore (504pb, 504pba),
the rod (507u, 507d) being comprised of a thermally conductive material having a distal end surface (507a), the rod transmitting heat from the proximal arm or member (507m) to the distal end surface via engagement of the exterior surface (507us, 507ds) of the rod with the interior surface (504pbsa, 504pbs) of the complementary bore,
the rod (507u, 507d) being mounted within the complementary bore (504pb, 504pba) via a spring loadable interconnection (506) to the proximal base or member (504aa),
the clamp plate, the mold, the manifold, the actuator and the heat transmitter being assemblable together in an arrangement wherein the spring loadable interconnection (506) is loaded urging the distal end surface (507a) of the rod into compressed engagement with the clamp plate when the clamp plate, the mold, the manifold, the actuator and heat transmitter are assembled into an operating assembly.

In such an apparatus the housing body (12) is preferably mounted in thermally conductive contact along an axis A along which the valve pin (17) is driven to one or more actuator mounts (50, 60, 803) that are mounted downstream in heat conductive communication with or contact with or on the manifold along the axis A, and the housing body (12) having a surface (12ls) that is spaced laterally (12ld) from the axis A, the proximal base or member (504aa) being mounted in heat conductive contact with and to the lateral surface (12ls) such that the proximal base or member (504aa) is spaced laterally apart from contact with the one or more actuator mounts 50, 60, 803.

In such an apparatus the clamp plate 80 can include an actuator receiving aperture 80ra and an upstream end plate 80p that is readily attachable to and detachable from the clamp plate 80 in a predetermined mating position disposed upstream of the actuator receiving aperture 80ra, and, the clamp plate 80, the upstream end plate 80p, the manifold 20, the actuator and the heat transmitter being assemblable together in an arrangement wherein the actuator 10 and cooling device 500 are mounted within the actuator receiving aperture 80ra and the spring loadable interconnection 506 is loaded urging the distal end surface 502a of the rod or arm 502, 507m into compressed engagement with the upstream end plate 80p when the manifold 20 is heated to an elevated operating temperature.

The clamp plate 80 can include a recess 80r formed within the clamp plate 80 that is complementary to the upstream end plate 80p such that the upstream end plate is readily receivable within the recess 80r and attachable to the clamp plate 80 in the predetermined mating position.

The spring loadable interconnection 506 is preferably loaded urging the distal end surface of the rod into compressed engagement with the clamp plate when the manifold is heated to an elevated operating temperature.

In another aspect of the invention there is provided a method of cooling the actuator of the apparatus described immediately above comprising assembling the clamp plate, the mold, the manifold, the actuator and the cooling device of the apparatus such that the spring loadable interconnection is loaded urging the distal end surface of the rod into compressed engagement with the clamp plate.

In another aspect of the invention there is provided an injection molding apparatus 5 comprising:
a clamp plate 80, a heated manifold 20, an actuator 10 interconnected to and driving a valve pin along an axis A, a mold 300 and a cooling device 500 that cools the actuator 10, wherein when assembled the clamp plate 80 and the mold 300 are interconnected and spaced apart from each other, the manifold 20 is disposed between the clamp plate and the mold and the actuator 10 is mounted in thermally conductive communication with the manifold 20,
wherein the cooling device 500 comprises:
a heat transmitter comprising a distal arm or member 502 and a proximal base or member 504, the distal arm or member or member 502 being mounted by a spring loadable interconnection or engagement 506 to or with the proximal base or member 504, the distal arm or member 502 being comprised of a thermally conductive material having a distal end surface 502a for engaging the clamp plate 80, 80a under a spring load and a proximal surface 502b for transmitting heat from the proximal surface to the distal end surface 502a,
wherein one or more heat conductive tubes containing a heat conductive fluid are embedded within one or the other of the proximal 504 or distal 502 members.
the actuator 10 comprising a housing body 12, 12a that is thermally conductive and mounted in thermal communication with the manifold 20,
the proximal base or member 504 being mounted to the housing body 12 of the actuator 10 in an arrangement wherein the distal end surface 502a of the distal arm or member 502 is movable through the spring loadable interconnection 506 toward and away from the actuator 10,
the clamp plate, the mold 300, the manifold, the actuator and the heat transmitter being assemblable together in an arrangement wherein the spring loadable interconnection 506 is loaded urging the distal end surface 502a of the distal arm or member 502 into compressed engagement with the clamp plate 80, 80a.

In such an apparatus:
the housing body 12 is typically mounted in thermally conductive contact along the axis A to one or more actuator mounts 50, 60, 803 that are mounted downstream in heat conductive communication with or contact with or on the manifold along the axis A, and
wherein the housing body 12 has a surface 12ls that is spaced laterally 12ld from the axis A, the proximal base or member 504 being mounted in heat conductive contact with and to the lateral surface 12ls such that the proximal base or member 504 is spaced laterally apart from contact with the one or more actuator mounts 50, 60, 803

In another aspect of the invention there is provided a method of cooling the actuator of the apparatus described immediately above comprising assembling the clamp plate, the mold, the manifold, the actuator and the cooling device of the apparatus of described immediately above such that the spring loadable interconnection is loaded urging the distal end surface of the distal arm or member into compressed engagement with the clamp plate at least upon heating the manifold to an elevated operating temperature.

In accordance with the invention there is provided an injection molding apparatus 5 comprising a clamp plate 80, a heated manifold 20, an actuator 10, a mold 300 and a cooling device 500 that cools the actuator 10, wherein when assembled the clamp plate 80 and the mold 300 are interconnected and spaced apart from each other, the manifold 20 is disposed between the clamp plate and the mold and the actuator 10 is mounted in thermally conductive communication with the manifold 20,
wherein the cooling device 500 comprises:
a heat transmitter comprising a distal arm or member 502 and a proximal base or member 504, the distal arm or member or member 502 being mounted by a spring loadable interconnection or engagement 506 to or with the proximal base or member 504, the distal arm or member 502 being comprised of a thermally conductive material having a distal end surface 502a for engaging the clamp plate 80, 80a under a spring load and a proximal surface 502b for transmitting heat from the proximal surface to the distal end surface 502a,
the actuator 10 comprising a housing body 12, 12a that is thermally conductive and mounted in thermal communication with the manifold 20,
the proximal base or member 504 being mounted to the housing body 12 of the actuator 10 in an arrangement wherein the distal end surface 502a of the distal arm or member 502 is movable through the spring loadable interconnection 506 toward and away from the actuator 10,
the clamp plate, the mold 300, the manifold, the actuator and the heat transmitter being assemblable together in an arrangement wherein the spring loadable interconnection 506 is loaded urging the distal end surface 502a of the distal arm or member 502 into compressed engagement with the clamp plate 80, 80a.

One or more heat conductive tubes 517a, 517b, 517c, 517d can be embedded within one or the other or both of the proximal 504 or distal 502 members.

The distal 502 and proximal 504 members are typically heat transmissively interconnected or engaged with each other by heat transmissive rods 507 or tubes 517r that are intimately engaged with the members.

One or more heat conductive tubes 517ah can be embedded within the body of the housing of the actuator 10, 12. Such tubes typically contain a heat conductive fluid and a wick that facilitates flow of the heat conductive fluid within the hollow cavity of the tube.

The distal arm or member can have an proximal exterior surface 502b that is adapted to be engaged and slidable against a laterally disposed complementary surface 12ls, 12as of the housing body 12, 12a of the actuator 10 such that heat thermally conducts between the housing body 12, 12a and the distal arm or member 502, the distal end surface 502a of the distal arm or member being movable toward and away from the actuator 10 by sliding movement of the proximal exterior surface 502b of the distal arm or member 502 on the complementary laterally disposed surface 12ls, 12as of the actuator.

The spring loaded interconnection 506 preferably urges the distal end surface 502a of the distal arm or member into a compression of at least 1 pound per square inch (psi) with the clamp plate.

The clamp plate is typically mounted in a position in spaced thermal isolation from the manifold.

The clamp plate can be cooled.

The cooling device 500 typically includes a spring 506a disposed between a body surface 504a of the proximal base or member 504 and the distal arm or member 502, wherein the clamp plate, the mold, the manifold, the actuator and the cooling device are assembled together in an arrangement wherein the spring 506a is compressed urging the distal end surface 502a of the distal arm or member into compressed engagement with the clamp plate 80a.

The apparatus can include two or more separate cooling devices each comprised of a distal arm or member mounted in spring loadable interconnection to a proximal base or member, each separate cooling device being separately mounted to the housing body 12, 12a of the actuator and separately assemblable together with the clamp plate, the mold, the actuator and the manifold such that the distal end surface of the distal arm or member of each separate cooling device is in compressed engagement with the clamp plate under the spring loadable interconnection 506 between each separate distal end arm 502 and proximal base or member 504.

The apparatus can further comprise a mount 50 separating the actuator housing from direct contact with the manifold, the mount being cooled and having a first mounting surface 50a in thermally conductive communication with a complementary mounting surface 12m of the actuator 10 and a second mounting surface 50b in thermally conductive communication with a complementary mounting surface 20s of the manifold 20.

The mount is preferably comprised of a thermally conductive metal that is cooled to a temperature of less than about 150 degrees F.

The actuator can be interconnected to a valve pin that is mounted to the manifold and extends through a fluid material feed bore in the manifold.

The proximal base or member 54 is preferably attached in thermally conductive contact with the housing body 12, 12a.

The distal arm or member and proximal base or member can comprise a unitary thermally conductive body 503 with at least the distal arm or member 502 being movably deformed on assembly of the clamp plate, the mold, the manifold, the actuator and the heat transmitter in an arrangement wherein the spring loadable interconnection is loaded urging the distal end surface of the distal arm or member into compressed engagement with the clamp plate.

The distal arm or member and the proximal base or member can comprise a unitary body 503 where at least the proximal base or member 504 is attached in thermally conductive contact 504s with the housing body 12ls, 12.

The distal arm or member 502, 502b can be attached such that the arm 502, 502b is in thermally conductive contact with the housing body 12ls, 12as.

The distal arm or member can comprise a rod 502r slidably disposed within a complementary bore 12bo disposed within the housing body 12, 12a, the complementary bore 12bo and the rod 502r being configured such that the exterior surface 502b of the rod 502r is slidable and engaged in thermally conductive contact against an interior surface 12si, 12asi of the complementary bore 12bo.

In another aspect of the invention there is provided a method of cooling the actuator of the apparatus described above comprising assembling the clamp plate, the mold, the manifold, the actuator and the cooling device of the apparatus described above such that the spring loadable interconnection is loaded urging the distal end surface of the distal arm or member into compressed engagement with the clamp plate at least upon heating the manifold to an elevated operating temperature.

In another aspect of the invention there is provided an injection molding apparatus comprising a clamp plate, a heated manifold, an actuator, a mold and a cooling device that cools the actuator, wherein when assembled the clamp plate and the mold are interconnected and spaced apart from each other, the manifold is disposed between the clamp plate and the mold and the actuator is mounted in thermally conductive communication with the manifold, wherein the cooling device comprises:

a heat transmitter comprising a distal arm or member and a proximal base or member, the distal arm or member being mounted by a spring loadable interconnection to the proximal base or member, the distal arm or member being comprised of a thermally conductive material having a distal end surface for engaging the clamp plate under a spring load and a proximal surface for transmitting heat from the proximal surface to the distal end, the actuator comprising a housing body that is thermally conductive and mounted in thermal communication with the manifold, the proximal base or member being mounted to the housing body of the actuator in an arrangement wherein the distal end surface of the distal arm or member is movable through the spring loadable interconnection toward and away from the actuator, the distal arm or member being mounted to the proximal base or member in an arrangement such that an exterior surface of the distal arm or member is disposed in slidable contact engagement with a complementary surface of the housing body, the clamp plate, the mold, the manifold, the actuator and the heat transmitter being assemblable together in an arrangement wherein the spring loadable interconnection is loaded urging the distal end surface of the distal arm or member into compressed engagement with the clamp plate, the exterior surface of the distal arm or member sliding along the complementary surface of the housing body on assembly of the clamp plate, the mold, the actuator and the cooling device.

In another aspect of the invention there is provided a method of cooling the actuator of the apparatus described immediately above comprising assembling the clamp plate, the mold, the manifold, the actuator and the cooling device of the apparatus of described immediately above such that the spring loadable interconnection is loaded urging the distal end surface of the distal arm or member into compressed engagement with the clamp plate at least upon heating the manifold to an elevated operating temperature.

In another aspect of the invention there is provided an injection molding apparatus comprising a clamp plate, a heated manifold, an actuator, a mold and a cooling device that cools the actuator, wherein when assembled the clamp plate and the mold are interconnected and spaced apart from each other, the manifold is disposed between the clamp plate and the mold and the actuator is mounted in thermally conductive communication with the manifold, wherein the cooling device comprises:
a heat transmitter comprising a distal arm or member and a proximal base or member, the distal arm or member being mounted by a spring loadable interconnection to the proximal base or member, the distal arm or member being comprised of a thermally conductive material having a distal end surface for engaging the clamp plate under a spring load and a proximal surface for transmitting heat from the proximal surface to the distal end;
the actuator comprising a housing body that is thermally conductive and mounted in thermal communication with the manifold;
the clamp plate, the mold, the manifold, the actuator and the heat transmitter being assemblable together in an arrangement wherein the spring loadable interconnection is loaded urging the distal end surface of the distal arm or member into compressed engagement with the clamp plate,
the distal arm or member and proximal base or member comprising a unitary thermally conductive body in which the spring loadable interconnection comprises a resilient deformability inherent in the unitary body, the distal arm or member being movably resiliently deformed on assembly of the clamp plate, the mold, the manifold, the actuator and the heat transmitter in an arrangement wherein the resilient deformation of the unitary body urges the distal end surface of the distal arm or member into compressed engagement with the clamp plate.

In another aspect of the invention there is provided a method of cooling the actuator of the apparatus described immediately above comprising assembling the clamp plate, the mold, the manifold, the actuator and the cooling device of the apparatus such that the unitary body resiliently deforms urging the distal end surface of the distal arm or member into compressed engagement with the clamp plate.

In another aspect of the invention there is provided an injection molding apparatus comprising a clamp plate, a heated manifold, an actuator, a mold and a cooling device that cools the actuator, wherein when assembled the clamp plate and the mold are interconnected and spaced apart from each other, the manifold is disposed between the clamp plate and the mold and the actuator is mounted in thermally conductive communication with the manifold, wherein the cooling device comprises:
a heat transmitter comprising a distal arm or member and a proximal base or member, the distal arm or member being mounted by a spring loadable interconnection to the proximal base or member, the distal arm or member being comprised of a thermally conductive material having a distal end surface for engaging the clamp plate under a spring load and a proximal surface for transmitting heat from the proximal surface to the distal end,
the actuator comprising a housing body that is thermally conductive and mounted in thermal communication with the manifold,
the proximal base or member being mounted to the housing body of the actuator in an arrangement wherein the distal end surface of the distal arm or member is movable through the spring loadable interconnection toward and away from the actuator,
the distal arm or member comprising a rod slidably disposed within a complementary bore disposed within the housing body, the complementary bore and the rod being configured such that the exterior surface of the rod is slidable and engaged in thermally conductive contact against an interior surface of the complementary bore.
the clamp plate, the mold, the manifold, the actuator and the heat transmitter being assemblable together in an arrangement wherein the spring loadable interconnection is loaded urging the distal end surface of the distal arm or member into compressed engagement with the clamp plate.

In another aspect of the invention there is provided a method of cooling the actuator of the apparatus described immediately above comprising assembling the clamp plate, the mold, the manifold, the actuator and the cooling device of the apparatus such that the spring loadable interconnection is loaded urging the distal end surface of the distal arm or member into compressed engagement with the clamp plate at least upon heating the manifold to an elevated operating temperature.

In accordance with the invention there is also provided an injection molding apparatus 5 comprising a clamp plate 80, a heated manifold 20, an actuator 10, a mold 300 and a cooling device 500 that cools the actuator 10, wherein when assembled the clamp plate 80 and the mold 300 are interconnected and spaced apart from each other, the manifold 20 is disposed between the clamp plate and the mold and the actuator 10 is mounted in thermally conductive communication with the manifold 20, wherein the cooling device 500 comprises:
a heat transmitter comprising a distal arm or member 502 and a proximal base or member 504, the distal arm or member 502 being mounted by a spring loadable interconnection or engagement 506 to or with the proximal base or member 504, the distal arm or member 502 being comprised of a thermally conductive material having a distal end surface 502a for engaging the clamp plate 80, 80a under a spring load and a proximal surface 502b for transmitting heat from the proximal surface to the distal end surface 502a,
wherein one or more heat conductive tubes are embedded within one or the other or both of the proximal 504 or distal 502 members.
the actuator 10 comprising a housing body 12, 12a that is thermally conductive and mounted in thermal communication with the manifold 20,
the proximal base or member 504 being mounted to the housing body 12 of the actuator 10 in an arrangement wherein the distal end surface 502a of the distal arm or member 502 is movable through the spring loadable interconnection 506 toward and away from the actuator 10,
the clamp plate, the mold 300, the manifold, the actuator and the heat transmitter being assemblable together in an arrangement wherein the spring loadable interconnection 506 is loaded urging the distal end surface 502a of the distal arm or member 502 into compressed engagement with the clamp plate 80, 80*a*.

In accordance with the invention there is also provided a method of cooling the actuator of the apparatus described immediately above comprising assembling the clamp plate, the mold, the manifold, the actuator and the cooling device of the apparatus described above such that the spring loadable interconnection is loaded urging the distal end surface of the distal arm or member into compressed engagement with the clamp plate at least upon heating the manifold to an elevated operating temperature.

In another aspect of the invention there is provided an injection molding apparatus 5 comprising a clamp plate 80, a heated manifold 20, an actuator 10, a mold 300 and a cooling device 500 that cools the actuator 10, wherein when assembled the clamp plate 80 and the mold 300 are interconnected and spaced apart from each other, the manifold 20 is disposed between the clamp plate and the mold and the actuator 10 is mounted in thermally conductive communication with the manifold 20, wherein the cooling device 500 comprises:
a heat transmitter comprising a movable rod or arm 502, 507 and a proximal base or member 504*aa*, the rod or arm 502, 507 being mounted by a spring loadable interconnection or engagement 506 to or with the proximal base or member 504*aa*, the movable rod or arm 502, 507 being comprised of a thermally conductive material having a distal end surface 502*a* for engaging the clamp plate 80, 80*a* under a spring load and one or more surfaces 502*s*, 507*ds*, 507*us* in sliding contact with one or more surfaces 504*pbs*, 504*pba*, 504*is* of the proximal base 504*aa* for transmitting heat from the one or more surfaces 504*pbs*, 504*pba*, 504*is* to the distal end surface 502*a*,
the actuator 10 comprising a housing body 12, 12*a* that is thermally conductive and mounted in thermal communication with the manifold 20,
the proximal base or member 504 being mounted to the housing body 12 of the actuator 10 in an arrangement wherein the distal end surface 502*a* of the movable rod or arm 502 is movable through the spring loadable interconnection 506 toward and away from the actuator 10,
the clamp plate, the mold 300, the manifold, the actuator and the heat transmitter being assemblable together in an arrangement wherein the spring loadable interconnection 506 is loaded urging the distal end surface 502*a* of the movable rod or arm 502, 507*m* into compressed engagement with the clamp plate 80, 80*a*.

In another aspect of the invention there is provided a method of cooling the actuator of the apparatus described immediately above comprising assembling the clamp plate, the mold, the manifold, the actuator and the cooling device of the apparatus such that the spring loadable interconnection is loaded urging the distal end surface of the movable rod or arm into compressed engagement with the clamp plate.

The clamp plate 80 of the apparatuses 5 described above can include an actuator receiving aperture 80*ra* and an upstream end plate 80*p* that is readily attachable to and detachable from the clamp plate 80 in a mating position disposed upstream of the actuator receiving aperture 80*ra* wherein the actuator receiving aperture, the mating position, the clamp plate 80 and the manifold 20 are adapted such that when the actuator 10 with the cooling devices 500 mounted to the actuator is received within the actuator receiving aperture 80*ra* and mounted to the manifold 20, the distal end surfaces 502*a* of the heat transmitters 502 are engaged with the upstream end plate 80*p* when the upstream end plate 80*p* is attached to the clamp plate in the mating position.

The clamp plate 80 can include a recess 80*r* formed within the clamp plate 80 that is complementary to the upstream end plate 80*p* such that the upstream end plate is receivable within the recess 80*r* and disposed and held in the mating position for stable attachment to the clamp plate 80.

In another aspect of the invention there is provided an injection molding apparatus 5 comprising a clamp plate 80, a heated manifold 20, an actuator 10, a mold 300 and a cooling device 800 that cools the actuator 10, wherein when assembled the clamp plate 80 and the mold 300 are interconnected and spaced apart from each other, the manifold 20 is disposed between the clamp plate and the mold and the actuator 10 is mounted in thermally conductive communication with the manifold 20, wherein the cooling device 800 comprises:
a heat transmitter comprising a highly heat conductive proximal base 803 and at least one highly heat conductive leg 800*l* extending a selected upstream longitudinal length UL from the proximal base 803 and forming a reception aperture or recess 800*ra* in which the actuator 10 is mountable in close proximity to the leg 800*l*, the one or more legs 800*l* being formed to include one or more spring joints 800*s* along the longitudinal length UL that are resiliently deformable under compression to exert a spring force UF along the longitudinal length UL of the one or more legs 800*l*,
the actuator 10 comprising a housing body 12, 12*a* that is thermally conductive and mounted in thermal communication with the manifold 20,
the proximal base 803 being mounted between the actuator 10 and the manifold 20 in an arrangement wherein an upstream distal end surface 800*a* of the one or more legs 800*l* is movable through the spring loadable interconnection 506 toward and away from the actuator 10,
the clamp plate, the mold 300, the manifold, the actuator and the heat transmitter being assemblable together in an arrangement wherein the one or more spring joints are deformed by engagement between the distal end surface 800*a* and a surface 80*a* of the clamp plate 80, the one or more deformed spring joints urging the distal end surface 800*a* of the cooling device 800 into compressed engagement with the clamp plate 80, 80*a*.

BRIEF DESCRIPTION OF THE DRAWINGS

The above and further advantages of the invention may be better understood by referring to the following description in conjunction with the accompanying drawings in which:

FIG. 5 is a fragmentary front view as seen along lines 5-5 of FIG. 2. FIG. 5A is a cross-sectional view taken along lines 5A-5A of FIG. 5.

FIG. 5B is a front view similar to FIG. 5 but showing the heat convector and actuator in use with clamping plate installed.

FIG. 5C is a cross-sectional side view taken along lines 5C-5C of FIG. 5A.

FIG. 6 is a front view similar to FIG. 5 but showing the slidable rods affixed to the lower heat transmitting element.

FIG. 6A is a cross-sectional side view taken along lines 6A-6A of FIG. 6.

DETAILED DESCRIPTION

Figure 1:
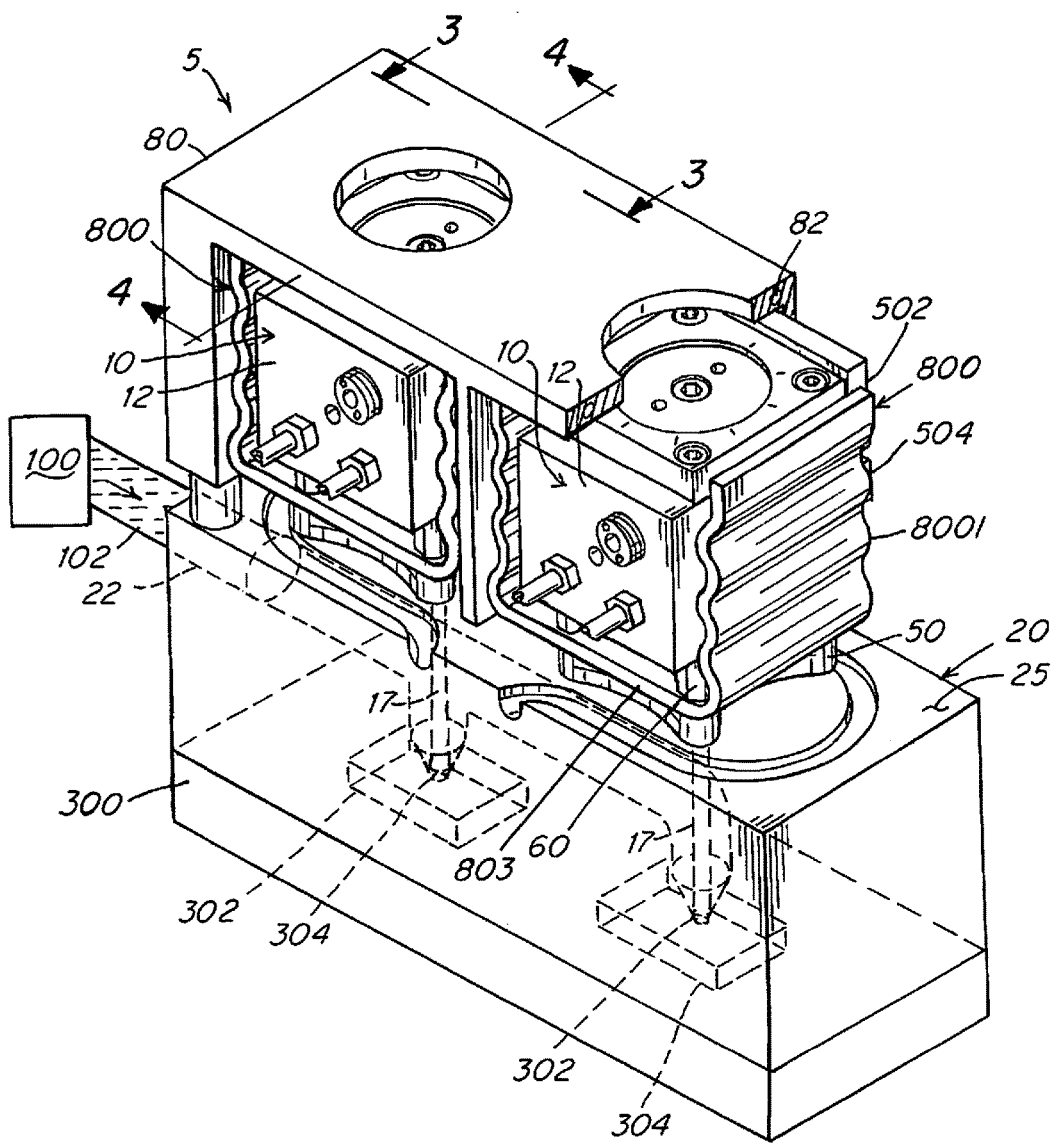
FIG. 1 is a top perspective view of an assembly of a top clamp plate, a heated manifold and a pair of actuators mounted on the heated manifold, each actuator having a housing and heat convectors mounted in an arrangement according to one embodiment of the invention.
Figure 2:
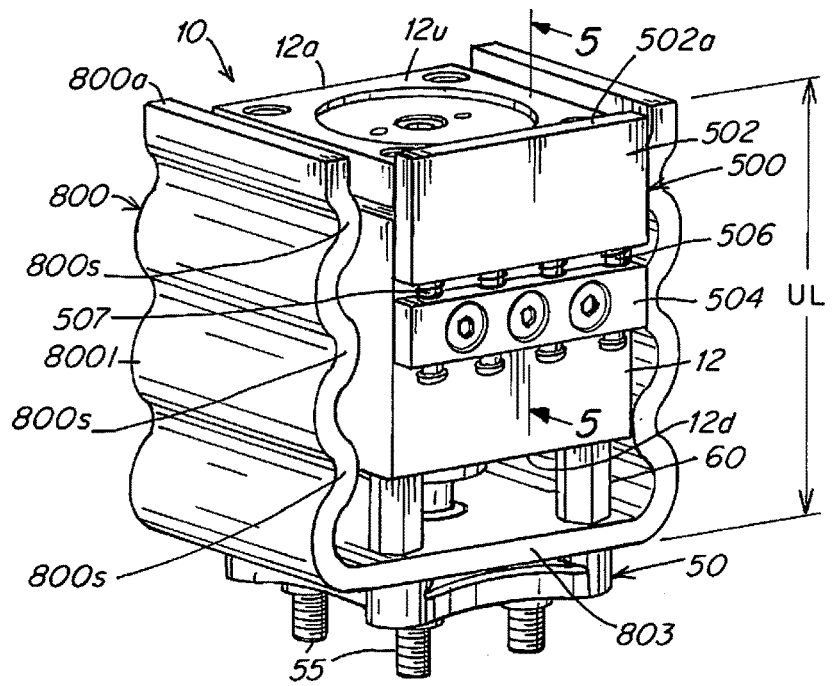
FIG. 2 is a front perspective view of one of the actuators of the FIG. 1 assembly.
Figure 3:
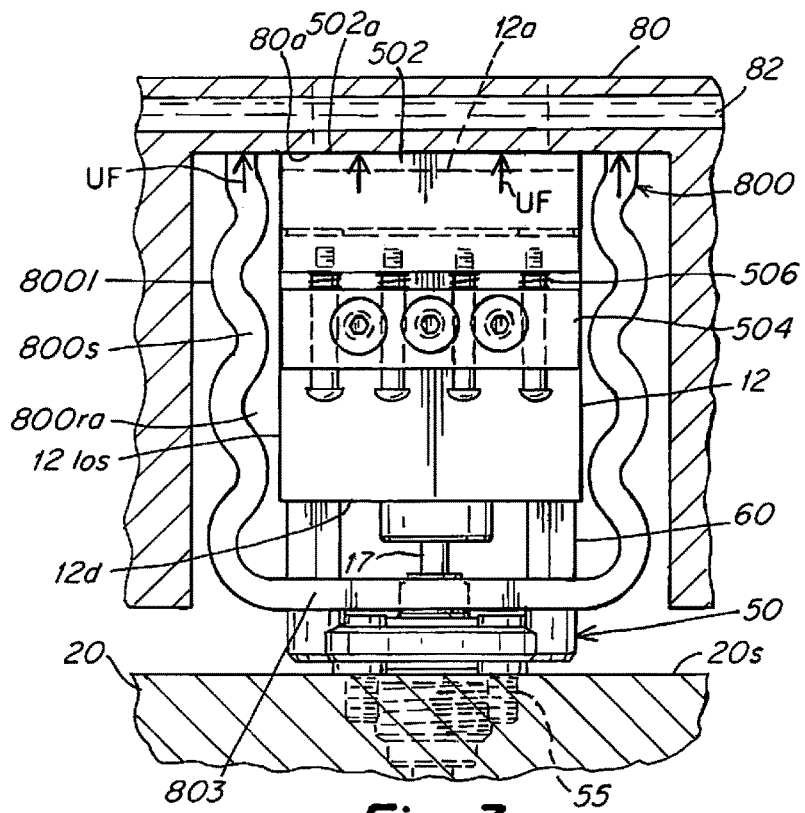
FIG. 3 is a sectional view taken along lines 3-3 of FIG. 1.

In the FIGS. 1-3 embodiment, the apparatus 5 includes a cooling device 800 that is formed having a proximal mount 803 that is mounted between the downstream end of the actuator housing 12 and the heated manifold 20. A pair of upstream extending legs 800*l* extend upstream from the mount 803. The cooling device 800 is formed and adapted to form a reception aperture or recess 800*ra* that is complementary to and receives the actuator housing 12 such that the legs 800*l* are disposed in close proximity to the lateral outer surfaces 12*los* of the actuator housing 12. The legs 800*l* are formed to have an upstream extending longitudinal length UL that disposes the distal-most edge surface 800*a* of the legs 800*l* upstream beyond the upstream-most extending surface 12*u* of the actuator 10 when the actuator 10 is mounted in operating format within the reception aperture 800*ra*. The legs 800*l* are configured to have one or spring joints 800*s* along the longitudinal length UL of the legs 800*l*. Spring joints 800*s* are resiliently deformable such that when the legs 800*l* are subject to a compressive force along the longitudinal length UL of the legs 800*l*, the spring joints exert a spring force UF. The longitudinal length UL of the legs 800*l*, the clamp plate 80, manifold 20, actuator housing 12 and their mounting and interconnection components are selected, arranged and formed such that when the clamp plate 80, manifold 20, actuator 10 and cooling device 800 are assembled into operating format, the undersurface 80*a* of the clamp plate intimately engages with the distal end surface 800*a* under compression to cause the spring joints 800*s* to exert the UF force by surface 800*a* against surface 80*a*. Similarly, the same components are formed and arranged together with the formation and arrangement of cooling device 500 such that the distal end most surface 502*a* of distal member 502 engages the undersurface 80*a* of plate 80 under compression from spring load force UF, FIG. 3, exerted by springs 506 of cooling device 500 when all such components are assembled into operating format.

The term spring or spring loadable interconnection 506 as used herein means a device that is disposed and engaged between or with the distal 502 and proximal 504 members and imparts a spring force UF therebetween at least when the apparatus is assembled and the manifold 20 is brought up to elevated operating temperature. As shown in all embodiments described herein where independent springs 506 such as shown in FIGS. 1-14, 21-25G are employed, such springs typically comprise one or more conventional coil, leaf, flat wire wave, Belleville or conical spring(s) having an upper end 506*u* and a lower end 506*l* that respectively engage via engagement surfaces 506*es* against and between a complementary engagement surfaces 502*us*, 504*us* of the distal member 502, 507, 507*m* and the proximal member 504, 504*aa* such that the spring 506 is compressed and the distal member 502 is forcibly urged under the force UF of the spring when compressed in an upstream direction to compress the distal end surface 502*a* or 507*a* under such force UF into engagement with the undersurface 80*a* of the clamping plate 80 at least when the apparatus is assembled and the manifold brought up to an elevated operating temperature. Such coil or leaf or flat wire wave or Belleville or conical spring(s) typically have a degree of resilient compression that is six or more times the degree of resilient compression of the plate springs of U.S. Pat. Nos. 8,349,244 and 8,562,336, typically having a degree of resilient or elastic compression of at least about 3 mm meaning that said coil et al. springs can be repeatedly compressed by at least about 3 mm and resiliently or elastically expand or revert back to their original uncompressed condition, length or state.

Figures 5D, 5E:
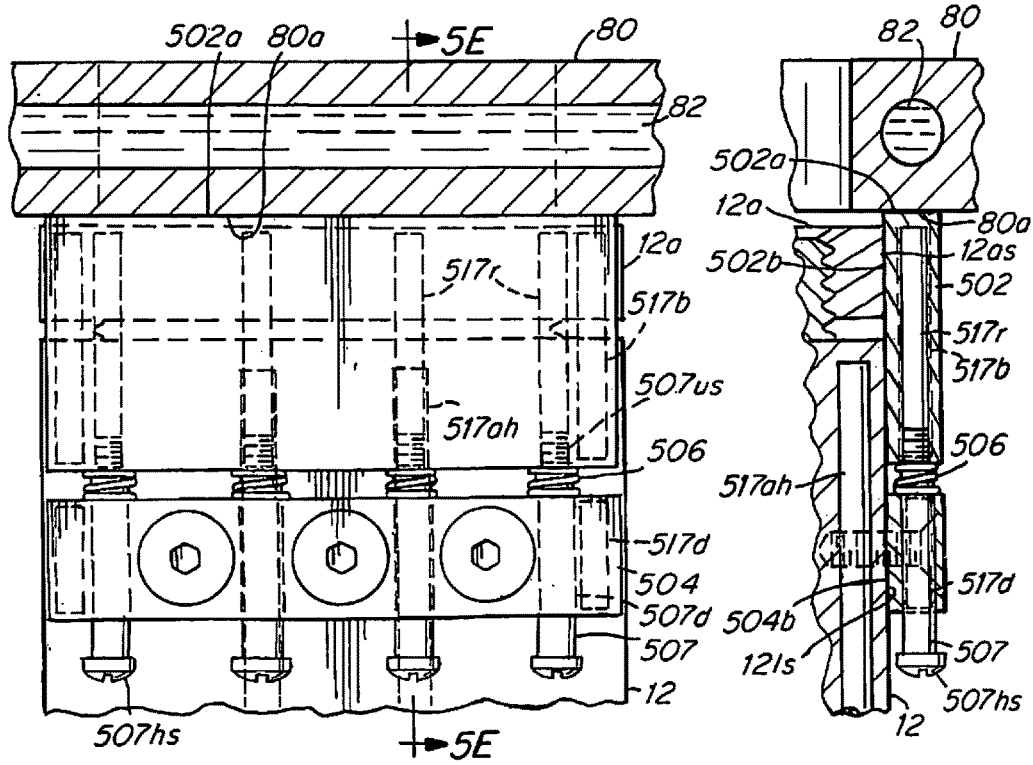
FIG. 5D is a front view similar to FIG. 5B but showing heat pipes alternatively and additionally mounted vertically in the heat transmitter elements and actuator body.
FIG. 5E is a cross-sectional side view taken along lines 5E-5E of FIG. 5D.
Figures 5F, 5G:
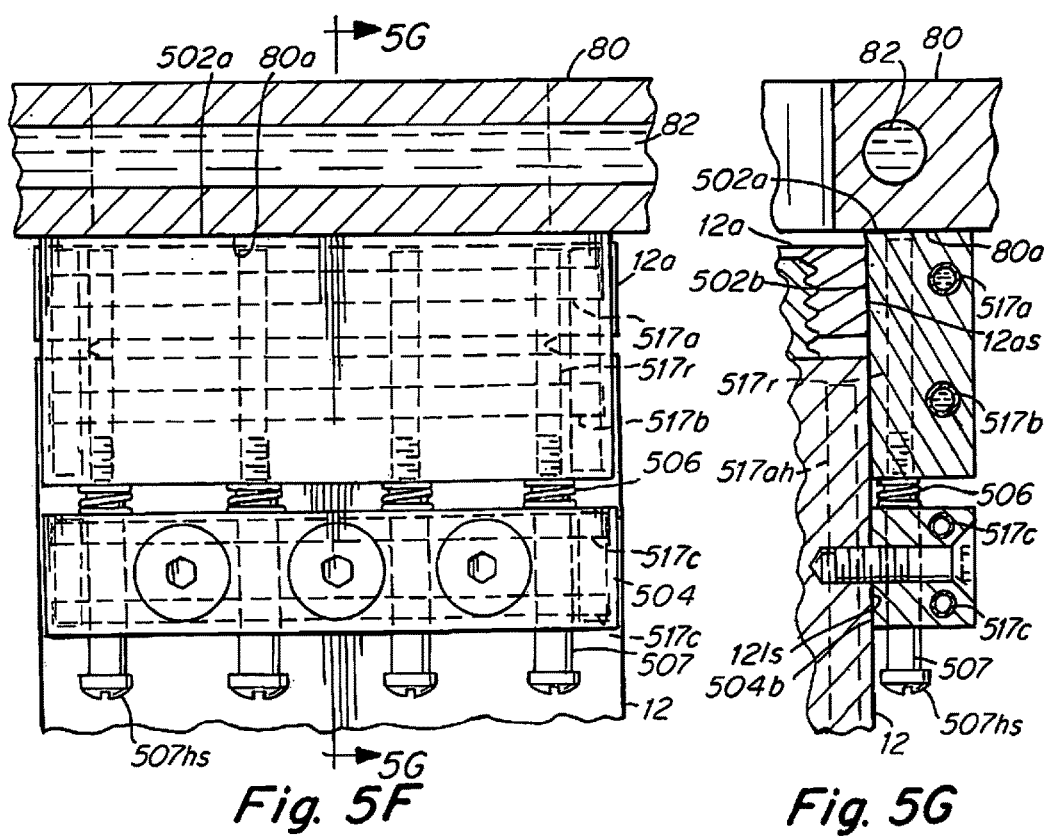
FIG. 5F is a front view similar to FIG. 5D but with additional heat pipes mounted horizontally to the heat transmitter elements.
FIG. 5G is a cross-sectional side view taken along lines 5G-5G of FIG. 5F.
Figure 5H:
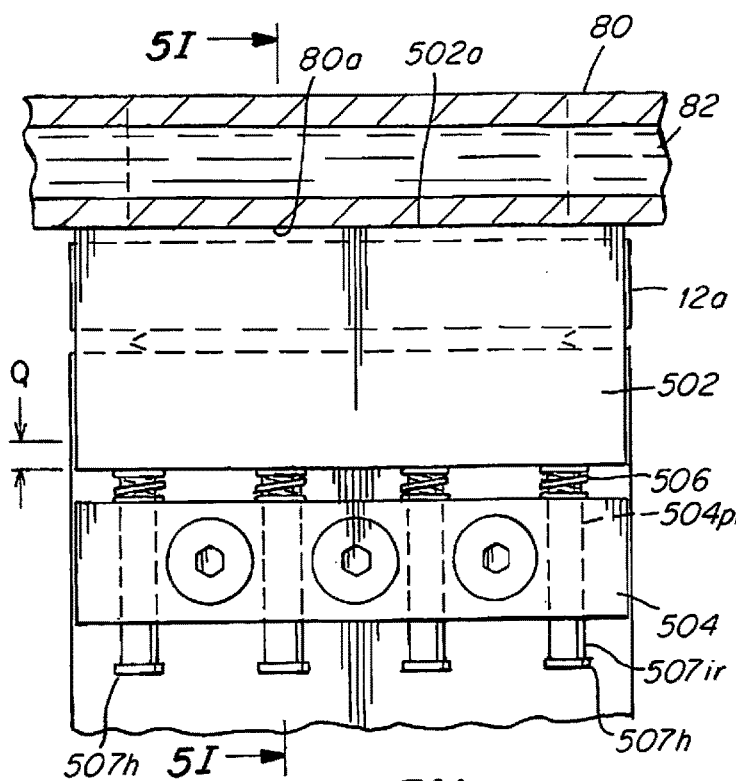
FIG. 5H is a front view similar to FIG. 5 but showing rods formed integrally with the upper heat transmitter element.
Figure 5I:
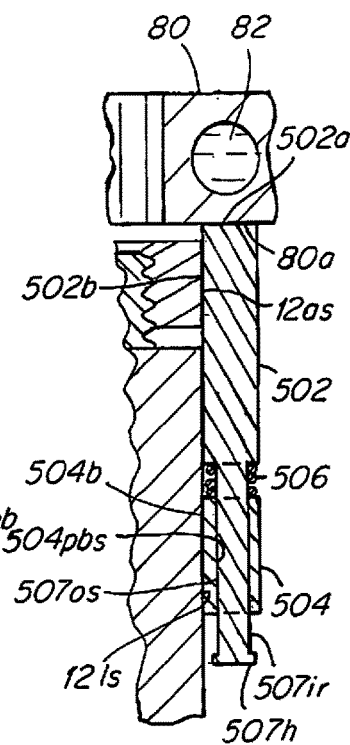
FIG. 5I is a cross-sectional side view taken along lines 5I-5I of FIG. 5H.
Figure 5J:
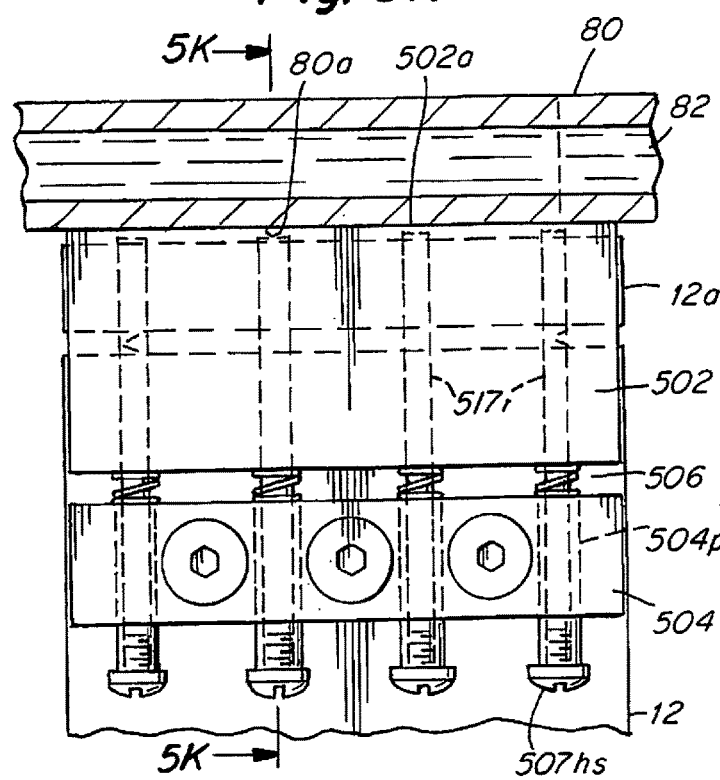
FIG. 5J is a front view similar to FIG. 5H but showing heat pipes embedded within the rods and upper heat transmitter element.
Figure 5K:
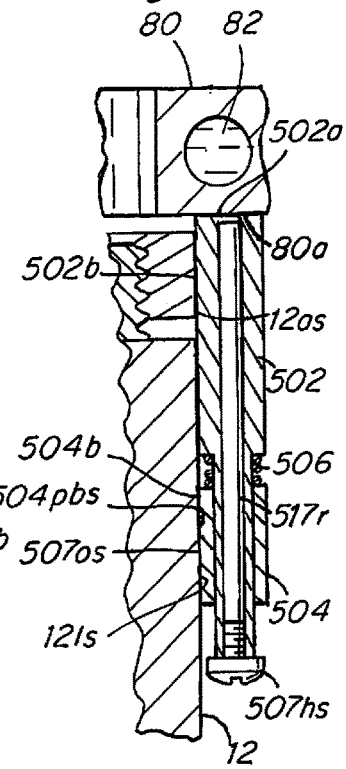
FIG. 5K is a cross-sectional side view taken along line 5K-5K of FIG. 5J.
Figure 5L:
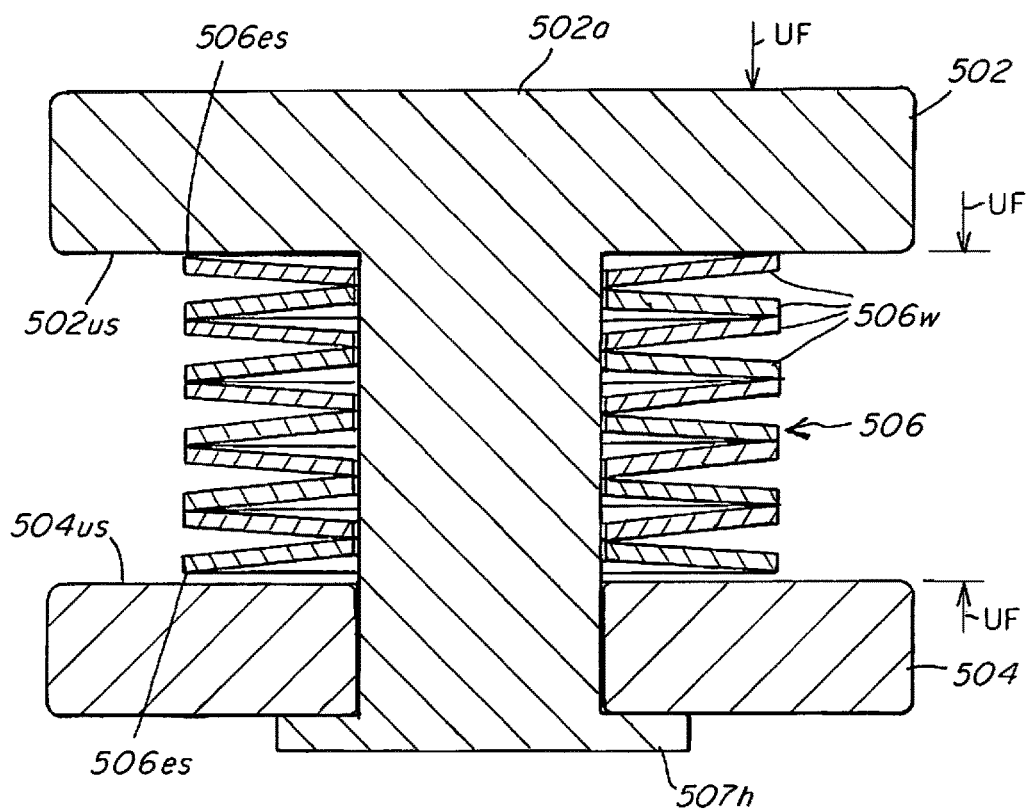
FIG. 5L is a schematic cross-sectional side view of the distal and proximal heat conductive component members of a cooling device according to the invention having a spring loadable interconnection comprised of one or series of stacked leaf, belleville, flat wire wave, conical or disc washer springs that serve as a spring between the distal and proximal members.
Figure 7:
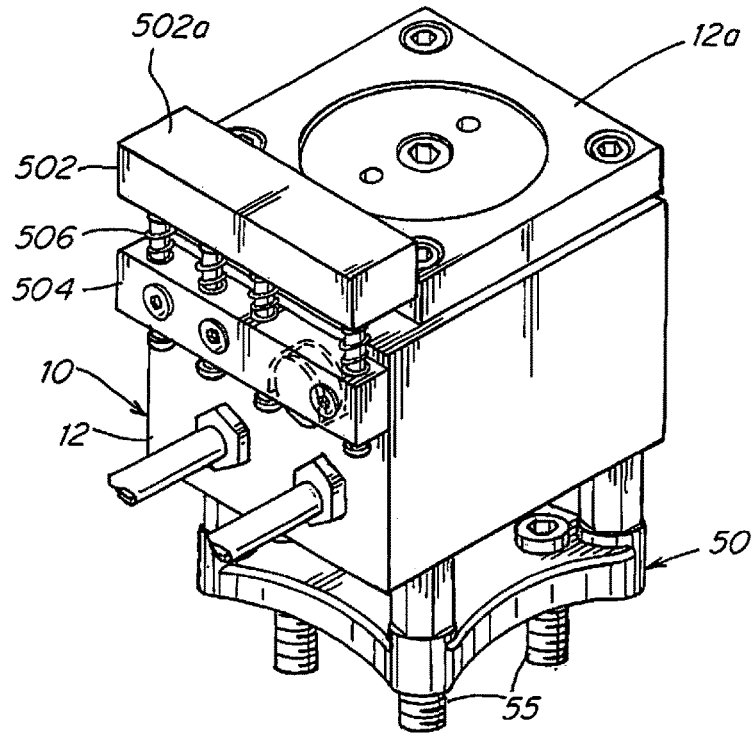
FIG. 7 is a top perspective view of an actuator having a single cooling device mounted to a side wall of the actuator where the cooling device comprises a proximal base 504 and a distal plate member that is spring loadably mounted on the base with the distal plate 502 in slidable engagement contact with a surface of the housing of the actuator.
Figure 8:
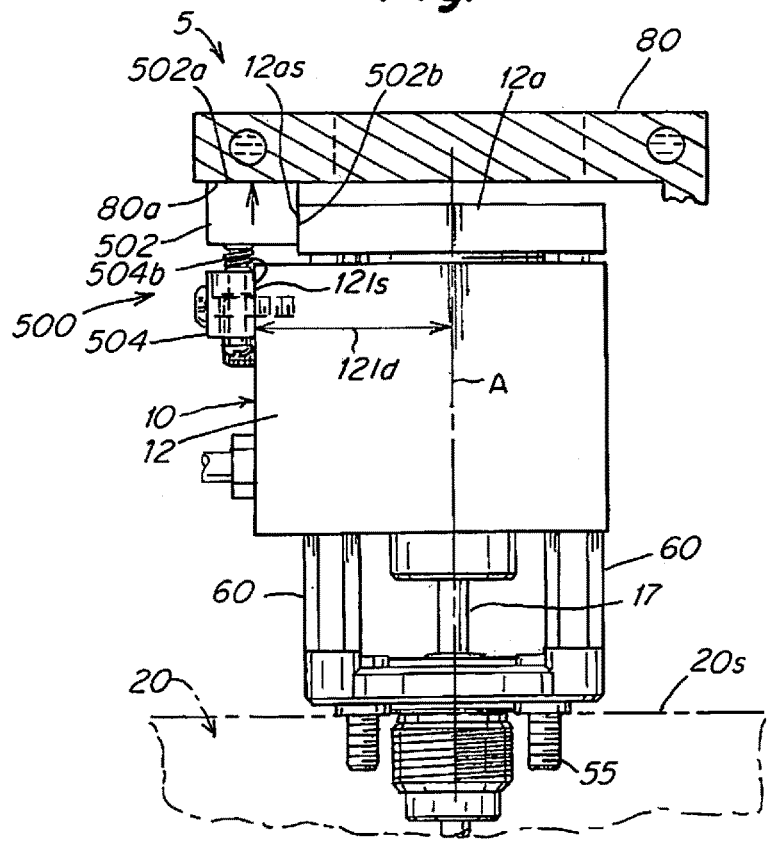
FIG. 8 is a side view of FIG. 7 additionally showing a top clamp plate with the distal plate member in spring loaded engagement therewith.
Figure 9:
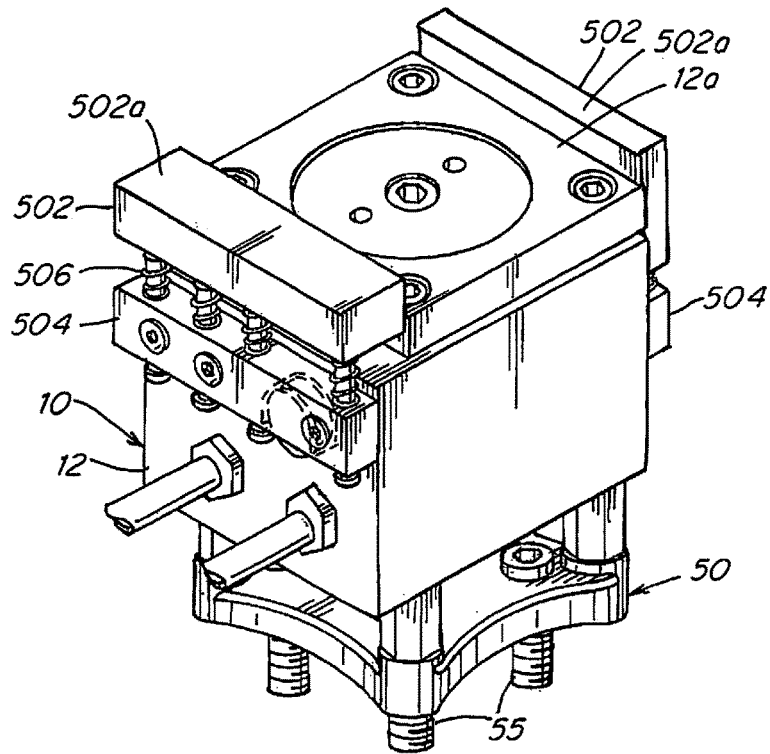
FIG. 9 is a top perspective view of an actuator having two cooling devices mounted to two separate side walls of the actuator where the cooling devices comprise a proximal base 504 and a distal plate member 502 that is spring loadably mounted on the base 504 with the distal plates being 502 in slidable engagement contact with a surface of the housing of the actuator.
Figure 10:
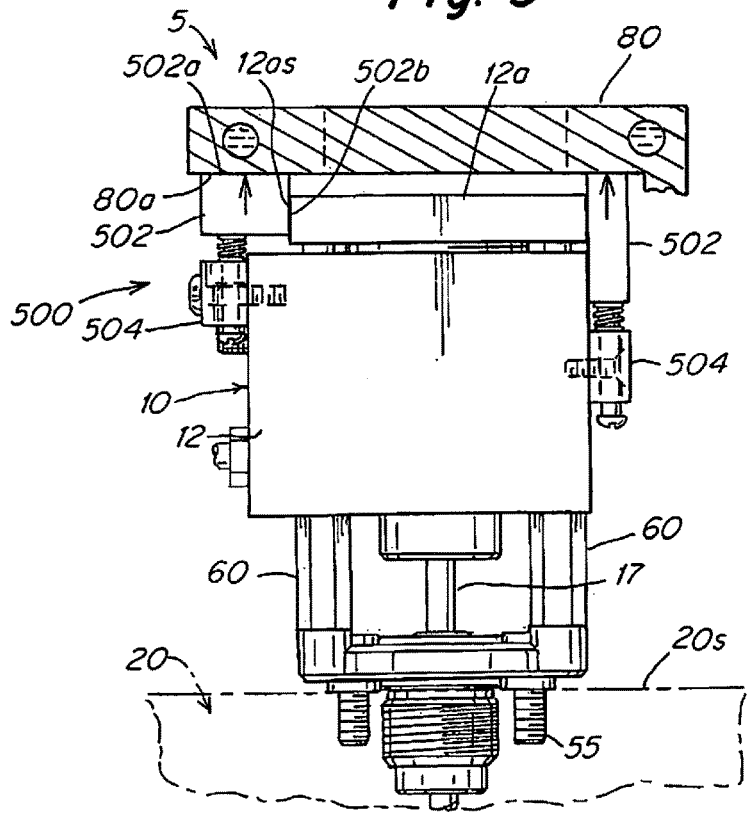
FIG. 10 is a side view of FIG. 9 additionally showing a top clamp plate with the distal plate members 502 of the heat transmissive members in spring loaded engagement therewith.
Figure 11:
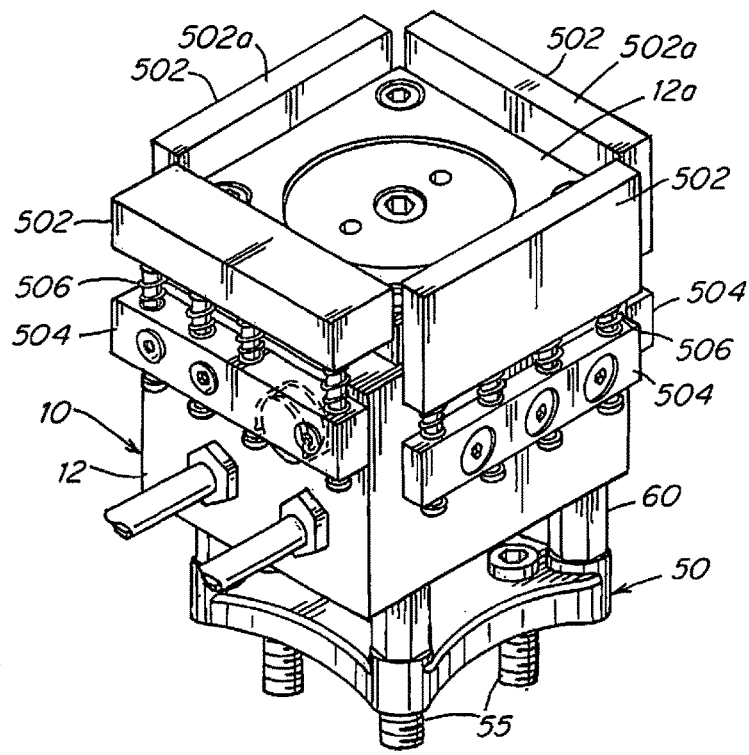
FIG. 11 is a top perspective view of an actuator having four separate cooling devices mounted to four separate side walls of the actuator where the cooling devices each comprise a proximal base 504 and a distal plate member 502 that is spring loadably mounted on the base 504 with the distal plates being 502 in slidable engagement contact with a surface of the housing of the actuator.
Figure 12:
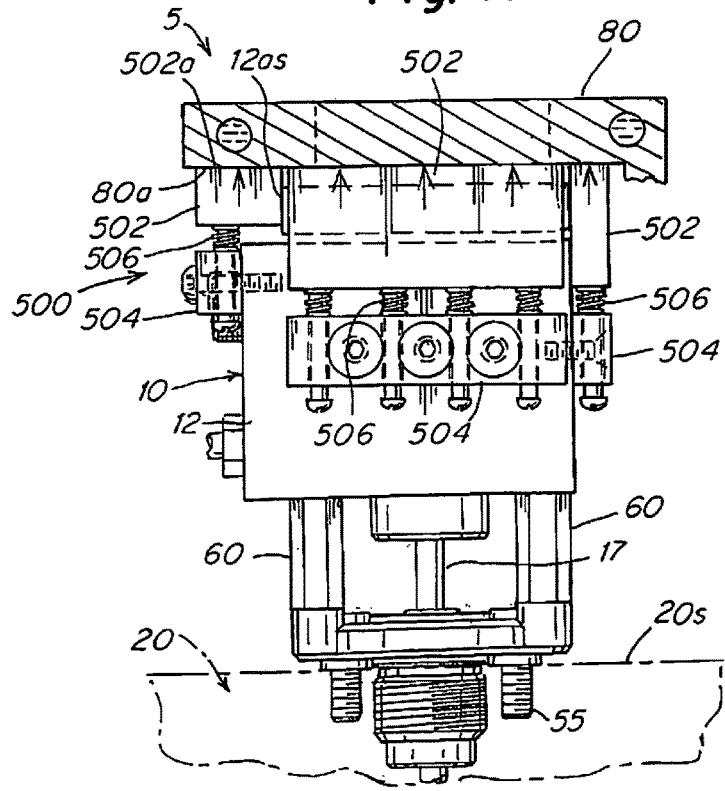
FIG. 12 is a side view of FIG. 11 additionally showing a top clamp plate with the distal plate members 502 of the heat transmissive members in spring loaded engagement therewith.

The proximal 504 and distal 502 arms or members typically comprise mechanically independent heat conductive bodies or members 502, 504 that are interconnected via a pin or rod or slot and engaged with each other via a spring or spring loadable interconnection 506 that is typically comprised of a non-heat conductive spring, such as a coil spring as shown in FIGS. 3, 5-5K, 23, 25-25E or one or more stacked leaf, belleville, conical or disc washers 506*w* or springs such as shown in FIG. 5L that act as a spring 506 between the distal and proximal members.

The spring or spring loadable interconnection 506 exerts a spring force UF, FIGS. 3, 5C, 5L, 23, 25D, between the proximal arm or member 504 and the distal arm or member 502 at least when the apparatus 5 is assembled and the manifold is brought to an elevated operating temperature. The spring or spring loadable interconnection 506 typically has engagement surfaces 506*es* that engage against complementary opposing engagement surfaces 504us and 502us of proximal 504 and distal 502 members such that heat conduction between members 504 and 502 is minimized and such that the spring 506 is substantially non-heat conductive. The spring or spring loadable interconnection 506 is preferably selected to have an amount or degree of mass (typically less than about 10 grams and more typically less than about 5 grams) that renders the spring 506 substantially non-heat conductive and minimizes, enables or imparts a minimal amount of, heat conduction between members 504 and 502 via or through spring or spring loadable interconnection 506. The mass of spring loadable interconnection 506 is preferably less than about 10 and most preferably less than about 5 grams. The area of engagement or contact between engagement surfaces 506es and one or both of surfaces 504us or 502us is preferably selected to be an amount or degree (typically less than about 10 square mm, typically less than about 7.5 square mm and more typically less than about 5 square mm) that renders the spring 506 substantially non-heat conductive and minimizes, enables or imparts a minimal amount of, heat conduction between members 504 and 502 via or through spring or spring loadable interconnection 506.

FIGS. 1-25G show an injection molding apparatus 5 comprised of an actuator 10 having a housing body 12, 12a that is thermally conductive and mounted in thermal communication with a heated manifold 20 into which fluid injection material 102 is injected from an injection machine 100 into and through one or more manifold distribution channels 22 that deliver fluid downstream to a downstream fluid delivery channel 200 such as the bore of a nozzle that terminates at its downstream end in a gate 304 that communicates with the cavity 302 of a mold 300. The actuator 10 includes a piston 14 that is controllably drivable along a drive axis A in a reciprocal upstream and downstream direction together with a valve pin 17 that is interconnected to the piston 14. The valve pin 17 is mounted within a complementary receiving aperture 91a of a bushing 91, the outside surface of the pin 17 mating with an interior surface of the aperture 91a and being slidable in an upstream and downstream direction axial A direction within the aperture 91a of the bushing 91 such that injection fluid that flows through channels 22, 200 is substantially prevented from flowing upstream through mounting aperture 91a. The bushing 91 is fixedly mounted within the body of the heated manifold 20 via bushing screw 92 that is screwably engaged within a complementary threaded receiving aperture bored within the heated manifold 20. The bushing 91, screw 92, actuator 10 and valve pin 17 are all adapted and arranged such that the valve pin 17 is controllably drivable upstream and downstream through both the manifold distribution channel 22 and the downstream nozzle channel 200 between a downstream-most gate closed position and one or more upstream gate open positions.

Figure 4:
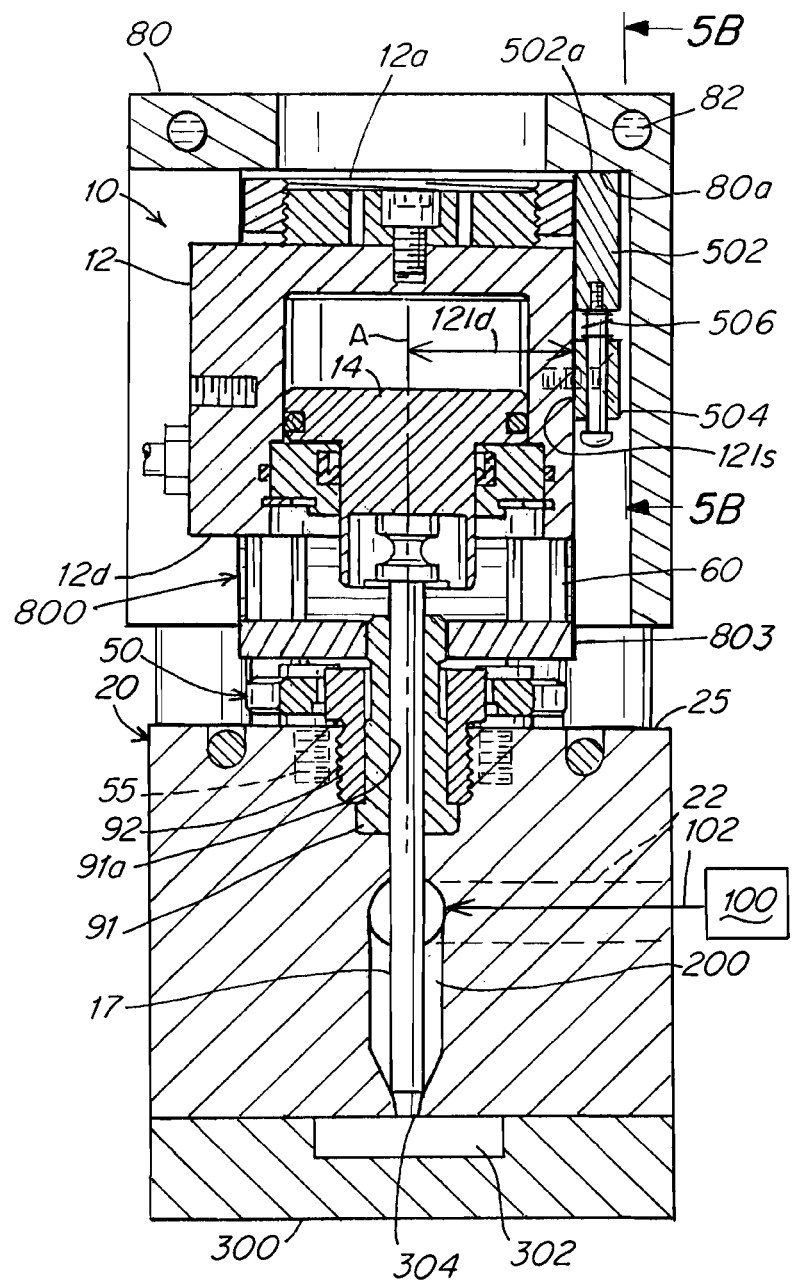
FIG. 4 is a sectional view taken along lines 4-4 of FIG. 1.

As shown in the FIGS. 1, 4 embodiment, the actuator housing 12 is typically mounted axially A upstream of and on or to the heated manifold 20. The actuator 10 can be mounted on or to the manifold via either or both mounts or spacers 60 and a water cooled cooling device or mount 803 as disclosed in U.S. Pat. No. 8,349,244, the disclosure of which is incorporated herein in its entirety as if fully set forth herein. The downstream axially facing surface 12d of the actuator housing 12 is also typically mounted on or to the stabilization mount 50. As shown, the cooling mount 803 and spacers 60 are mounted on or to an upstream surface of the stabilization mount 50. The downstream axially facing surface 12d of the actuator housing 12 is mounted in direct heat or thermally conductive contact with one or more of the mounts 60, 50, 803 that are in turn mounted in direct heat conductive contact or direct heat conductive communication with the heated manifold in axial alignment with axis A of the actuator housing and valve pin 17.

One or more of the mounts 50, 60, 803 act as insulators that prevent or retard the communication or conduction of heat from the heated manifold 20 through the mounts 50, 60, 803 to the lateral surface 12ls of the actuator body 12 that is spaced laterally 12ld from the drive axis A of the actuator 10 and valve pin 17 a distance 12ld sufficient to prevent or substantially retard conduction of heat through ambient air or through the housing body 12, valve pin 17 or mounts 50, 60, 803. To the extent that heat is conducted or communicated from the heated manifold 20 to the housing body 12 such heat is conducted from the housing body 12 to the proximal member 504, 504aa further to the distal member 502, 502u and finally to the cool clamp plate 80 as described herein.

In all of the FIGS. 4-25G embodiments, the cooling device 500 comprises a heat transmitter that is comprised of a distal arm or member or assembly 502, 502r, 509, 509a, 509b, 507, 506, 506bi and a proximal base or member 504, the distal arm or member 502 or assembly being mounted by a spring loadable interconnection or engagement 506 to or with a proximal base or member 504, 504a, 504aa. The proximal base or member 504, 504a, 504aa is preferably mounted such that a complementary surface of the member 504, 504a, 504aa is disposed or mounted in intimate or compressed thermally conductive contact on, to or against a surface 12ls, 12si of the housing body 12 that is spaced laterally 12ld away from the axis A of the actuator 10 and valve pin 17. The location of the mounting of the proximal member 504, 504a, 504aa is arranged such that the proximal base or member 504 is spaced laterally apart from contact with the axially mounted actuator mounts 50, 60, 803 that are directly mounted in close adjacency to and in thermal communication with the heated manifold 20 and on which the proximal end 12d of the actuator housing 12 is directly axially A mounted.

The distal arm or member 502 is preferably comprised of a highly thermally conductive material and has a distal end surface 502a that is adapted to compressibly engage against an undersurface 80a of the clamp plate 80 under a spring load from the spring loadable interconnection 506 between the distally extending arm 502 and the proximal base or member 504 when all components of the system 5 are fully assembled and the heated manifold is brought up to an elevated operating temperature. The system 5 can be adapted and arranged such that the distal end surface 502a is not engaged under a compressive force when the system is in a cold non operating condition when the system 5 is initially assembled before the manifold 20 is heated to operating temperature or when the system 5 is shut down and allowed to return to room temperature after the manifold 20 has been heated up to operating temperature.

Thus the system 5 is preferably adapted and arranged such that compressive force between distal end surface 502a and the surface 80a of the clamp plate 80 occurs only when the system 5 including manifold 20 is brought up to normal elevated operating temperature. In the FIGS. 4-14 and 21-25G embodiments where the distal arm 502 or rod 502r comprises a heat conductive independent body that is independent of and mounted on an independent compressible spring body 506, the degree of upstream and downstream movement Q along or substantially parallel to the axis A, ranges from 0 mm when the system 5 is in a cold or room temperature condition up to a maximum of about 3 mm when the system 5 is brought up to normal elevated operating temperature (such as between about 150 and 450 degrees F.). Similarly, in the embodiment shown in FIGS. 13, 14 where the arm 502 is arranged and adapted for lateral L movement relative to the axial direction A of the actuator 10, the degree of lateral movement Q', FIG. 14, ranges from 0 mm when the system 5 is in a cold or room temperature condition up to a maximum of about 3 mm when the system 5 is brought up to normal elevated operating temperature. The independent spring body 506 in the FIGS. 1-14, 21-24 embodiments is resilient such that after being compressed Q by up to about 3 mm when the system is at operating temperature, the independent spring body 506 will return back to its original uncompressed or non-compressed axial spring length or state when the system returns to room temperature.

In the FIGS. 15-20 embodiments where the heat transmitting device 500 comprises a unitary or integral body 502, 504, 506 of compressible metal or other material, the degree of upstream and downstream movement Q" of the distal arm 502 along or substantially parallel to the axis A, ranges from 0 mm when the system 5 is in a cold or room temperature condition up to a maximum of about 0.5 mm when the system 5 is brought up to normal elevated operating temperature (such as between about 150 and 450 degrees F.). The spring 506 in the FIGS. 15-20 embodiments that is integral with the bodies of arm 502 and base 504, is resilient such that after being compressed Q" by up to about 0.5 mm when the system is at operating temperature, the integral spring body 506 will return back to its original uncompressed or non-deformed axial length or state when the system returns to room temperature.

The arm 502 has an exterior or proximally disposed surface 502*b* for making contact with and receiving heat from the actuator housing body components 12, 12*a* via engagement between an exterior arm surface 502*b* and a laterally disposed complementary mating surface 12*ls*, 12*as* of the housing body 12. The arm 502 transmits heat received via the proximal surface 502*b* to the distal end surface 502*a* and in turn to the relatively cool clamp plate 80 via compressed engagement between surface 502*a* and a complementary undersurface 80*s* of the clamp plate 80.

In the FIGS. 5-14, 24-25G embodiments, the arm 502, 509*a* also receives heat from the actuator housing 12 by transmission of heat through rods or tubes 507 which in turn receive heat from the base member 504 which itself receives heat from the actuator housing 12 by intimate compressed engagement with an exterior laterally disposed surface 12*l* of the housing 12. The laterally disposed actuator surface 12*l* of the housing 12 is spaced a lateral distance 12*ld* away from the drive axis A of the valve pin 17 because the valve pin 17 comes into direct thermal contact with the heated injection fluid 102. Thus the heat transmission device 500 is disposed in a laterally spaced position away from the valve pin 17 and the valve pin axis A such that the base 504 is removed from direct thermal contact or thermal communication with the axis or the valve pin 17. In such embodiments, the proximal base member 504 is rigidly attached to the lateral actuator surface 12*l* such as via a bolt or screw 504*s* such that a complementary surface 504*b* of the base member 504 is engaged in intimate heat conductive contact with the lateral disposed surface 12*l* that is spaced laterally 12*ld* from the axis.

Figure 21:
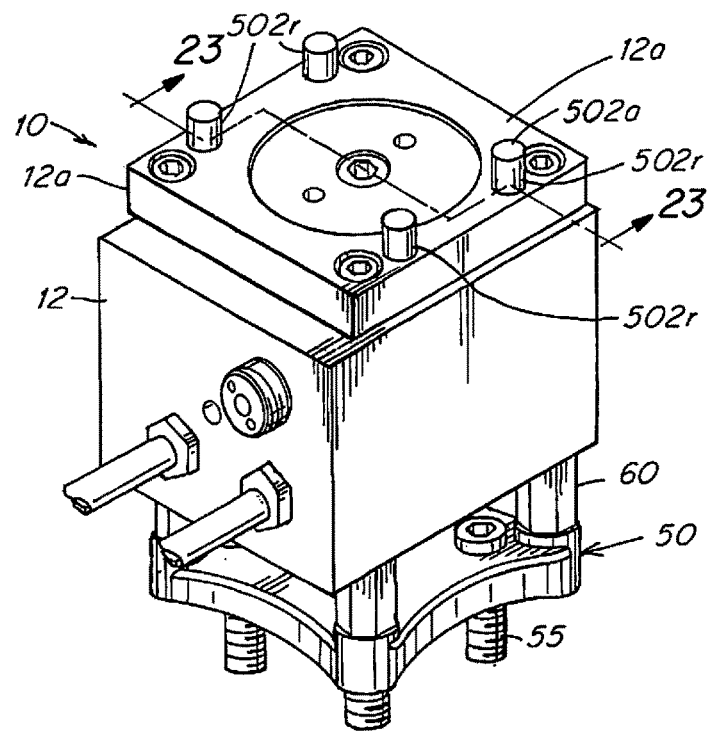
FIG. 21 is a top perspective view of another embodiment of the invention showing an actuator in thermal communication with a heated manifold of an injection molding system with four separate cooling devices that each comprise a rod or tube spring loadably mounted within a complementary precision formed receiving bore drilled in body of the housing of the actuator, the rods or tubes being adapted for slidable engagement contact against an internal surface of the precision formed receiving bores.
Figure 22:
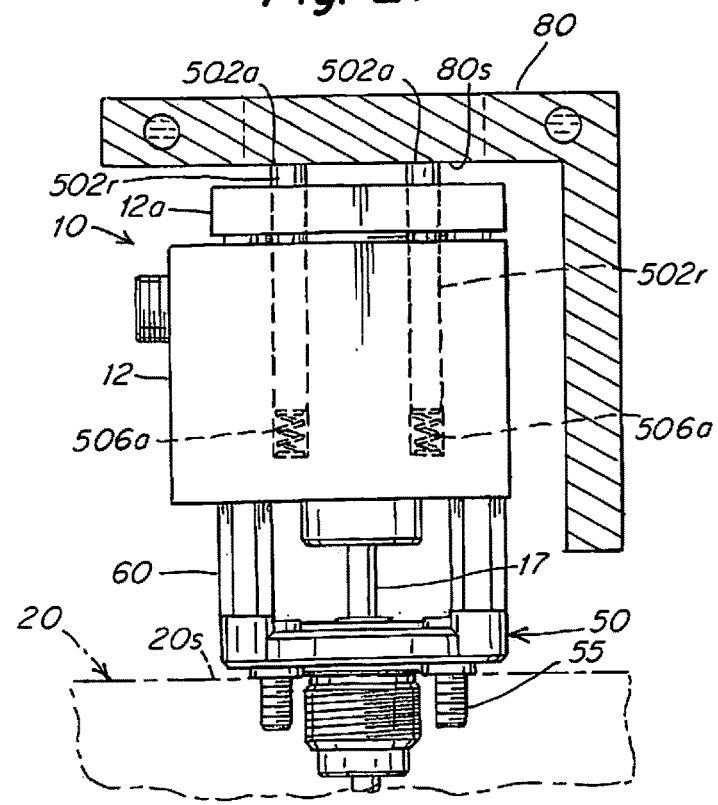
FIG. 22 is a side view of the FIG. 21 embodiment showing the actuator assembled together with a top clamp plate and the rods or tubes being in spring loaded compressed engagement with the top clamp plate.
Figure 23:
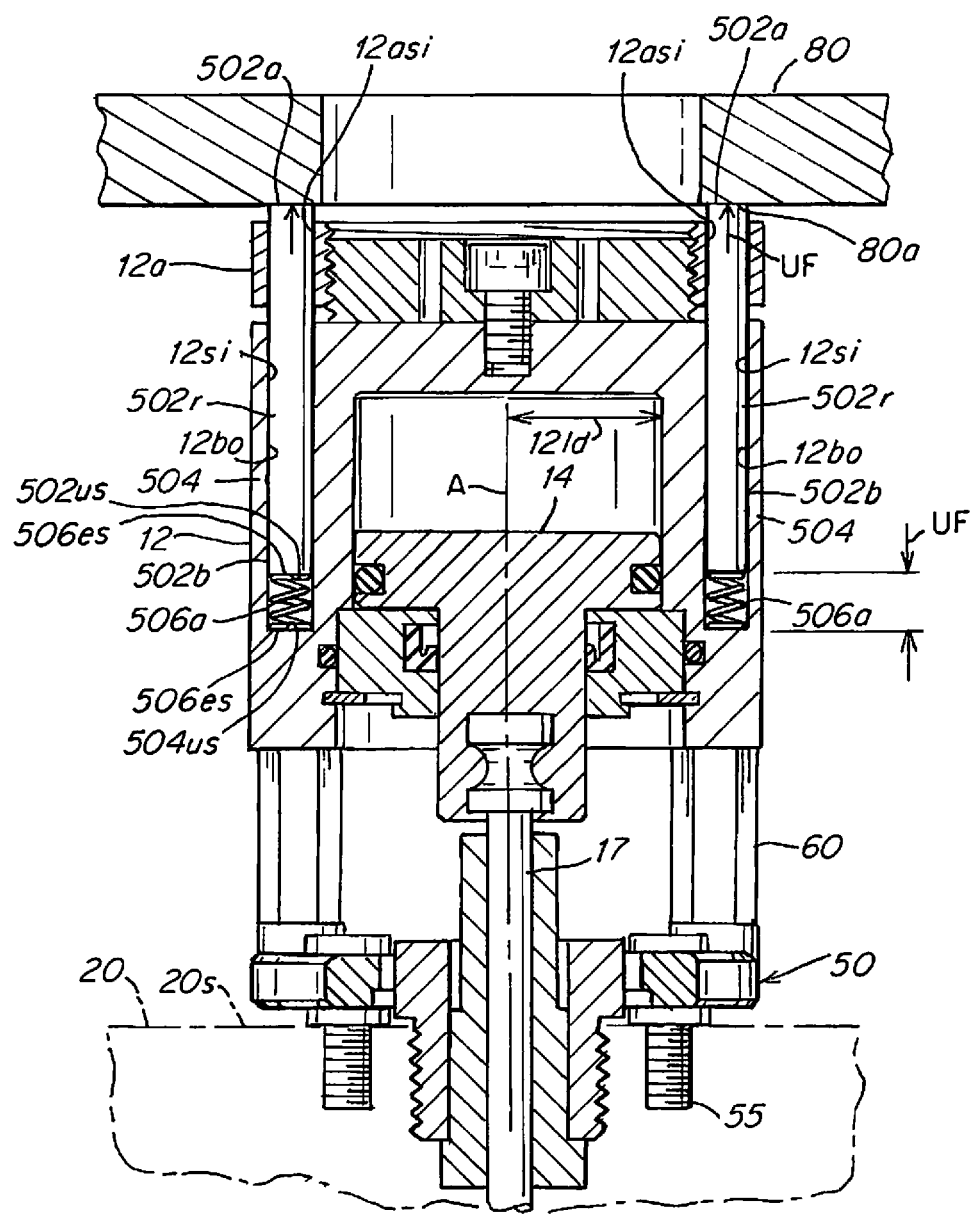
FIG. 23 is a front view of the FIG. 21 embodiment showing the actuator assembled together with a top clamp plate and the rods or tubes being in spring loaded compressed engagement with the top clamp plate.
Figure 24:
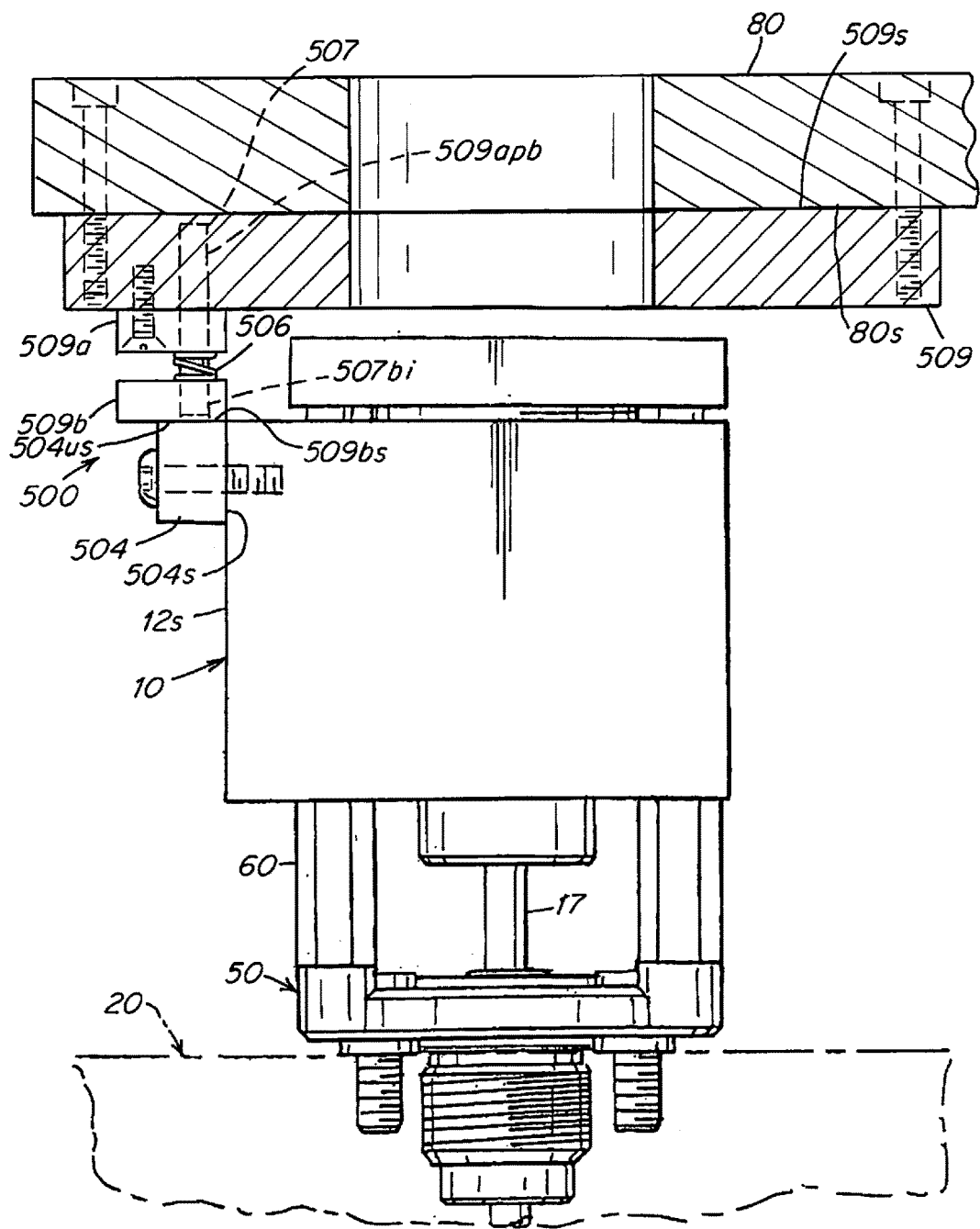
FIG. 24 is a side view of another embodiment of the invention showing a cooling device comprised of an assembly of a distal heat transmissive plate member assembled together with a spring loading mechanism, the assembly being that is readily mountable to or between the actuator and a top clamp plate such that when the top clamp plate and the actuator and the assembly are assembled together into operating configuration, the distal heat transmissive plate member is spring loadably engaged against the top clamp plate and heat transmissively engaged with a proximal heat transmissive base member that is mounted to the actuator housing.

Similarly in the FIGS. 21-23 embodiments, the base 504 of the rods 502*r* are engaged with a laterally disposed actuator surface 12*si* that is spaced a lateral distance 12*ld* away from the drive axis A of the valve pin 17. Thus the heat transmission rods 502*r* are disposed in a laterally spaced position away from the mounts 50, 60, 803, valve pin 17 and axis A such that the base 504 of the rods 502*r* is removed from direct or closely adjacent thermal contact or communication with the axis A or the valve pin 17.

In the FIGS. 21-23 embodiments, the actuator 10 comprises a housing body 12, 12*a* that is thermally conductive and mounted in thermal communication with the manifold 20 as described above. In the FIGS. 1-20, 24 embodiments, the proximal base or member 504 of the cooling device 500 is mounted to the housing body 12 of the actuator 10 in an arrangement where the distal end surface 502*a* of the distal arm or member 502 makes compressed contact with the clamp plate surface 80*a* such that the end surface 502*a* moves or travels some distance relative to the actuator housing 12, 12*a* to which the arm 502 is mounted. The arm 502 and distal engagement surface 502*a* is movable via the compressible spring 506*a* toward and away from the actuator 10.

Similarly in the FIGS. 21-23 embodiment, the distally extending arm or rod or tube 502*r* is movable toward and away from the actuator housing 12 via a compressible spring 506*a*. The thermally conductive rods 502*r* are mounted to proximal guides 504 which are in turn mounted to the actuator housing body 12. As shown, the rods 502*r* are slidably disposed within complementary receiving apertures or bores 12*bo* bored into the housing body 12. The rods 502*r* have an exterior surface 502*b* that are slidably engaged with an interior surface 12*si*, 12*asi* of the housing bodies 12, 12*a* which cause heat to be thermally transmitted from the housing bodies 12, 12*a* to the rods 502*r* which in turn transmit heat to the clamp plate 80 via compressed contact between surface 502*a* and surface 80*a*. Up and down movement of the rods 502*r* within the apertures 12*bo* occurs with the surfaces 502*b* and 12*si* and 12*asi* sliding against each other in engaged contact.

Similarly in the FIGS. 1-20 embodiments, the cooling devices 500 are mounted and arranged such that the proximally disposed arm surfaces 502*b* are maintained in slidable engaged contact with the complementary housing body surfaces 12*ls*, 12*as*, the surfaces 502*b* receiving heat from the housing bodies 12, 12*a* and in turn transmitting such received heat to the clamp plate 80 via compressed contact between surfaces 502*a* and 80*a*.

In the FIGS. 15-20 embodiments, the distal arm or member 502 and proximal base or member 504 are formed as a single unitary body 503 of highly conductive metal. The spring load in such unitary bodies 503 is created via deformation of the unitary bodies 503 such that when the clamp plate 80, mold 300, manifold 20, actuator 10 and cooling device 503 are all assembled together, the unitary body 503 resiliently deforms under compression to travel to a different position 502*d* relative to the actuator housing 12 to which the body 503 is mounted and relative to the original position 502*o* that the unitary body was disposed in prior to surface 502*a* making contact with surface 80*a*. The unitary body 503 has an inherent resilience or inherent spring such that when the body is moved to the deformed position 502*d* the inherent spring or resilience within the body 503 causes the distal end surface 502*a* to remain under forcible compressed contact with the undersurface 80*a* of the clamp plate 80.

Figure 13:
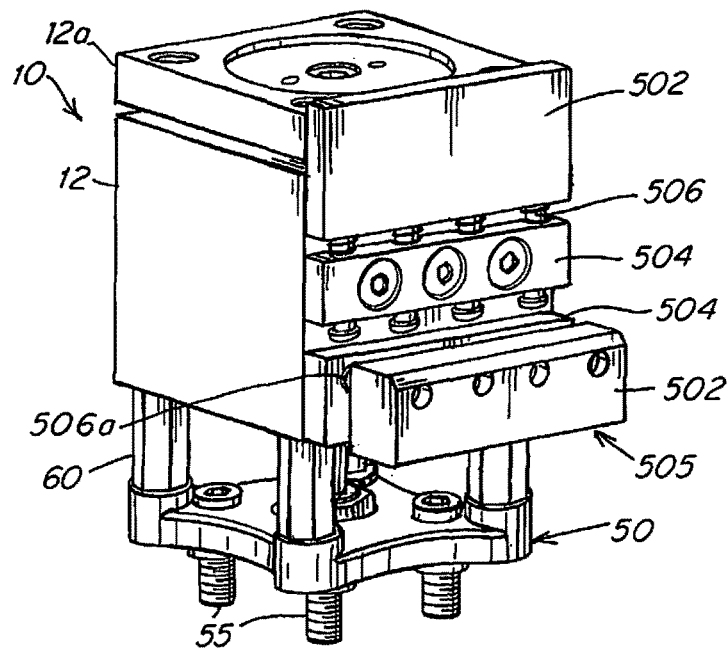
FIG. 13 is is a top perspective view an actuator in thermal communication with a heated manifold of an injection molding system with two separate cooling devices mounted to sides of the actuator where each cooling device comprises a proximal base and a distal plate spring loadably mounted on the base with the plates in slidable engagement contact with a surface of the actuator and further with a third cooling device mounted to a side wall of the actuator where the third cooling device comprises a proximal base and a distal plate spring loadably mounted on the base with the distal plate in spring loaded arrangement to move side-to-side as opposed to upstream downstream.
Figure 14:
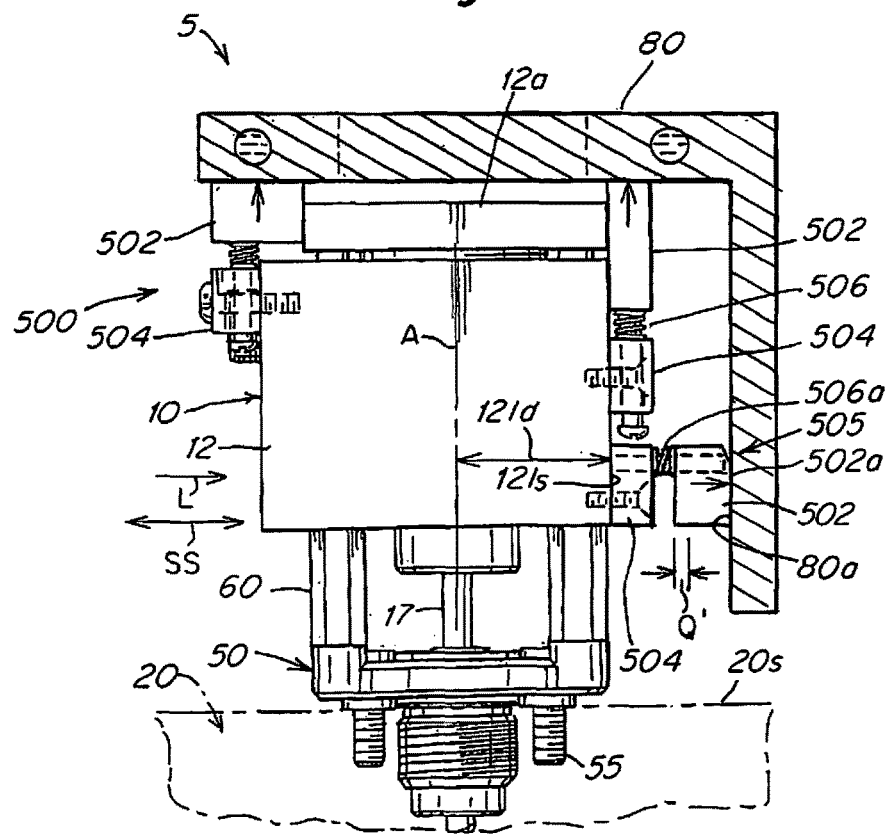
FIG. 14 is a side view of FIG. 13 additionally showing a top clamp plate assembled together with the actuator and cooling devices with the distal plate members 502 of the heat transmissive members of the cooling devices in spring loaded engagement with the top clamp plate.
Figure 15:
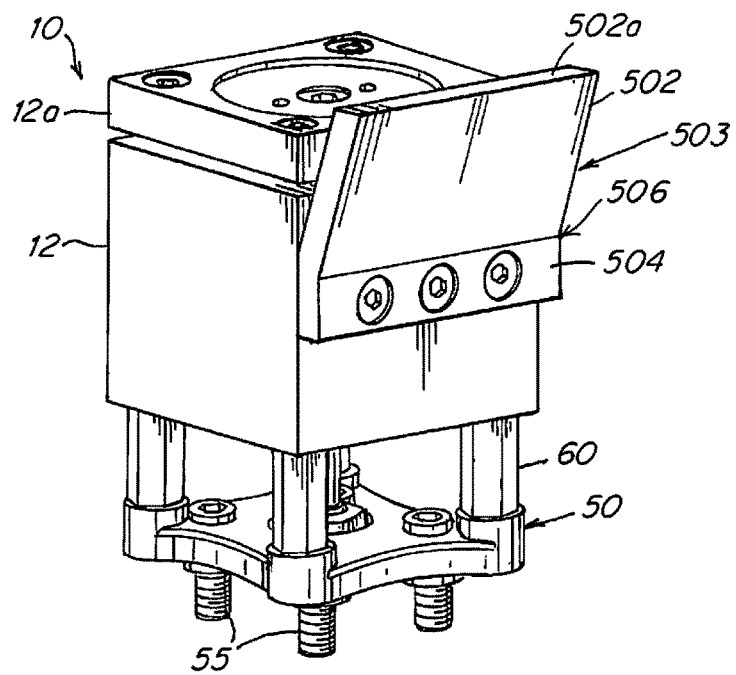
FIG. 15 is a top perspective view of an actuator in thermal communication with a heated manifold of an injection molding system with a single cooling device attached to the actuator where the cooling device comprises one exemplary configuration of a unitary body of metal material attached at a proximal base or member end 504 to the actuator having a distally extending arm 502 of one configuration, the distally extending arm of the unitary body being engageable at a distal end surface with a top clamp plate when the system is assembled such that a distal end surface of the distally extending arm deforms under spring force to maintain the distal end surface of the arm in compressed contact with the top clamp plate.
Figure 16:
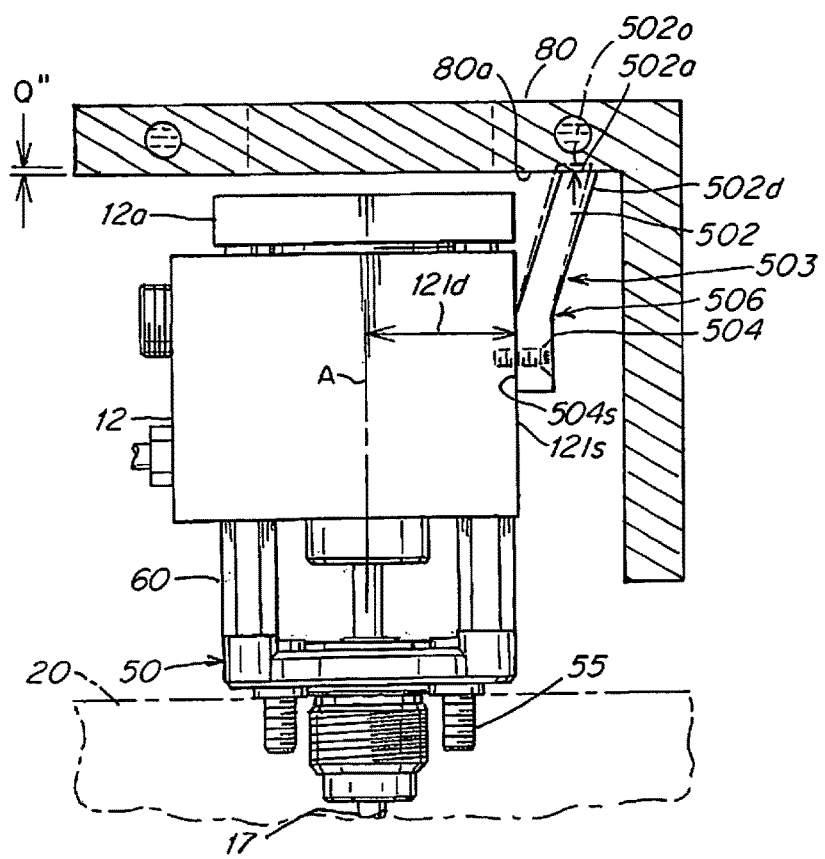
FIG. 16 is a side view of the FIG. 15 embodiment showing the actuator assembled together with a top clamp plate and the distal arm member in spring loaded compressed engagement with the top clamp plate.
Figure 17:
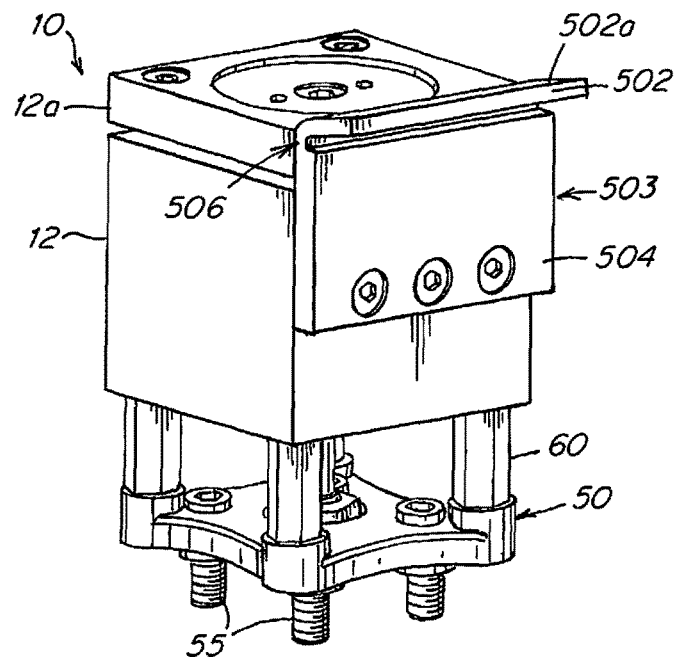
FIG. 17 is a top perspective view of an actuator in thermal communication with a heated manifold of an injection molding system with a single cooling device attached to the actuator where the cooling device comprises another exemplary configuration of a unitary body of metal material attached at a proximal base or member end 504 to the actuator having a distally extending arm 502 of another configuration, the distally extending arm of the unitary body being engageable at a distal end surface with a top clamp plate when the system is assembled such that a distal end surface of the distally extending arm deforms under spring force to maintain the distal end surface of the arm in compressed contact with the top clamp plate.
Figure 18:
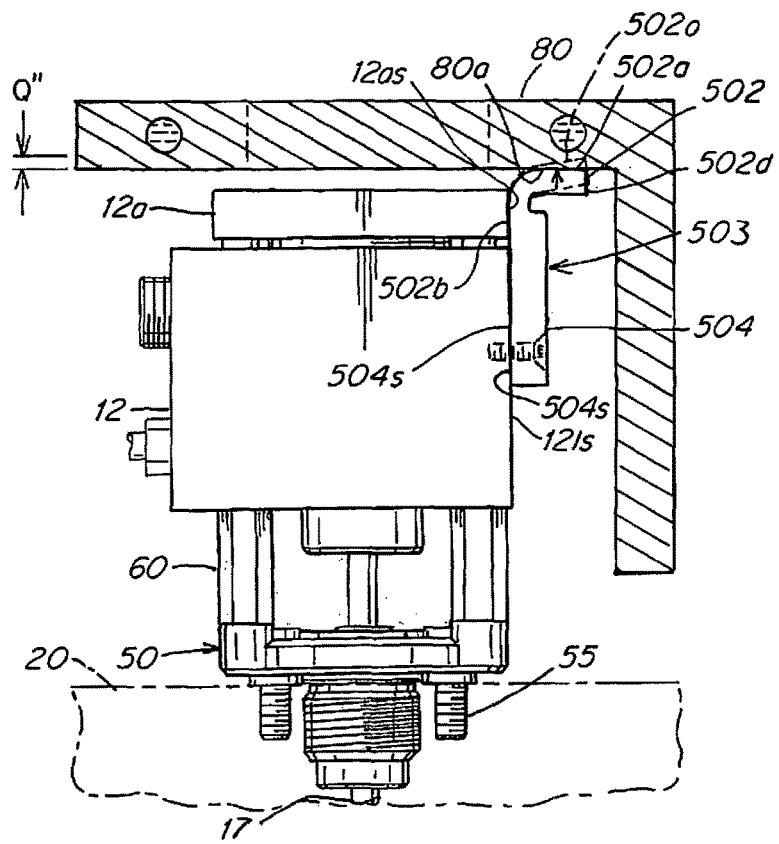
FIG. 18 is a side view of the FIG. 17 embodiment showing the actuator assembled together with a top clamp plate and the distal arm member in spring loaded compressed engagement with the top clamp plate.
Figure 19:
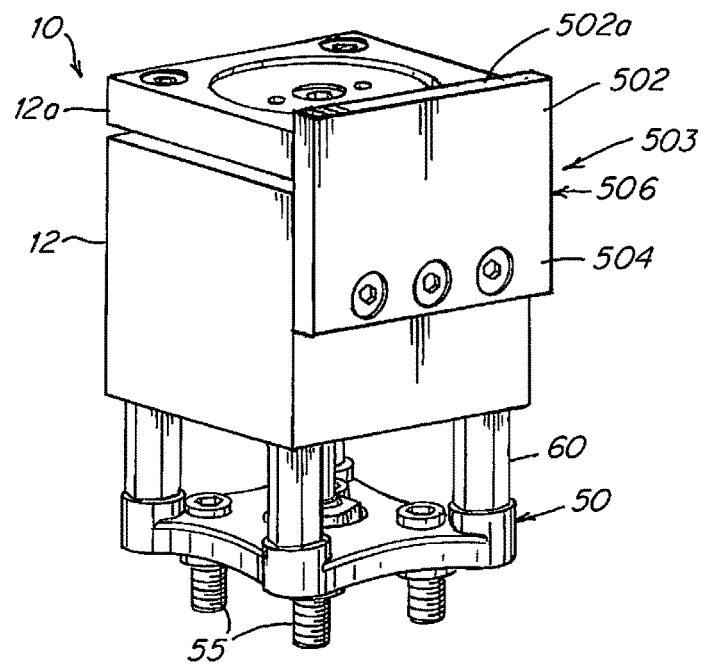
FIG. 19 is a top perspective view of an actuator in thermal communication with a heated manifold of an injection molding system with a single cooling device attached to the actuator where the cooling device comprises another exemplary configuration of a unitary body of metal material attached at a proximal base or member end 504 to the actuator having a distally extending arm 502 of another configuration, the distally extending arm of the unitary body being engageable at a distal end surface with a top clamp plate when the system is assembled such that a distal end surface of the distally extending arm deforms under spring force to maintain the distal end surface of the arm in compressed contact with the top clamp plate.
Figure 20:
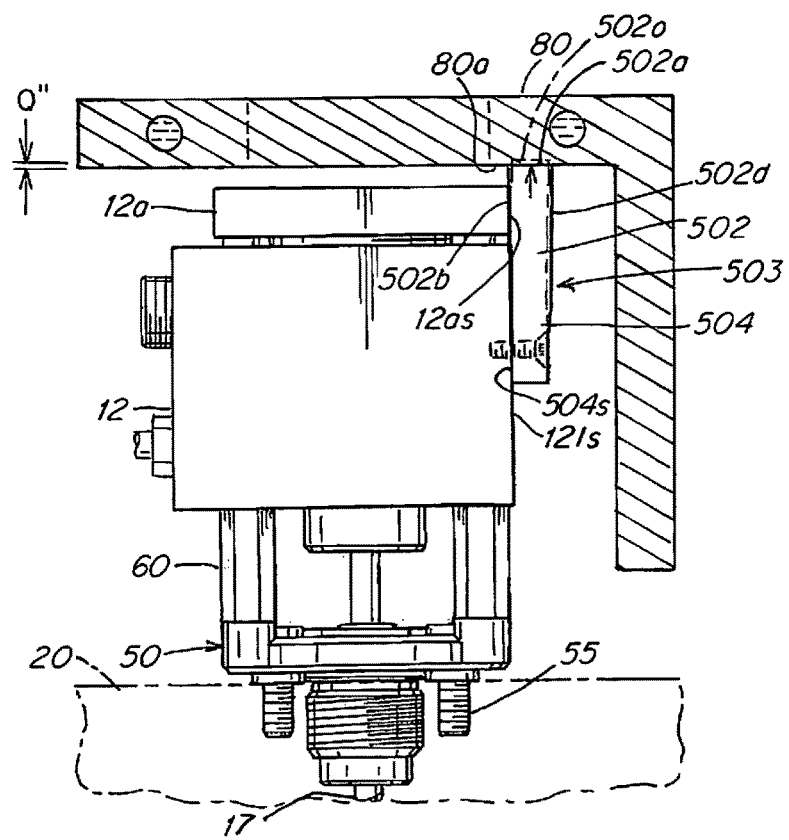
FIG. 20 is a side view of the FIG. 19 embodiment showing the actuator assembled together with a top clamp plate and the distal arm member in spring loaded compressed engagement with the top clamp plate.

In the FIGS. 13-14 embodiment, another cooling device 505 according to the invention is shown where the distally extending arm 502 moves radially toward and away from the actuator housing bodies 12, 12*a* and axis A. Such a cooling device 505 arrangement can be provided for exploiting the side-to-side or radial movement SS that the actuator 10 travels relative to the clamp plate 80 when the system is assembled in a cooled state and then subsequently the manifold 20 is heated to an elevated temperature. The heating of the manifold 20 subsequent to assembly of all of the clamp plate 80, mold 300, manifold 20, actuator 10 and cooling devices 500, 505, results in the actuator moving side to side relative to the clamp plate 80. Such side-to-side or radial movement SS in the left or lateral direction L relative to the drive axis A of the actuator can be accounted for prior to assembly such that the distal end surface 502*a* can be brought into compressed contact with the complementary mating surface 80*a* of the clamp plate with resilient compression being maintained by the spring 506*a* disposed between the proximal base or member 504 and the heat transmission plate or element 502. As with the above-described embodiments, the surface 502*a* travels toward and away from the housing bodies 12, 12*a* when compressed and when compression is released.

The FIGS. 1-12 embodiments show cooling device 500 arrangements where the distal arm 502 is adapted to move back and forth along a path of travel that is generally upstream and downstream or generally parallel to the drive axis A of the actuator or valve pin 17

With reference to FIGS. 5-6A, the proximal base member 504 is heat transmissively interconnected to or engaged with the distal member 502 via a heat transmissive rod 507, the downstream end of which 507*d* is slidably mounted within a complementary precision bore 504*pb* that is drilled within the distal mount member 502 such that the downstream end 507*d* of the rod 507 is engaged in heat transmissive intimate contact with an interior surface 504*pbs* of the bore 504*pb*. In such an embodiment, the upstream end 507*us* of the rod 507 is screwably connected to the distal member 502 into a complementary aperture within distal member 502 such that when the member 502 travels through Q the downstream end 507*d* is slidably moved along the path of travel Q together with movement of distal member 502.

In an alternative embodiment as shown in FIGS. 6, 6A, the upstream ends 507*u* of the heat transmissive rods 507 can conversely be slidably mounted within complementary bores 502*pb* provided in distal member 502 such that the exterior surface of the upstream end 507*u* of the rod 507 is slidably and heat transmissively engaged against the interior surface 502*pbs* of the bore 502*pb*. In such an embodiment the downstream end 507*d* of the rod 507 is screwably connected to proximal mount member 504 such that when the member 502 travels through Q the upstream end 507*u* is slides along the interior surface 502*pbs* of the bore 502*pb* as member 502 travels through the path of travel Q.

Thus, the rods or tubes 507, 517*r* are preferably slidably mounted to or within one of the proximal base or member 504 and the distal arm or member 502 and rigidly interconnected to the other of the proximal base or member 504 and the distal arm or member 502.

In the embodiment shown in FIGS. 5H, 5I, the rods 507*ir* are formed integrally together with and as a part of the body of the distal member 502, the outside surface 507*os* of the rods 507*ir* being engaged and slidable against the interior surface 504*pbs* of the receiving bores 504*pb* within the proximal mounts 504. As shown, the distal member 502 is spring loaded by spring 506 that disposed between the distal 502 and proximal 504 heat transmissive members.

In another embodiment of the invention, FIGS. 5D, 5E, 5F, 5G one or the other of the distal 502 and proximal 504 members can have one or more highly heat conductive tube members that contain a heat conductive fluid 517*a*, 517*b*, 517*c*, 517*d* embedded or mounted within a complementary receiving bore drilled into the members 502 or 504. Similarly, one or more of the rods or tubes 507 can comprise and be adapted to contain a heat conductive fluid such as tube 517*r* shown in FIGS. 5D, 5E, 5F, 5G, 5J, 5K. Such heat conductive tubes 517*a*, 517*b*, 517*c*, 517*d* are comprised of a tubular member or wall that itself is comprised of a material that is highly heat conductive such as copper, aluminum, gold, platinum or the like. The tubular member or wall forms a hollow interior tube cavity that contains a highly heat conductive fluid such as water, methanol or the like and also preferably further typically contains a wick that facilitates flow of the heat conductive fluid within and through the length of the cavity of the tube. Such heat conductive tubes facilitate the transmission of heat between the actuator housing 12, the proximal member 504 and the distal member. An example of the structure and configuration of such heat conductive tubes is disclosed in U.S. Pat. No. 4,500,279, the disclosure of which is incorporated by reference as if fully set forth herein.

Similarly, such heat conductive tubes 517*ah* can be embedded within the body of the actuator housing 12 as shown in FIG. 5F, 5G in the same manner as described above where the tubes 517*a*, 517*b*, 517*c*, 517*d* are embedded within members 502 or 504.

Figure 25A:
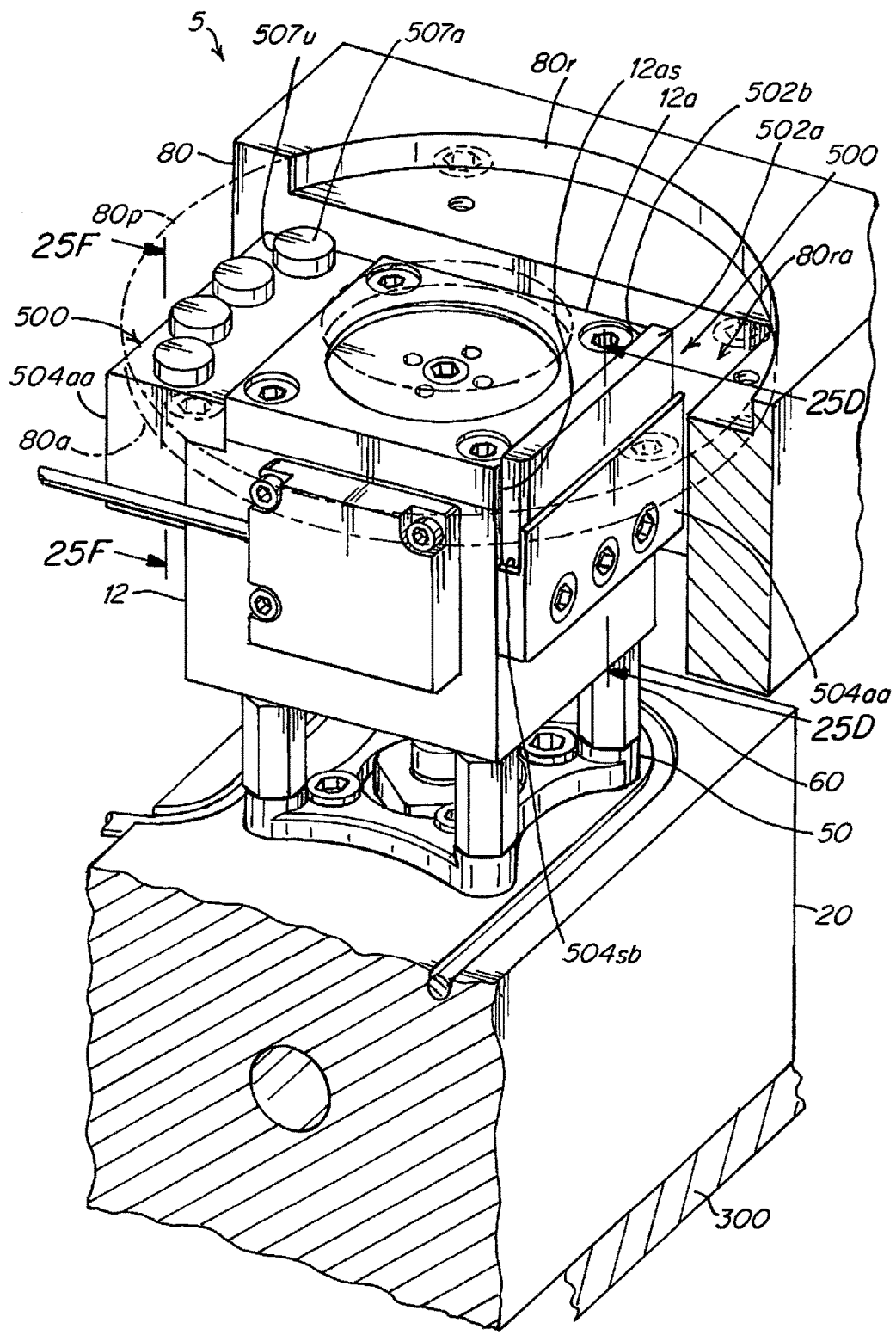
FIG. 25A is a top perspective view of an actuator assembled together with another embodiment of a pair of cooling devices comprised of sliding rods and a sliding block mounted within a base attached to the actuator.
Figure 25B:
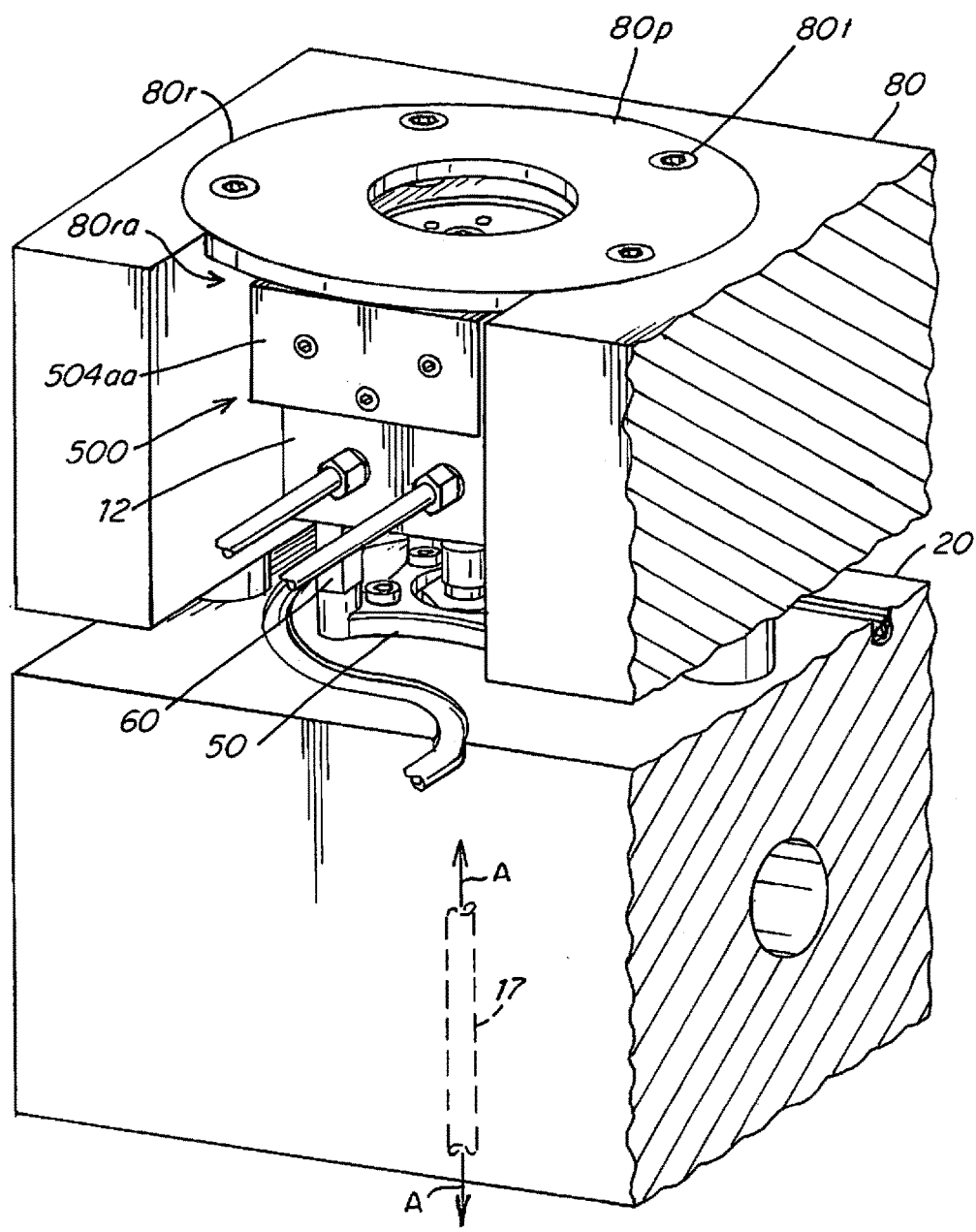
FIG. 25B is a front right side perspective view of an assembly of a manifold, an actuator with cooling devices as in FIGS. 25A-25E and a top clamp plate configured to assemble together quickly that the actuator and cooling devices so that spring loaded rods and block of the cooling devices 500 attached to the actuator will engage with the underside of a quickly assemblable plate component of the top clamp plate.
Figure 25C:
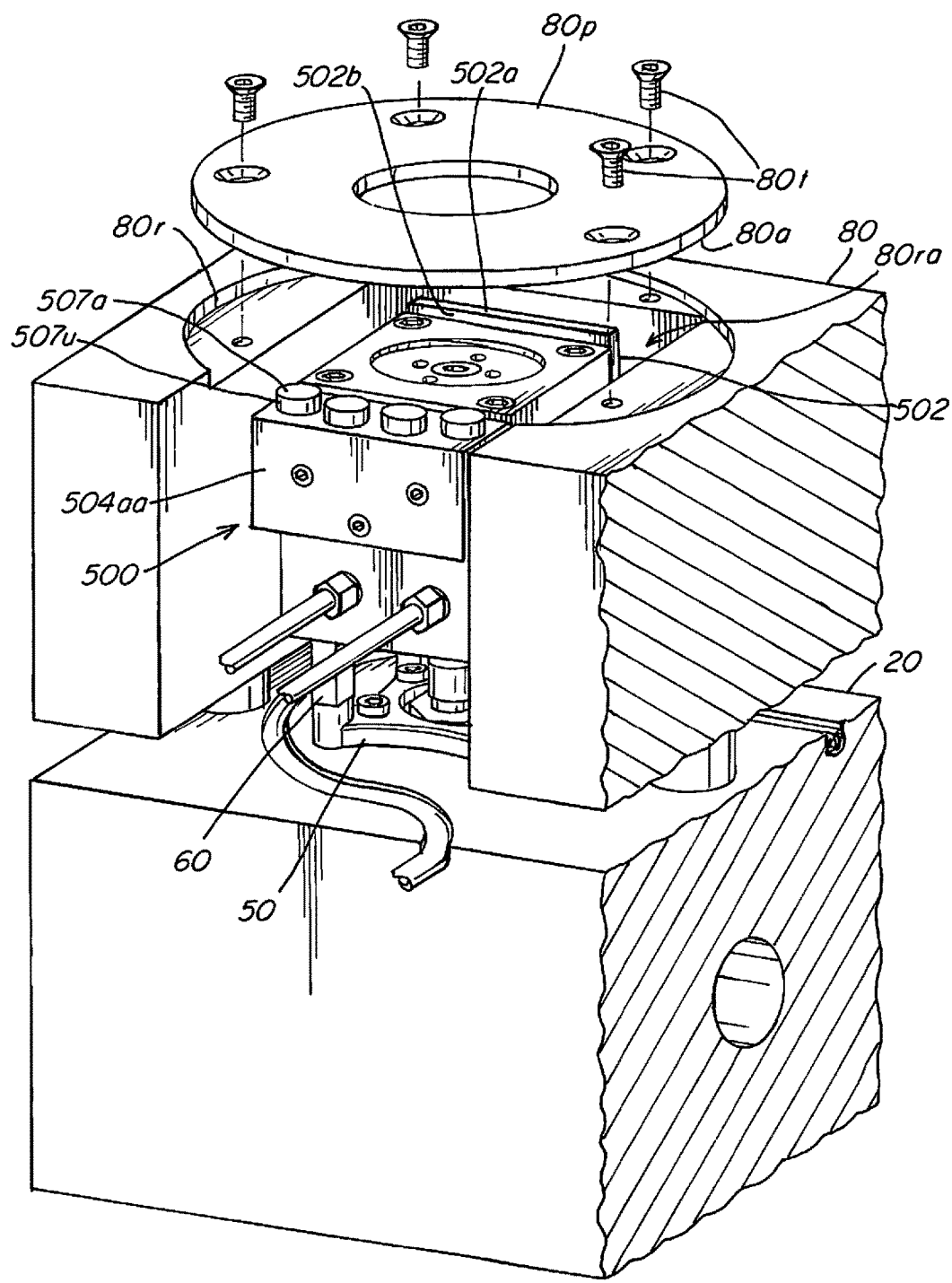
FIG. 25C is an exploded view of the device of FIG. 25B.
Figure 25D:
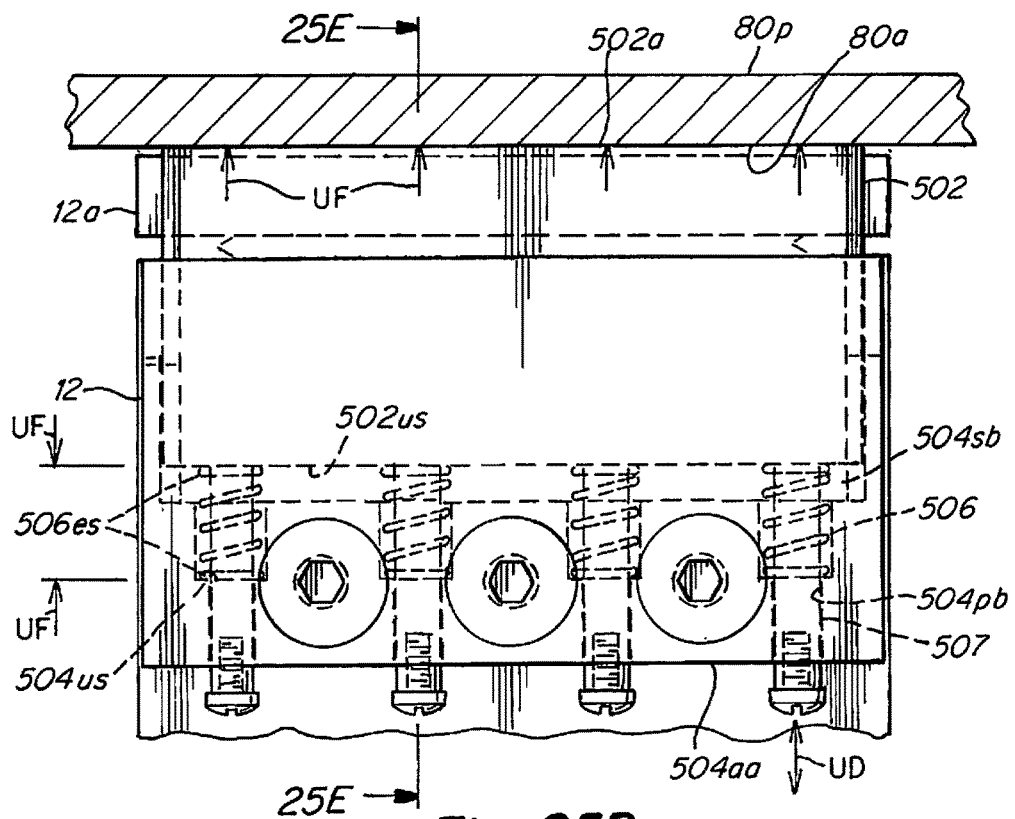
FIG. 25D is a cross-sectional view taken along lines 25D-25D of FIG. 25A.
Figure 25E:
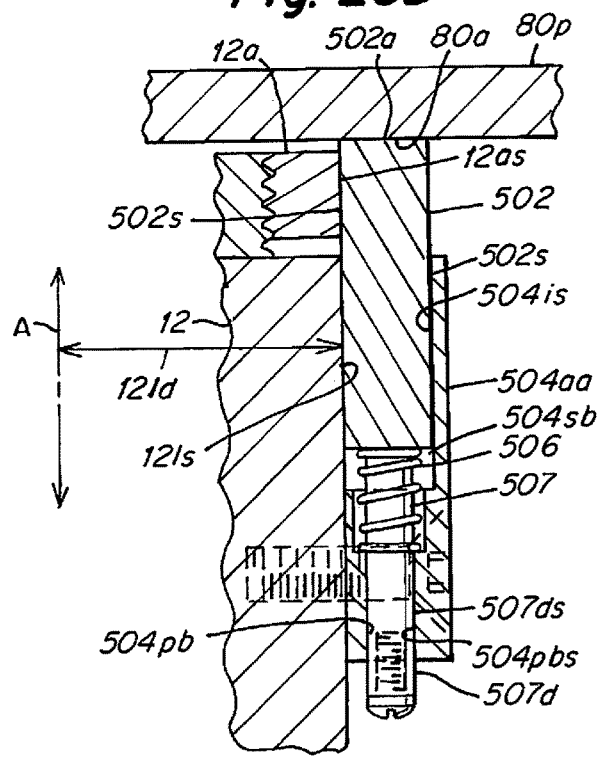
FIG. 25E is a cross-sectional view taken along lines 25E-25E of FIG. 25D.
Figure 25F:
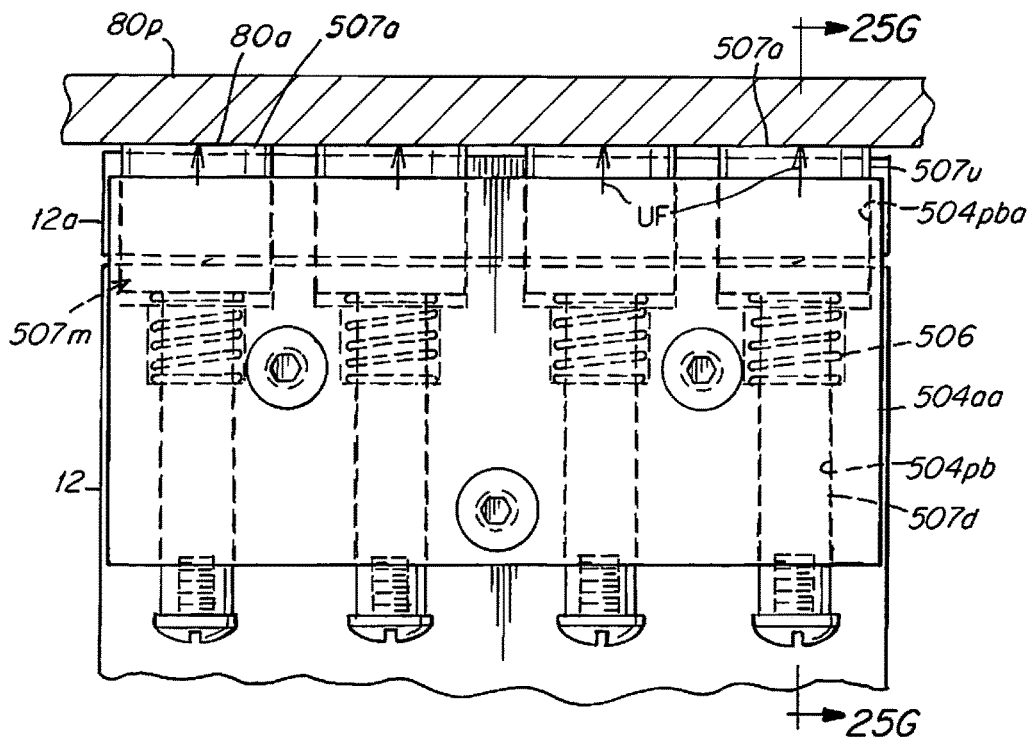
FIG. 25F is a cross-sectional view taken along lines 25F-25F of FIG. 25A.
Figure 25G:
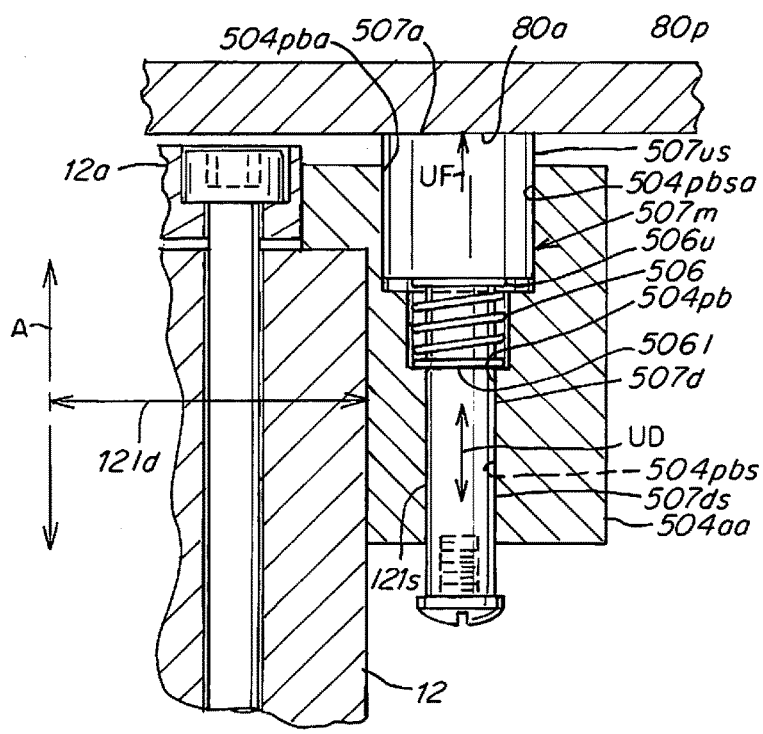
FIG. 25G is a cross-sectional view taken along lines 25G-25G of FIG. 25F.

With reference to FIGS. 25A-25G the actuator 12 of the apparatus 5 has a pair of cooling devices each having a base member 504*aa*. One of the two cooling devices 500 has cylindrical slots 504*pb*, 504*pba* that receive a complementary rod shaped member 507*m* comprised of an upper rod portion 507*u* connected to a lower rod portion 507*d*. The upper 507*u* and lower 507*d* portions of rod member 507*m*, FIGS. 25F, 25G are connected to each other and are both respectively slidably mounted within the complementary slots 504*pb*, 504*pba* for upstream and downstream movement UD. The configuration of the upper and lower 507*u*, 507*d* rod portions of the rod 507*m* is adapted so that the outside surfaces 507*us*, 507*ds* of the rod 507*m* are in slidable heat conductive engagement with the inside surfaces 504*pbs*, 504*pbsa* of the base member 504*aa*. The base member 504*aa* is mounted in heat conductive engagement with the outside surface of actuator housing 12. The base member 504*aa* is mounted such that it is spaced 12*ls* a lateral distance 12*ld* from the axis A of the valve pin 17 and housing 12 whereby the surface 12*ls* and the base member 504*aa* are laterally spaced apart from direct heat conductive communication with the heat manifold 20. The rod 507*m* is mounted such that the rod 507*m* is spring load biased via spring 506 which exerts upstream directed force UF to urge the distal end surface 507*a* of the rod 507*m* into contact heat conductive engagement with a surface 80*a* of the top clamp plate 80. As in embodiments described above, rods 507, 507*m* can comprise a heat conductive, fluid containing tube that are comprised of a material that is highly heat conductive such as copper, aluminum, gold, platinum and preferably contain a highly heat conductive fluid such as water, methanol or the like that facilitates the transmission of heat between the actuator housing 12, the proximal member 504, the walls of the tube 507*m* and the clamp plate 80. As with proximal heat conducting member 502, in such an embodiment where the rods 507, 507*m* comprise a heat pipe or tube, a distal end surface 507*a* of the rod or tube engages a surface 80*a* under compression via a spring load from spring 506 or otherwise.

Similarly with reference to FIGS. 25D, 25E the other cooling device of the FIGS. 25A-25G embodiment comprises a base member 504*aa* in which a rectangular shaped distal arm or member 502 is slidably mounted in a complementarily shaped slot 504sb. The rectangular arm or member 502 is connected to rods 507 having a lower rod member 507d that are slidably received within complementary slots 504pb. The outside surfaces 507ds of the lower rod 507d portion, FIG. 25E are in slidable heat conductive engagement with the inside surfaces 504pbs of the base member 504aa. The distal rectangular heat conducting member 502 is slidably received within the complementary receiving aperture 504sb such that the outside surface 502s of distal arm 502 is in slidable heat conductive engagement with the inside surface 504is of the slot 504sb. The outside surface 502s of the distal arm 502 is also preferably mounted such that surface 502s is in slidable heat conductive engagement with the outside surface 12as of the upstream actuator member 12a and surface 12ls. The base member 504aa is mounted in heat conductive engagement with the outside surface 12ls of actuator housing 12. The slidable mounting rod 507, 507d is mounted such that the rod 507 is spring load biased via spring 506 which exerts upstream directed force UF to urge the distal end surface 502a of the distal arm 502 into heat conductive engagement with a surface 80a of the top clamp plate 80.

FIGS. 25A-25C show an assembly of the FIG. 25A actuator 10 with the pair of cooling devices 500 attached to the actuator housing together with a manifold 20 and a top clamp plate 80. The top clamp plate 80 is formed with a receiving aperture 80ra for insertion of the actuator 10 and cooling device subassembly that enables the actuator to be mounted on the manifold 20 and surrounded by the top clamp plate as shown. The upstream end of the top clamp plate 80 has a recess 80r formed in a complementary configuration to a plate 80p that is insertable within the recess 80r in an upstream position relative to the actuator housing 12 and its attached cooling devices 500 such that the distal end surfaces 502a of the heat transmissive rods 507m and the heat transmissive block 502, FIGS. 25A-25G, engage the undersurface 80a of the clamp plate 80p under spring loaded compression. The plate 80p is readily attachable to and detachable from the upstream end surface of the clamp plate 80 via screws or bolts 80t after the actuator 10 with attached cooling devices 50 has been inserted in the receiving aperture 80ra and mounted on the manifold 20.

The invention claimed is:

1. An injection molding apparatus comprising a clamp plate mounted to a mold in spaced relationship, a heated manifold, an actuator comprising a housing body, and a cooling device that cools the actuator, wherein the manifold is disposed between the clamp plate and the mold and the housing body of the actuator is mounted in thermally conductive communication with the manifold,
the cooling device comprising:
a heat transmitter comprising a distal arm or member and a proximal base or member mounted in heat conductive contact to the housing body of the actuator,
the distal arm or member comprising a rod or tube slidably disposed within a complementary bore disposed within the proximal base or member, the complementary bore and the rod or tube being configured such that an exterior surface of the rod is slidably engaged in thermally conductive contact with and against an interior surface of the complementary bore,
the rod or tube being comprised of a thermally conductive material having a distal end surface, the rod transmitting heat from the proximal base or member to the distal end surface via engagement of the exterior surface of the rod with the interior surface of the complementary bore, the rod or tube being mounted within the complementary bore via a spring loadable interconnection disposed between the proximal base or member and the rod such that the spring loadable interconnection can exert a spring load between the proximal base or member and the rod,
the clamp plate, the mold, the manifold, the actuator and the heat transmitter being assemblable together in an arrangement wherein the spring loadable interconnection is loaded urging the distal end surface of the rod into compressed engagement with the clamp plate at least when the clamp plate, the mold, the manifold, the actuator and heat transmitter are assembled and the manifold is heated to an elevated operating temperature.

2. The apparatus of claim 1 wherein the spring loadable interconnection comprises a spring that has an amount or degree of mass that renders the spring substantially non-heat conductive between the proximal member and the rod.

3. The apparatus according to claim 1 wherein the spring or spring loadable interconnection has engagement surfaces that engage against complementary opposing engagement surfaces of the proximal member and rod, having a selected area of engagement that renders the spring substantially non-heat conductive between the proximal member and the rod.

4. The apparatus according to claim 1 wherein
the housing body is mounted in thermally conductive contact, along an axis A along which a valve pin is driven, to one or more actuator mounts that are mounted downstream on the manifold along the axis A, and
the housing body having a surface that is spaced laterally from the axis A, the proximal base or member being mounted in heat conductive contact with and to the lateral surface such that the proximal base or member is spaced laterally apart from contact with the one or more actuator mounts.

5. The apparatus according to claim 1 wherein:
the clamp plate includes an actuator receiving aperture and an upstream end plate that is readily attachable to and detachable from the clamp plate in a predetermined mating position disposed upstream of the actuator receiving aperture, and,
the clamp plate, the upstream end plate, the manifold, the actuator and the heat transmitter are assemblable together in an arrangement wherein the actuator and cooling device are mounted within the actuator receiving aperture and the spring loadable interconnection is loaded urging the distal end surface of the rod or tube into compressed engagement with the upstream end plate when the manifold is heated to an elevated operating temperature.

6. The apparatus according to claim 1 wherein the clamp plate includes a recess formed within the clamp plate that is complementary to the upstream end plate such that the upstream end plate is readily receivable within the recess and attachable to the clamp plate in the predetermined mating position.

7. The apparatus according to claim 1 further including a second cooling device comprising:
a heat transmitter comprising a second distal arm or member and a second proximal base or member mounted in heat conductive contact to the housing body of the actuator,
the second distal arm or member being mounted to the second proximal base or member via a spring loadable interconnection disposed between the second proximal base or member and the second distal arm or member such that the spring loadable interconnection can exert a spring load between the second proximal base or member and the second distal arm or member, the second proximal base or member having an engagement surface and the second distal arm or member having one or more complementary engagement surfaces, the engagement surface and the complementary engagement surface being adapted to be disposed in sliding contact with each other for transmitting heat from the second proximal base or member to the second distal arm or member.

8. A method of cooling the actuator of the apparatus according to claim 1 comprising assembling the clamp plate, the mold, the manifold, the actuator and the cooling device of the apparatus such that the spring loadable interconnection is loaded urging the distal end surface of the rod into compressed engagement with the clamp plate.

9. A method of cooling an actuator in an injection molding apparatus comprising a clamp plate mounted to a mold in spaced relationship, a heated manifold, an actuator comprising a housing body, and a cooling device that cools the actuator, wherein the manifold is disposed between the clamp plate and the mold and the housing body of the actuator is mounted in thermally conductive communication with the manifold, characterized in that the method comprises:

mounting a cooling device to a lateral surface of a housing of the actuator, the cooling device comprising a distal arm or member and a proximal base or member mounted in heat conductive contact to the housing body of the actuator, wherein the distal arm or member comprises a rod slidably disposed within a complementary bore disposed within the proximal base or member, the complementary bore and the rod being configured such that an exterior surface of the rod is slidably engaged in thermally conductive contact with and against an interior surface of the complementary bore, the rod being comprised of a thermally conductive material having a distal end surface, the rod transmitting heat from the proximal arm or member to the distal end surface via engagement of the exterior surface of the rod with the interior surface of the complementary bore, the rod being mounted within the complementary bore via a spring loadable interconnection disposed between the proximal base or member and the rod such that the spring loadable interconnection can exert a spring load between the proximal base or member and the rod, assembling the clamp plate, the mold, the manifold, the actuator and the heat transmitter together in an arrangement wherein the spring loadable interconnection is loaded urging the distal end surface of the rod into compressed engagement with the clamp plate at least when the clamp plate, the mold, the manifold, the actuator and heat transmitter are assembled and the manifold is heated to an elevated operating temperature.

* * * * *

UNITED STATES PATENT AND TRADEMARK OFFICE
CERTIFICATE OF CORRECTION

Page 1 of 1

PATENT NO. : 10,046,497 B2
APPLICATION NO. : 15/380084
DATED : August 14, 2018
INVENTOR(S) : Tan et al.

It is certified that error appears in the above-identified patent and that said Letters Patent is hereby corrected as shown below:

Column 43, Line 60 (Claim 1) add --or tube-- after "rod".

Column 43, Line 64 (Claim 1) add --or tube-- after "rod".

Column 43, Line 67 (Claim 1) add --or tube-- after "rod".

Column 44, Line 6 (Claim 1) add --or tube-- after "rod".

Column 44, Line 10 (Claim 1) add --or tube-- after "rod".

Column 44 (Claim 2) add --or tube-- after "rod".

Column 44, Line 23 (Claim 3) add --the-- before "rod" and add --or tube-- after "rod".

Column 44, Line 26 (Claim 3) add --or tube-- after "rod".

Column 45, Line 14 (Claim 8) add --or tube-- after "rod".

Column 46, Line 10 (Claim 9) change [arm] to --base--.

Signed and Sealed this
Second Day of October, 2018

Andrei Iancu
*Director of the United States Patent and Trademark Office*